US011994698B2

(12) United States Patent
Nichol et al.

(10) Patent No.: US 11,994,698 B2
(45) Date of Patent: May 28, 2024

(54) FILM-BASED FRONTLIGHT WITH ANGULARLY VARYING DIFFUSION FILM

(71) Applicant: FLEX LIGHTING II, LLC, Chicago, IL (US)

(72) Inventors: Anthony Nichol, Minneapolis, MN (US); Zane Coleman, Elmhurst, IL (US); Jose Romero, Chicago, IL (US); Eric Blair, Naples, FL (US)

(73) Assignee: Azumo, Inc., Chicago, IL (US)

( * ) Notice: Subject to any disclaimer, the term of this patent is extended or adjusted under 35 U.S.C. 154(b) by 628 days.

(21) Appl. No.: 17/250,743

(22) PCT Filed: Aug. 30, 2019

(86) PCT No.: PCT/US2019/048943
§ 371 (c)(1),
(2) Date: Feb. 26, 2021

(87) PCT Pub. No.: WO2020/047340
PCT Pub. Date: Mar. 5, 2020

(65) Prior Publication Data
US 2021/0215857 A1    Jul. 15, 2021

Related U.S. Application Data

(60) Provisional application No. 62/725,180, filed on Aug. 30, 2018.

(51) Int. Cl.
*G02B 5/02* (2006.01)
*F21V 8/00* (2006.01)
*G02F 1/1335* (2006.01)

(52) U.S. Cl.
CPC ........... *G02B 5/021* (2013.01); *G02B 6/0028* (2013.01); *G02B 6/0031* (2013.01);
(Continued)

(58) Field of Classification Search
CPC .... G02B 5/021; G02B 6/0028; G02B 6/0031; G02B 6/0036; G02B 6/0051; G02B 5/02;
(Continued)

(56) References Cited

U.S. PATENT DOCUMENTS 2,732,688 A    1/1956  Dickson
3,535,537 A    10/1970 Powell
(Continued)

FOREIGN PATENT DOCUMENTS

CN    1206661      2/1999
CN    1341229 A    3/2002
(Continued)

OTHER PUBLICATIONS

Search report and written opinion of the International Searching Authority for PCT/US2019/048943 dated Nov. 7, 2019.
(Continued)

*Primary Examiner* — Arnel C Lavarias

(57) ABSTRACT

A display includes a reflective spatial light modulator, an angularly varying diffusion film that that transmits and scatters light incident within a first angular range and transmits light un-deviated incident within a second angular range outside of the first angular range, and a frontlight including a light source positioned to emit light into a film with a light emitting region positioned between the reflective spatial light modulator and the varying angle diffusion film. In one embodiment light extracted in the light emitting region is incident on a spatial light modulating layer at an angle of peak luminous intensity less than 30 degrees in a second layer from the surface normal of the spatial light modulating layer, reflects from the reflective spatial light modulator, passes through the film, is scattered by the angularly varying diffusion film, and exits the display.

20 Claims, 12 Drawing Sheets

(52) U.S. Cl.
CPC ......... *G02B 6/0036* (2013.01); *G02B 6/0051* (2013.01); *G02F 1/133528* (2013.01)

(58) Field of Classification Search
CPC .. G02B 5/0205; G02B 5/0226; G02B 5/0231; G02B 5/0263; G02B 5/0273; G02B 5/0278; G02B 6/004; G02B 6/0043; G02F 1/133528; G02F 1/133504; G02F 1/133507
USPC ........ 359/599; 362/600, 603, 606, 608, 610, 362/615, 617, 618, 619, 620, 627, 628
See application file for complete search history.

(56) References Cited

U.S. PATENT DOCUMENTS

| | | |
|---|---|---|
| 3,933,556 A | 1/1976 | Strack |
| 4,026,693 A | 5/1977 | Sato |
| 4,141,058 A | 2/1979 | Mizohata et al. |
| 4,151,582 A | 4/1979 | Grunberger |
| 4,228,267 A | 10/1980 | Tigashizume et al. |
| 4,389,698 A | 6/1983 | Cibie |
| 4,422,719 A | 12/1983 | Orcutt |
| 4,511,215 A | 4/1985 | Butler |
| 4,551,985 A | 11/1985 | Kovach |
| 4,592,717 A | 6/1986 | Albert |
| 4,667,481 A | 5/1987 | Watanabe et al. |
| 4,824,194 A | 4/1989 | Karasawa |
| 4,869,570 A | 9/1989 | Yokohama |
| 4,961,617 A | 10/1990 | Shahidi et al. |
| 4,974,354 A | 12/1990 | Hembrook, Jr. |
| 5,001,306 A | 3/1991 | Purcell |
| 5,009,483 A | 4/1991 | Rockwell, III |
| 5,106,181 A | 4/1992 | Rockwell, III |
| 5,134,857 A | 8/1992 | Burley |
| 5,165,187 A | 11/1992 | Shahidi-Hamedani et al. |
| 5,315,673 A | 5/1994 | Stetter et al. |
| 5,328,376 A | 7/1994 | West |
| 5,359,691 A | 10/1994 | Tai et al. |
| 5,379,539 A | 1/1995 | Hannula |
| 5,390,436 A | 2/1995 | Ashall |
| 5,461,547 A * | 10/1995 | Ciupke ................ G02B 6/0038 362/330 |
| 5,506,929 A | 4/1996 | Tai et al. |
| 5,544,268 A | 8/1996 | Bischel |
| 5,596,671 A | 1/1997 | Rockwell, III |
| 5,661,839 A | 8/1997 | Whitehead |
| 5,737,472 A | 4/1998 | Bernasson et al. |
| 5,786,665 A | 7/1998 | Ohtsuki et al. |
| 5,789,710 A | 8/1998 | Vanderpoel |
| 5,818,554 A | 10/1998 | Hiyama et al. |
| 5,888,324 A | 3/1999 | Nakamura |
| 5,938,991 A | 8/1999 | Pollock |
| 6,049,641 A | 4/2000 | Deacon |
| 6,068,381 A | 5/2000 | Ayers |
| 6,208,788 B1 | 3/2001 | Nosov |
| RE37,186 E | 5/2001 | Hill |
| 6,224,269 B1 | 5/2001 | Engstrand et al. |
| 6,315,433 B1 | 11/2001 | Cavello |
| 6,354,724 B1 | 3/2002 | Sakushita |
| 6,361,180 B1 | 3/2002 | Imura |
| 6,464,365 B1 | 10/2002 | Gunn et al. |
| 6,490,090 B1 | 12/2002 | Kumazawa |
| 6,490,401 B2 | 12/2002 | Corneilissen et al. |
| 6,498,882 B1 | 12/2002 | Buckelew et al. |
| 6,547,445 B2 | 4/2003 | Kiani |
| 6,577,359 B2 | 6/2003 | Ishihara |
| 6,592,233 B1 | 7/2003 | Parikka |
| 6,641,880 B1 | 11/2003 | Deyak et al. |
| 6,700,054 B2 | 3/2004 | Cherney et al. |
| 6,750,996 B2 | 6/2004 | Jagt et al. |
| 6,825,895 B2 | 11/2004 | Nakano et al. |
| 6,846,082 B2 | 1/2005 | Glent-Madsen et al. |
| 6,847,424 B2 | 1/2005 | Gotoh et al. |
| 6,933,994 B1 | 8/2005 | Kaneko et al. |
| 6,964,226 B2 | 11/2005 | Weiss et al. |
| 7,004,610 B2 | 2/2006 | Yamashita et al. |
| 7,066,634 B2 | 6/2006 | Kitamura et al. |
| 7,108,414 B2 | 9/2006 | McCollum et al. |
| 7,121,711 B2 | 10/2006 | Yamamoto et al. |
| 7,190,425 B2 | 3/2007 | Hong |
| 7,237,396 B1 | 7/2007 | Nichol |
| 7,275,850 B2 | 10/2007 | Nesterenko |
| 7,343,060 B2 | 3/2008 | Ohtsu et al. |
| 7,384,173 B2 | 6/2008 | Whitney |
| 7,406,245 B2 | 7/2008 | Page et al. |
| 7,411,142 B2 | 8/2008 | Jung et al. |
| 7,413,334 B2 | 8/2008 | Baba |
| 7,413,336 B2 | 8/2008 | Freking et al. |
| 7,430,355 B2 | 9/2008 | Heikenfeld et al. |
| 7,452,120 B2 | 11/2008 | Lee et al. |
| 7,457,509 B2 | 11/2008 | Haenen et al. |
| 7,490,967 B2 | 2/2009 | Syribeys |
| 7,534,022 B2 | 5/2009 | Chou |
| 7,542,635 B2 | 6/2009 | Coleman |
| 7,565,054 B2 | 7/2009 | Rinko |
| 7,582,000 B2 | 9/2009 | Pendlebury et al. |
| 7,639,916 B2 | 12/2009 | Fine |
| 7,643,105 B2 | 1/2010 | Yang |
| 7,729,941 B2 | 6/2010 | Zampini, II et al. |
| 7,742,120 B2 | 6/2010 | Bayley et al. |
| 7,750,886 B2 | 7/2010 | Sampsell |
| 7,751,663 B2 | 7/2010 | Van Ostrand |
| 7,760,284 B2 | 7/2010 | Murase |
| 7,773,849 B2 | 8/2010 | Shani |
| 7,780,329 B2 | 8/2010 | McCollum et al. |
| 7,810,977 B2 | 10/2010 | Ueyama |
| 7,911,554 B2 | 3/2011 | Oohira |
| 7,949,213 B2 | 5/2011 | Vienko et al. |
| 8,013,831 B2 | 9/2011 | Sampsell |
| 8,016,473 B2 | 9/2011 | Salters |
| 8,098,347 B2 | 1/2012 | Brott et al. |
| 8,128,271 B2 | 3/2012 | Nichol |
| 8,164,703 B2 | 4/2012 | Cheng |
| 8,167,461 B2 | 5/2012 | Nichol |
| 8,231,256 B1 | 7/2012 | Coleman et al. |
| 8,434,909 B2 | 5/2013 | Nichol et al. |
| 8,439,545 B2 | 5/2013 | Cheong et al. |
| 8,714,781 B2 | 5/2014 | Nichol |
| 8,750,671 B1 | 6/2014 | Kelly et al. |
| 8,761,565 B1 | 6/2014 | Coleman et al. |
| 8,764,262 B2 | 7/2014 | Nichol et al. |
| 8,794,809 B2 | 8/2014 | Lundin et al. |
| 8,905,610 B2 | 12/2014 | Coleman et al. |
| 8,917,962 B1 * | 12/2014 | Nichol ................ G02B 6/0028 362/311.03 |
| 8,950,902 B2 | 2/2015 | Nichol et al. |
| 8,970,461 B2 | 3/2015 | Tatsuya et al. |
| 9,028,123 B2 | 5/2015 | Nichol et al. |
| 9,103,956 B2 | 8/2015 | Nichol et al. |
| 9,110,200 B2 | 8/2015 | Nichol et al. |
| 9,287,336 B2 | 3/2016 | Lin et al. |
| 9,304,243 B2 | 4/2016 | Wolk et al. |
| 9,523,807 B2 | 12/2016 | Nichol et al. |
| 9,557,473 B2 | 1/2017 | Nichol et al. |
| 9,566,751 B1 | 2/2017 | Nichol et al. |
| 9,645,304 B2 | 5/2017 | Nichol et al. |
| 9,651,729 B2 | 5/2017 | Nichol et al. |
| 9,690,032 B1 | 6/2017 | Nichol et al. |
| 9,798,075 B2 | 10/2017 | Nichol et al. |
| 10,036,847 B2 | 7/2018 | Nichol et al. |
| 10,073,208 B2 | 9/2018 | Nichol et al. |
| 10,175,413 B2 | 1/2019 | Nichol et al. |
| 10,191,199 B2 | 1/2019 | Nichol et al. |
| 10,215,905 B2 | 2/2019 | Nichol et al. |
| 10,254,472 B2 | 4/2019 | Coleman et al. |
| 10,393,941 B2 | 8/2019 | Nichol et al. |
| 10,429,577 B2 | 10/2019 | Coleman et al. |
| 10,466,409 B2 | 11/2019 | Nichol et al. |
| 10,598,848 B2 | 3/2020 | Coleman et al. |
| 10,802,196 B2 | 10/2020 | Nichol et al. |
| 10,935,716 B2 | 3/2021 | Nichol et al. |
| 2001/0019379 A1 | 9/2001 | Ishihara et al. |
| 2001/0019380 A1 | 9/2001 | Ishihara |

(56) References Cited

U.S. PATENT DOCUMENTS

| | | |
|---|---|---|
| 2002/0015563 A1 | 2/2002 | Murakami |
| 2002/0028600 A1 | 3/2002 | Kondo |
| 2002/0047953 A1 | 4/2002 | Endo |
| 2002/0176035 A1 | 11/2002 | Yamazaki |
| 2003/0016930 A1 | 1/2003 | Inditsky |
| 2003/0174953 A1 | 9/2003 | Carnevale et al. |
| 2003/0198456 A1 | 10/2003 | Steiner |
| 2004/0008398 A1 | 1/2004 | Amundson |
| 2004/0017528 A1 | 1/2004 | Kano et al. |
| 2004/0093779 A1 | 5/2004 | Blach |
| 2004/0114342 A1 | 6/2004 | Lin et al. |
| 2004/0119908 A1 | 6/2004 | Sakai |
| 2004/0170373 A1 | 9/2004 | Kim |
| 2004/0228104 A1 | 11/2004 | Birman |
| 2004/0231481 A1 | 11/2004 | Floding et al. |
| 2005/0046921 A1 | 3/2005 | Govil et al. |
| 2005/0072032 A1 | 4/2005 | McCollum et al. |
| 2005/0088830 A1 | 4/2005 | Yumoto et al. |
| 2005/0091886 A1 | 5/2005 | Kim |
| 2005/0179850 A1 | 8/2005 | Du |
| 2005/0194896 A1 | 9/2005 | Sugita et al. |
| 2005/0219148 A1 | 10/2005 | Bayley et al. |
| 2005/0264730 A1 | 12/2005 | Kataoka et al. |
| 2006/0001037 A1 | 1/2006 | Schardt et al. |
| 2006/0007108 A1 | 1/2006 | Utsumi et al. |
| 2006/0008205 A1 | 1/2006 | Meir et al. |
| 2006/0008225 A1 | 1/2006 | Naitou et al. |
| 2006/0024017 A1 | 2/2006 | Page et al. |
| 2006/0061008 A1 | 3/2006 | Karner et al. |
| 2006/0105149 A1 | 5/2006 | Donahue |
| 2006/0114244 A1 | 6/2006 | Saxena et al. |
| 2006/0120106 A1 | 6/2006 | Kuki et al. |
| 2006/0120681 A1 | 6/2006 | Mune et al. |
| 2006/0207134 A1 | 9/2006 | Harry |
| 2006/0215958 A1 | 9/2006 | Yeo et al. |
| 2006/0269213 A1 | 11/2006 | Hwang |
| 2007/0002578 A1 | 1/2007 | Furusawa et al. |
| 2007/0014110 A1 | 1/2007 | Itaya |
| 2007/0025672 A1 | 2/2007 | Suzuki et al. |
| 2007/0031097 A1 | 2/2007 | Heikenfeld et al. |
| 2007/0035843 A1 | 2/2007 | Casserly |
| 2007/0081344 A1 | 4/2007 | Cappaert et al. |
| 2007/0081360 A1 | 4/2007 | Bailey et al. |
| 2007/0086712 A1 | 4/2007 | Shani |
| 2007/0116424 A1 | 5/2007 | Ting et al. |
| 2007/0133935 A1 | 6/2007 | Fine |
| 2007/0147023 A1 | 6/2007 | Matsushita |
| 2007/0153545 A1 | 7/2007 | Lee |
| 2007/0153548 A1 | 7/2007 | Hamada et al. |
| 2007/0171330 A1 | 7/2007 | Hung |
| 2007/0183730 A1 | 8/2007 | Morimoto et al. |
| 2007/0258267 A1 | 11/2007 | Huang et al. |
| 2007/0274091 A1 | 11/2007 | Inditsky |
| 2007/0279549 A1 | 12/2007 | Iwasaki |
| 2007/0280593 A1 | 12/2007 | Brychell et al. |
| 2007/0286562 A1 | 12/2007 | Inditsky |
| 2008/0007965 A1 | 1/2008 | Kanade et al. |
| 2008/0025039 A1 | 1/2008 | Guillermo |
| 2008/0031579 A1 | 2/2008 | Enami |
| 2008/0037284 A1 | 2/2008 | Rudisill |
| 2008/0043490 A1 | 2/2008 | Coleman et al. |
| 2008/0048366 A1 | 2/2008 | Durney |
| 2008/0075414 A1 | 3/2008 | Van Ostrand |
| 2008/0148753 A1 | 6/2008 | Welker et al. |
| 2008/0159693 A1 | 7/2008 | Chang |
| 2008/0266863 A1 | 10/2008 | Rinko |
| 2008/0285310 A1 | 11/2008 | Aylward et al. |
| 2009/0028038 A1 | 1/2009 | Harada |
| 2009/0034292 A1 | 2/2009 | Pokrovskiy et al. |
| 2009/0059618 A1 | 3/2009 | Onikiri et al. |
| 2009/0091836 A1 | 4/2009 | Mi et al. |
| 2009/0147535 A1 | 6/2009 | Mienko et al. |
| 2009/0172978 A1 | 7/2009 | Steenblick et al. |
| 2009/0173654 A1 | 7/2009 | Steenblick et al. |
| 2009/0190373 A1 | 7/2009 | Bita et al. |
| 2009/0207632 A1 | 8/2009 | McCollum et al. |
| 2009/0219734 A1 | 9/2009 | Sawada et al. |
| 2009/0257108 A1 | 10/2009 | Gruhlke et al. |
| 2009/0257215 A1 | 10/2009 | Gomi |
| 2010/0014311 A1 | 1/2010 | Danieli |
| 2010/0021109 A1 | 1/2010 | Ohtsu et al. |
| 2010/0021119 A1 | 1/2010 | Ohtsu et al. |
| 2010/0027289 A1 | 2/2010 | Kazuma et al. |
| 2010/0040986 A1 | 2/2010 | Yamaguchi |
| 2010/0053148 A1 | 3/2010 | Khazeni et al. |
| 2010/0067254 A1 | 3/2010 | Ohta |
| 2010/0074585 A1 | 3/2010 | Shimizu et al. |
| 2010/0092143 A1 | 4/2010 | Ushiwata et al. |
| 2010/0109173 A1 | 5/2010 | Yamamoto |
| 2010/0156953 A1 | 6/2010 | Nevitt |
| 2010/0212719 A1 | 8/2010 | Stolum |
| 2010/0214786 A1 | 8/2010 | Nichol |
| 2010/0246200 A1 | 9/2010 | Tessnow et al. |
| 2010/0258419 A1 | 10/2010 | Chung et al. |
| 2011/0032724 A1 | 2/2011 | Kinoshita |
| 2011/0085771 A1 | 4/2011 | Matsuyama et al. |
| 2011/0110638 A1 | 5/2011 | Shioda |
| 2011/0134623 A1 | 6/2011 | Sherman et al. |
| 2011/0164875 A1 | 7/2011 | Bicknell et al. |
| 2011/0176325 A1 | 7/2011 | Sherman et al. |
| 2011/0187964 A1 | 8/2011 | Li et al. |
| 2011/0227487 A1 | 9/2011 | Nichol et al. |
| 2011/0249425 A1 | 10/2011 | Aurongzeb et al. |
| 2011/0255303 A1 | 10/2011 | Nichol et al. |
| 2011/0273901 A1 | 11/2011 | Nichol et al. |
| 2011/0273906 A1 | 11/2011 | Nichol et al. |
| 2011/0277361 A1 | 11/2011 | Nichol et al. |
| 2011/0283576 A1 | 11/2011 | Nichol |
| 2011/0286234 A1 | 11/2011 | Nichol |
| 2012/0212414 A1 | 8/2012 | Osterhout et al. |
| 2012/0229531 A1 | 9/2012 | Yata et al. |
| 2012/0287674 A1 | 11/2012 | Nichol et al. |
| 2013/0038928 A1 | 2/2013 | Padiyath et al. |
| 2013/0148055 A1 | 6/2013 | Chen et al. |
| 2013/0155676 A1 | 6/2013 | Lee |
| 2013/0155723 A1 | 6/2013 | Coleman |
| 2013/0208508 A1 | 8/2013 | Nichol et al. |
| 2013/0250618 A1 | 9/2013 | Nichol et al. |
| 2013/0314942 A1 | 11/2013 | Nichol et al. |
| 2014/0049983 A1 | 2/2014 | Nichol et al. |
| 2014/0056028 A1 | 2/2014 | Nichol et al. |
| 2014/0063853 A1 | 3/2014 | Nichol et al. |
| 2014/0340910 A1 | 11/2014 | Goldstein et al. |
| 2014/0360578 A1 | 12/2014 | Nichol et al. |
| 2015/0049285 A1 | 2/2015 | Qian et al. |
| 2015/0078033 A1 | 3/2015 | Lee et al. |
| 2015/0078035 A1 | 3/2015 | Nichol et al. |
| 2015/0219834 A1 | 8/2015 | Nichol et al. |
| 2015/0253487 A1 | 9/2015 | Nichol et al. |
| 2015/0354781 A1 | 12/2015 | Catalano |
| 2016/0077246 A1* | 3/2016 | Kusama ............... G02B 5/0268 359/599 |
| 2016/0218156 A1 | 7/2016 | Shedletsky et al. |
| 2017/0045669 A1 | 2/2017 | Nichol et al. |
| 2017/0205572 A1 | 7/2017 | Nichol et al. |
| 2017/0235036 A1 | 8/2017 | Nichol et al. |
| 2017/0285243 A1 | 10/2017 | Nichol et al. |
| 2017/0293054 A1* | 10/2017 | Kusama ............... G02B 5/0247 |
| 2018/0052274 A1 | 2/2018 | Nichol et al. |
| 2018/0059318 A1 | 3/2018 | Nichol et al. |
| 2018/0210131 A1 | 7/2018 | Nichol et al. |
| 2018/0335629 A1 | 11/2018 | Cheng et al. |
| 2018/0348425 A1 | 12/2018 | Coleman et al. |
| 2019/0107665 A1 | 4/2019 | Bu et al. |
| 2019/0170925 A1 | 6/2019 | Nichol et al. |
| 2019/0170928 A1 | 6/2019 | Nichol et al. |
| 2019/0187360 A1 | 6/2019 | Nichol et al. |
| 2019/0235157 A1 | 8/2019 | Coleman et al. |
| 2019/0302327 A1 | 10/2019 | Murata et al. |
| 2020/0257153 A1* | 8/2020 | Robinson ............. G02B 5/0278 |
| 2020/0310020 A1 | 10/2020 | Sasaki et al. |
| 2021/0080638 A1 | 3/2021 | Nichol et al. |
| 2021/0294021 A1 | 9/2021 | Romero et al. |
| 2021/0333629 A1 | 10/2021 | Nichol et al. |

(56) References Cited

U.S. PATENT DOCUMENTS

| | | | |
|---|---|---|---|
| 2021/0337173 | A1 | 10/2021 | Nichol et al. |
| 2022/0179148 | A1 | 6/2022 | Coleman et al. |
| 2022/0196903 | A1 | 6/2022 | Nichol et al. |
| 2023/0011530 | A1 | 1/2023 | Nichol et al. |
| 2023/0099260 | A1 | 3/2023 | Nichol et al. |

FOREIGN PATENT DOCUMENTS

| | | |
|---|---|---|
| CN | 1981220 A | 6/2007 |
| CN | 1981221 | 6/2007 |
| CN | 1985202 | 6/2007 |
| CN | 200962289 Y | 10/2007 |
| CN | 101140335 A | 3/2008 |
| CN | 101349400 A | 1/2009 |
| CN | 101639169 A | 2/2010 |
| CN | 102681253 A | 9/2012 |
| CN | 109564304 A | 4/2019 |
| DE | 2736486 A1 | 2/1978 |
| EP | 284098 A1 | 9/1988 |
| EP | 1760502 A1 | 3/2007 |
| EP | 2103972 A1 | 9/2009 |
| GB | 198085 | 5/1923 |
| GB | 662514 | 12/1951 |
| GB | 2320156 A | 6/1998 |
| JP | 61-278416 A | 12/1987 |
| JP | 10-197865 A | 7/1998 |
| JP | S63301909 A | 12/1998 |
| JP | 11-264974 A | 9/1999 |
| JP | 2000-056138 A | 2/2000 |
| JP | 2000141997 A | 5/2000 |
| JP | 2000147218 A | 5/2000 |
| JP | 2000-258633 | 9/2000 |
| JP | 2001243818 | 9/2001 |
| JP | 2001266626 A | 9/2001 |
| JP | 2001305540 A | 10/2001 |
| JP | 2001-312233 A | 11/2001 |
| JP | 2002277661 A | 9/2002 |
| JP | 2004069729 A | 3/2004 |
| JP | 2004109426 A | 4/2004 |
| JP | 2004-170972 A | 6/2004 |
| JP | 2004199967 A | 7/2004 |
| JP | 2004-288570 A | 10/2004 |
| JP | 2005043766 A | 2/2005 |
| JP | 2005340160 A | 8/2005 |
| JP | 2006-003431 A | 1/2006 |
| JP | 2006-024561 | 1/2006 |
| JP | 2006310112 A | 11/2006 |
| JP | 2007053054 A | 3/2007 |
| JP | 2007-535790 A | 12/2007 |
| JP | 2008-198615 A | 8/2008 |
| KR | 20050113118 A | 12/2005 |
| KR | 20060057583 A | 5/2006 |
| WO | 1996011358 | 4/1996 |
| WO | 2004027314 A1 | 4/2004 |
| WO | 2006131924 A2 | 12/2006 |
| WO | 2007081862 A2 | 7/2007 |
| WO | 2007123180 A1 | 11/2007 |
| WO | 2007143383 A2 | 12/2007 |
| WO | 2009048863 A1 | 4/2009 |
| WO | 2009084176 A1 | 7/2009 |
| WO | 2009084556 A1 | 7/2009 |
| WO | 2010005655 A2 | 1/2010 |
| WO | 2010085787 A1 | 7/2010 |
| WO | 2011130715 A2 | 10/2011 |
| WO | 2011130718 A2 | 10/2011 |
| WO | 2011130720 A2 | 10/2011 |
| WO | 2012016047 A1 | 2/2012 |
| WO | 2012068543 A1 | 5/2012 |
| WO | 2012088315 A1 | 6/2012 |
| WO | 2012122511 A1 | 9/2012 |
| WO | 2012158460 A1 | 11/2012 |
| WO | 2018144720 A1 | 9/2018 |
| WO | 2019090139 A1 | 5/2019 |
| WO | 2020047340 A1 | 3/2020 |
| WO | 2020123539 A1 | 6/2020 |
| WO | 2020142731 A1 | 7/2020 |
| WO | 2020146668 A1 | 7/2020 |
| WO | 2021022307 A1 | 2/2021 |
| WO | 2022072386 A1 | 7/2022 |

OTHER PUBLICATIONS

International Search Report and Written Opinion for International Application No. PCT/US2020/070341 dated Oct. 9, 2020.

International Search Report and Written Opinion for International Application No. PCT/US2019/065525 dated Feb. 21, 2020.

International Search Report and Written Opinion for International Application No. PCT/US2020/012245 dated Mar. 24, 2020.

International Search Report and Written Opinion for International Application No. PCT/US2020/012977 dated Mar. 20, 2020.

Rizzo, et al., "The recovery after bending of polycarbonate sheets." Rheol. Acta 20, 133-138 (1981), ISSN 0035-4511, p. 138, In 1-2.

Lee et al., "LED Light Coupler Design for a Ultra Thin Light Guide," Journal of the Optical Society of Korea, vol. 11, No. 3, Sep. 2007, pp. 113-117.

Chien et al., "The study of LED uniform lightguide for liquid crystal display backlight applications," Tatung University white paper, Taipei, Taiwan, 2008.

Siitonen et al., "Coupling of light from an LED into a thin light guide by diffractive gratings," Applied Optics, vol. 43, No. 30, Oct. 2004, 5631-5636.

Murata et al., "Input couplers for thin light-guides and light-emitting diodes," Optical Engineering 47(2) , Feb. 2008, 027001-027007.

Kim, Joon-Sung, et al. "Stacked Polymeric Multimode Waveguide Arrays for Two-Dimensional Optical Interconnects", Journal of Lightwave Technology, p. 840, Mar. 2004.

Luminus Devices PhlatLight Data Sheet, PDS-001022 Rev 05, 2009.

International Search Report for International Application No. PCT/US08/79041, dated Jan. 8, 2009.

Cardinal Intellectual Property's search report (Work order 5874.5) including the results of a search for the features of the claims included in the U.S. patent application entitled "Light Coupling Into Films ", inventor: Anthony Nichol, and having assigned U.S. Appl. No. 13/206,210. The foregoing U.S. patent application is a continuation of U.S. Appl. No. 12/682,387, Mar. 2011.

Cardinal Intellectual Property's supplemental search report dated Nov. 7, 2011 (Work order 5874.6) including the results of a search for the features of the claims included in the U.S. patent application entitled "Method of Manufacturing a Light Emitting Device", inventor: Anthony Nichol, and having assigned U.S. Appl. No. 13/210,622. The foregoing U.S. patent application is a continuation of U.S. Appl. No. 12/682,387.

International Search Report for International Application No. PCT/US11/032797 dated Nov. 7, 2011.

Written Opinion of the International Searching Authority for International Application No. PCT/US11/032797 dated Nov. 7, 2011.

International Search Report for International Application No. PCT/US11/032795 dated Nov. 16, 2011.

Written Opinion of the International Searching Authority for International Application No. PCT/US11/032795 dated Nov. 16, 2011.

International Search Report for International Application No. PCT/US11/032792 dated Nov. 17, 2011.

Written Opinion of the International Searching Authority for International Application No. PCT/US11/032792 dated Nov. 17, 2011.

Written Opinion of the International Searching Authority for International Application No. PCT/US08/079041 dated Jan. 8, 2009.

International Search Report for International Application No. PCT/US10/22066 dated Mar. 22, 2010.

Written Opinion of the International Searching Authority for International Application No. PCT/US10/22066 dated Mar. 22, 2010.

International Search Report for International Application No. PCT/US11/045730 dated Dec. 23, 2011.

Written Opinion of the International Searching Authority for International Application No. PCT/US11/045730 dated Dec. 23, 2011.

(56) References Cited

OTHER PUBLICATIONS

International Search Report for International Application No. PCT/US11/61528 dated Mar. 26, 2012.
Written Opinion of the International Searching Authority for International Application No. PCT/US11/61528 dated Mar. 26, 2012.
International Search Report for International Application No. PCT/US11/066596 dated May 7, 2012.
Written Opinion of the International Searching Authority for International Application No. PCT/US11/066596 dated May 7, 2012.
Cardinal Intellectual Property's supplemental search report dated Nov. 7, 2011 (Work Order 5874.6) including the results of a search for the features of the claims included in the U.S. patent application entitled "Method of Manufacturing a Light Emitting Device," inventor: Anthony Nichol. The foregoing U.S. Patent application is a continuation of U.S. Appl. No. 12/682,387.
International Search Report and Written Opinion for International Application No. PCT/US2012/028578 dated Jun. 28, 2012.
Office action dated Nov. 19, 2013 by the China Patent Office for application No. 201180027447.2.
European Search Report and written opinion for European Application No. EP08838526 dated Sep. 19, 2012.
Office action dated Sep. 10, 2012 by the State Intellectual Property Office of China for application No. CN201080005385.0.
International Search Report and Written opinion for International Application No. PCT/US2012/37317 dated Aug. 22, 2012.
Office action dated Dec. 3, 2013 by Japan Patent Office for application No. 2010-528972.
Office action dated Mar. 5, 2013 by the Japan Patent Office for application No. 2010-528972.
Office action dated May 15, 2012 by the USPTO for U.S. Appl. No. 12/682,387.
Office action dated Dec. 23, 2011by the USPTO for U.S. Appl. No. 12/682,387.
Office action dated Jul. 23, 2012 by IP Australia for application No. 2010206525.
Office action dated Nov. 22, 2012 by Instituto Mexicano de la Propiedad Industrial for application MX/a/2011/007770.
Office action dated Dec. 6, 2012 by the USPTO for U.S. Appl. No. 13/088,231.
Notice of allowance dated Jan. 7, 2013 by the USPTO for U.S. Appl. No. 13/089,311.
Buchner, Diplomarbeit: Kinetmatics of 3D Folded Structures for Nanostructured Origami, Department of Mechanical Engineering, 3D optical Systems Group, Massachusetts Institute of Technology, 2003.
Nichol, A.J.; Barbastathis, G., "Sub-30nm alignment accuracy between layered photonic nanostructures using optimized V nanomagnet arrays," Optical MEMs and Nanophotonics, 2008 IEEE/LEOS International Conference on , vol. No., pp. 9,10, Aug. 11-14, 2008.
Arora et al., "Membrane folding to achieve three-dimensional nanostructures: Nanopatterned silicon nitride folded with stressed chromium hinges," Appl. Phys. Lett. 88, 053108 (Jan. 2006).
"Nanostructured Origami Folding of Patternable Resist for 3D Lithography" "Se Young Yang, Hyung-ryul Johnny Choi, Martin Deterre, George Barbastathis," "IEEE 2010 International Conference on Optical MEMS & Nanophotonics, p. 37-38, Aug. 2010".
Notice of allowance dated Jul. 29, 2013 by the China Patent Office for application No. 201080005385.0.
Office action dated Jun. 20, 2013 by Instituto Mexicano de la Propiedad Industrial for application MX/a/2012/012033.
Office action dated Jun. 26, 2013 by Instituto Mexicano de la Propiedad Industrial for application MX/a/2012/012034.
Office action dated Jun. 26, 2013 by Instituto Mexicano de la Propiedad Industrial for application MX/a/2012/012035.
Office action dated Oct. 15, 2013 by the China Patent Office for application No. 201180027439.8.
OCR-based machine translation of relevant portions of China office action dated Sep. 2, 2022 for CN201980063179.6 which as a counterpart of U.S. Appl. No. 17/250,743, the present application.
Office action in Chinese Patent Application No. 201980063179.6 dated Sep. 2, 2022.

\* cited by examiner

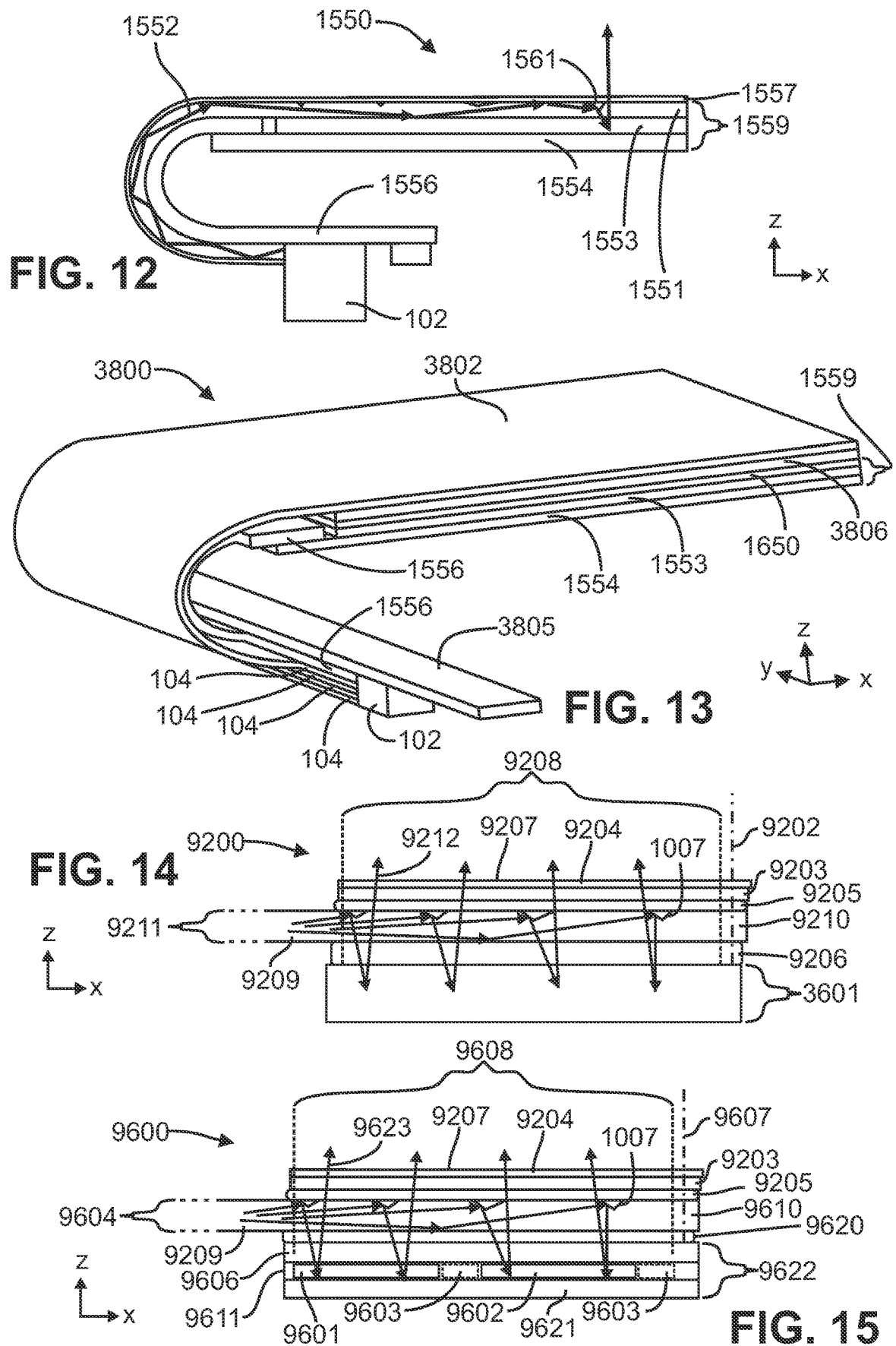

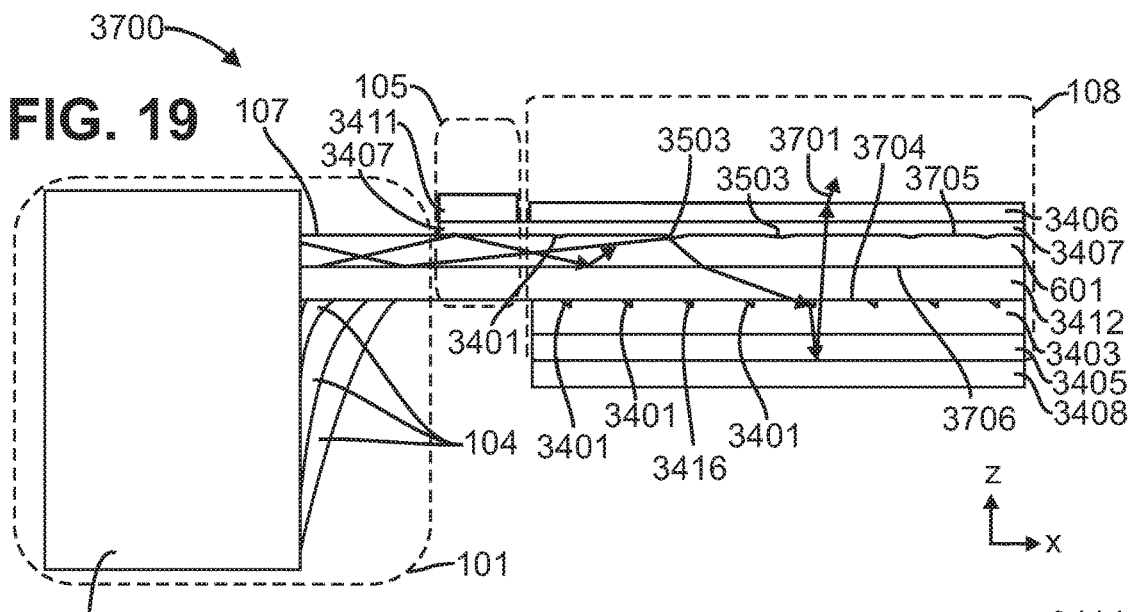
FIG. 19
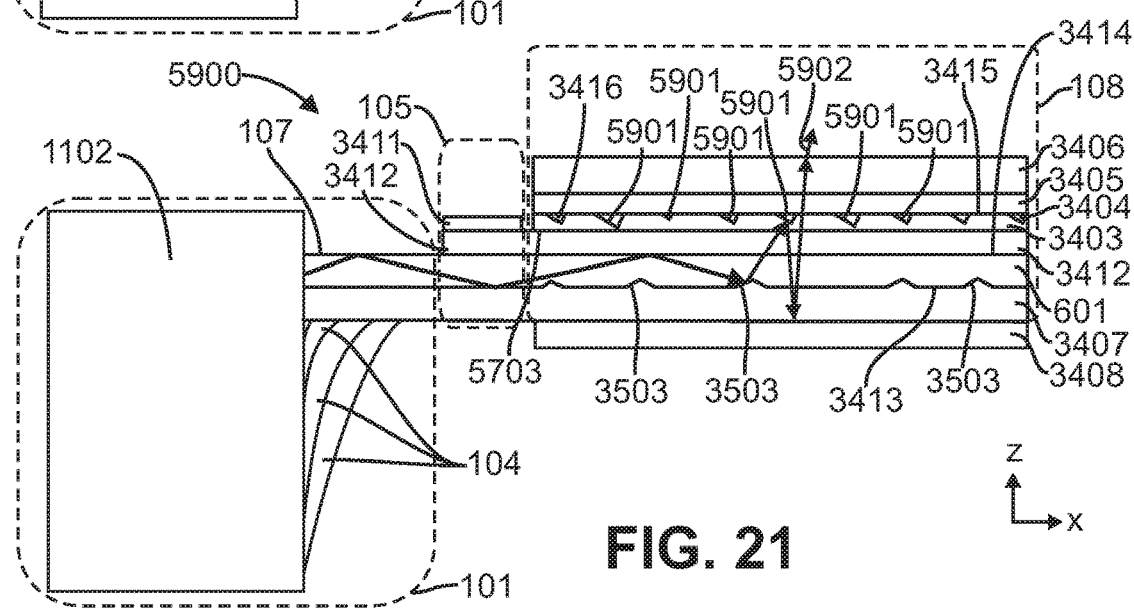
FIG. 20
FIG. 21

FILM-BASED FRONTLIGHT WITH ANGULARLY VARYING DIFFUSION FILM

CROSS-REFERENCE TO RELATED APPLICATIONS

This application is the 35 U.S.C. § 371 national stage application of PCT Application No. PCT/US2019/048943 filed Aug. 30, 2019, where the PCT claims priority to, and the benefit of, U.S. provisional application No. 62/725,180, both of which are herein incorporated by reference in their entireties.

TECHNICAL FIELD

The subject matter disclosed herein generally relates to lightguides, films, and light emitting devices such as, without limitation, light fixtures, backlights, frontlights, passive displays, and active displays and their components and methods of manufacture.

BACKGROUND ART

Light emitting devices are needed that have a very thin form factor that can generate light with specific angular light output profiles. Conventionally, in order to reduce the thickness of displays and backlights, edge-lit configurations using rigid lightguides have been used to receive light from the edge of and direct light out of a larger area surface. These types of light emitting devices are typically housed in relatively thick, rigid frames that do not allow for component or device flexibility and require long lead times for design changes. The volume of these devices remains large and often includes thick or large frames or bezels around the device. The thick lightguides (typically 2 millimeters (mm) and larger) limit the design configurations, production methods, and illumination modes. The ability to further reduce the thickness and overall volume of these area light emitting devices has been limited by the ability to couple sufficient light flux into a thinner lightguide.

SUMMARY

In one embodiment, a display comprises a reflective spatial light modulator, an angularly varying diffusion film that that transmits and scatters light incident within a first angular range and transmits light un-deviated incident within a second angular range outside of the first angular range, and a frontlight comprising a light source positioned to emit light into a film with a light emitting region positioned between the reflective spatial light modulator and the varying angle diffusion film. In one embodiment light extracted in the light emitting region is incident on a spatial light modulating layer at an angle of peak luminous intensity less than 30 degrees in a second layer from the surface normal of the spatial light modulating layer, reflects from the reflective spatial light modulator, passes through the film, is scattered by the angularly varying diffusion film, and exits the display.

BRIEF DESCRIPTION OF THE DRAWINGS

FIG. 12 is a cross-sectional side view of one embodiment of a light emitting display including a lightguide that further functions as a top substrate for a reflective spatial light modulator.

FIG. 13 is a perspective view of one embodiment of a light emitting device including a film-based lightguide that further functions as a top substrate for the reflective spatial light modulator with the light source disposed on a circuit board physically coupled to the flexible connector.

FIG. 14 is a cross-sectional side view of a portion of one embodiment of a spatial display illuminated by a frontlight including a film-based lightguide optically coupled to a reflective spatial light modulator and a scratch resistant hardcoating on a hardcoating substrate optically coupled to the film-based lightguide.

FIG. 15 is a cross-sectional side view of a portion of one embodiment of a spatial display illuminated by a frontlight including a film-based lightguide adhered and optically coupled to a color reflective display such that the light from the frontlight is directed toward the color filters of the color reflective display.

FIG. 19 is a cross-sectional side view of one embodiment of a light emitting device comprising light turning features and low angle directing features.

FIG. 20 is a cross-sectional side view of one embodiment of a light emitting device including printed light scattering regions to reduce the visibility of an angular shadow region.

FIG. 21 is a cross-sectional side view of one embodiment of a light emitting device including varying depth light directing features to reduce the visibility of an angular shadow region.

DETAILED DESCRIPTION OF EMBODIMENTS

Figure 1:
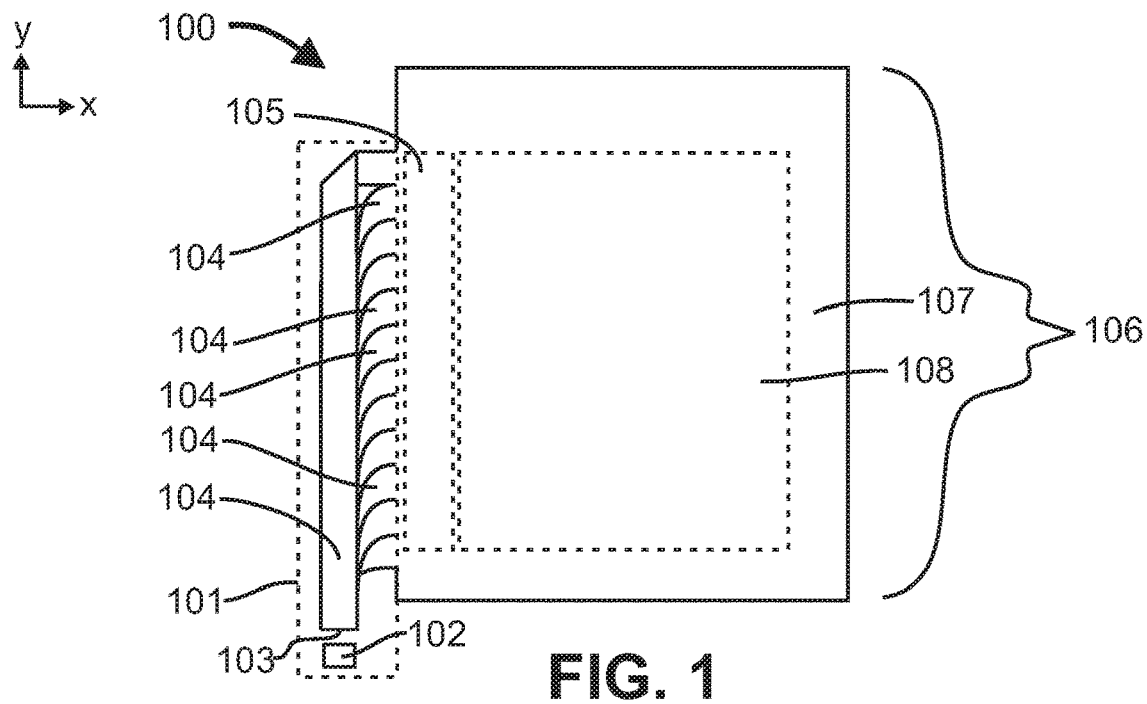
FIG. 1 is a top view of one embodiment of a light emitting device including a light input coupler disposed on one side of a lightguide.

The features and other details of several embodiments will now be more particularly described. It will be understood that particular embodiments described herein are shown by way of illustration and not as limitations. The principal features can be employed in various embodiments without departing from the scope of any particular embodiment. All parts and percentages are by weight unless otherwise specified.

Definitions

"Electroluminescent display" is defined herein as a means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent displays can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Optically coupled" as defined herein refers to coupling of two or more regions or layers such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or between the refractive index of the regions or layers. Examples of "optical coupling" include, without limitation, lamination using an index-matched optical adhesive, coating a region or layer onto another region or layer, or hot lamination using applied pressure to join two or more layers or regions that have substantially close refractive indices. Thermal transferring is another method that can be used to optically couple two regions of material. Forming, altering, printing, or applying a material on the surface of another material are other examples of optically coupling two materials. "Optically coupled" also includes forming, adding, or removing regions, features, or materials of a first refractive index within a volume of a material of a second refractive index such that light propagates from the first material to the second material. For example, a white light scattering ink (such as titanium dioxide in a methacrylate, vinyl, or polyurethane based binder) may be optically coupled to a surface of a polycarbonate or silicone film by inkjet printing the ink onto the surface. Similarly, a light scattering material such as titanium dioxide in a solvent applied to a surface may allow the light scattering material to penetrate or adhere in close physical contact with the surface of a polycarbonate or silicone film such that it is optically coupled to the film surface or volume.

"Lightguide" or "waveguide" refers to a region bounded by the condition that light rays propagating at an angle that is larger than the critical angle will reflect and remain within the region. In a lightguide, the light will reflect or TIR (totally internally reflect) if the angle ($\alpha$) satisfies the condition $\alpha > \sin^{-1}(n_2/n_1)$, where $n_1$ is the refractive index of the medium inside the lightguide and $n_2$ is the refractive index of the medium outside the lightguide. Typically, $n_2$ is air with a refractive index of $n \approx 1$; however, high and low refractive index materials can be used to achieve lightguide regions. A lightguide does not need to be optically coupled to all of its components to be considered as a lightguide. Light may enter from any surface (or interfacial refractive index boundary) of the waveguide region and may totally internally reflect from the same or another refractive index interfacial boundary. A region can be functional as a waveguide or lightguide for purposes illustrated herein as long as the thickness is larger than the wavelength of light of interest. For example, a lightguide may be a 5-micrometer region or layer of a film or it may be a 3 millimeter sheet including a light transmitting polymer.

"In contact" and "disposed on" are used generally to describe that two items are adjacent one another such that the whole item can function as desired. This may mean that additional materials can be present between the adjacent items, as long as the item can function as desired.

A "film" as used herein refers to a thin extended region, membrane, or layer of material.

A "bend" as used herein refers to a deformation or transformation in shape by the movement of a first region of an element relative to a second region, for example. Examples of bends include the bending of a clothes rod when heavy clothes are hung on the rod or rolling up a paper document to fit it into a cylindrical mailing tube. A "fold" as used herein is a type of bend and refers to the bend or lay of one region of an element onto a second region such that the first region covers at least a portion of the second region. An example of a fold includes bending a letter and forming creases to place it in an envelope. A fold does not require that all regions of the element overlap. A bend or fold may be a change in the direction along a first direction along a surface of the object. A fold or bend may or may not have creases and the bend or fold may occur in one or more directions or planes such as 90 degrees or 45 degrees. A bend or fold may be lateral, vertical, torsional, or a combination thereof.

Light Emitting Device

In one embodiment, a light emitting device includes a first light source, a light input coupler, a light mixing region, and a lightguide including a light emitting region with a light extraction feature. In one embodiment, the first light source has a first light source emitting surface, the light input coupler includes an input surface disposed to receive light from the first light source and transmit the light through the light input coupler by total internal reflection through a plurality of coupling lightguides. In this embodiment, light exiting the coupling lightguides is re-combined and mixed in a light mixing region and directed through total internal reflection within a lightguide or lightguide region. Within the lightguide, a portion of incident light is directed within the light extracting region by light extracting features into a condition whereupon the angle of light is less than the critical angle for the lightguide and the directed light exits the lightguide through the lightguide light emitting surface.

In a further embodiment, the lightguide is a film with light extracting features below a light emitting device output surface within the film. The film is separated into coupling lightguide strips which are folded such that the coupling lightguide strips form a light input coupler with a first input surface formed by the collection of edges of the coupling lightguide strips.

In one embodiment, the light emitting device has an optical axis defined herein as the direction of peak luminous intensity for light emitting from the light emitting surface or region of the device for devices with output profiles with one peak. For optical output profiles with more than one peak and the output is symmetrical about an axis, such as with a "batwing" type profile, the optical axis of the light emitting device is the axis of symmetry of the light output. In light emitting devices with angular luminous intensity optical output profiles with more than one peak which are asymmetrical about an axis, the light emitting device optical axis is the angular weighted average of the luminous intensity output. With respect to the optical axis of light propagating within an element of the light emitting device, such as a light collimating optical element or angular rotation optical element, the optical axis is in the direction of peak intensity of the propagating light within the element. The optical axis can be the average or general direction of light propagation toward the next element or surface to ultimately reach the light emitting region of the film-based lightguide.

Light Input Coupler

In one embodiment, a light input coupler includes a plurality of coupling lightguides disposed to receive light emitting from a light source and channel the light into a lightguide. In one embodiment, the plurality of coupling lightguides are strips cut from a lightguide film such that each coupling lightguide strip remains un-cut on at least one edge but can be rotated or positioned (or translated) substantially independently from the lightguide to couple light through at least one edge or surface of the strip. In another embodiment, the plurality of coupling lightguides are not cut from the lightguide film and are separately optically coupled to the light source and the lightguide. In another embodiment, the light emitting device includes a light input coupler having a core region of a core material and a cladding region or cladding layer of a cladding material on at least one surface or edge of the core material with a refractive index less than a refractive index of the core material. In other embodiment, the light input coupler includes a plurality of coupling lightguides wherein a portion of light from a light source incident on a surface of at least one strip is directed into the lightguide such that light travels in a waveguide condition. The light input coupler may also include one or more of the following: a strip folding device, a strip holding element, and an input surface optical element.

In one embodiment, a first array of light input couplers is positioned to input light into the light mixing region, light emitting region, or lightguide region and a separation distance between the light input couplers varies. In one embodiment, a light emitting device includes at least three light input couplers disposed along a side of a film having a separation distance between a first pair of input couplers along the side of the film different than a separation distance between a second pair of input couplers along the side of the film. For example, in one embodiment a separation distance between the first pair of input couplers along the side of the film is great than a separation distance between a second pair of input couplers along the side of the film.

Light Source

In one embodiment, a light emitting device includes at least one light source selected from a group: fluorescent lamp, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp, halogen lamp, incandescent lamp, mercury vapor lamp, sodium vapor lamp, high pressure sodium lamp, metal halide lamp, tungsten lamp, carbon arc lamp, electroluminescent lamp, laser, photonic bandgap based light source, quantum dot based light source, high efficiency plasma light source, microplasma lamp. The light emitting device may include a plurality of light sources arranged in an array, on opposite sides of lightguide, on orthogonal sides of a lightguide, on 3 or more sides of a lightguide, or on 4 sides of a substantially planer lightguide. The array of light sources may be a linear array with discrete LED packages includes at least one LED die. In another embodiment, a light emitting device includes a plurality of light sources within one package disposed to emit light toward a light input surface. In one embodiment, the light emitting device includes 1, 2, 3, 4, 5, 6, 8, 9, 10, or more than 10 light sources. In another embodiment, the light emitting device includes an organic light emitting diode disposed to emit light as a light emitting film or sheet. In another embodiment, the light emitting device includes an organic light emitting diode disposed to emit light into a lightguide.

In another embodiment, a light emitting device includes a light source emitting light in an angular full-width at half maximum intensity of less than one selected from 150 degrees, 120 degrees, 100 degrees, 80 degrees, 70 degrees, 60 degrees, 50 degrees, 40 degrees, 30 degrees, 20 degrees, and 10 degrees. In another embodiment, the light source further includes at least one selected from the group: a primary optic, secondary optic, and photonic bandgap region and the angular full-width at half maximum intensity of the light source is less than one selected from 150 degrees, 120 degrees, 100 degrees, 80 degrees, 70 degrees, 60 degrees, 50 degrees, 40 degrees, 30 degrees, 20 degrees, and 10 degrees.

Led Array

In one embodiment, the light emitting device includes a plurality of LEDs or LED packages wherein the plurality of LEDs or LED packages includes an array of LEDs. The array components (LEDs or electrical components) may be physically (and/or electrically) coupled to a single circuit board or they may be coupled to a plurality of circuit boards that may or may not be directly physically coupled (i.e. such as not on the same circuit board). In one embodiment, the array of LEDs is an array including at least two selected from the group: red, green, blue, and white LEDs. In this embodiment, the variation in the white point due to manufacturing or component variations can be reduced.

Laser

In one embodiment, the light emitting device includes one or more lasers disposed to couple light into one or more light input couplers or the surface of one or more coupling lightguides. In one embodiment, the divergence of one or more light sources is less than one selected from the group: 20 milliradians, 10 milliradians, 5 milliradians, 3 milliradians, and 2 milliradians. In another embodiment, the light mixing region includes a light scattering or light reflecting region that increases the angular FWHM of the light from one or more lasers within the light mixing region before entering the light emitting region of the lightguide or light emitting surface region of the light emitting device. In a further embodiment, the light scattering region within the light mixing region is a volumetric or surface light scattering region with an angular FWHM of transmitted light less than one selected from the group: 50 degrees, 40 degrees, 30 degrees, 20 degrees, 10 degrees, 5 degrees, and 2 degrees when measured normal to the large area surface of the film in the region with a 532 nm laser diode with a divergence less than 5 milliradians. In a further embodiment, the haze of the diffuser in the light mixing region is less than one selected from the group: 50%, 40%, 30%, 20%, 10%, 5%, and 2% when measured normal to the large area surface of the film (such as parallel to the light emitting surface). In one embodiment, the laser packaging comprises one or more optical elements that collimated or reduce the angular width in one or more output planes.

In one embodiment, the light emitting device comprises one or more lasers and one or more film-based lightguides direct light from the one or more lasers or a spatial light modulator receiving light from one or more lasers to the eye of a viewer in a head-mounted display or near-to-eye display. In one embodiment, the film-based lightguide comprises an amorphous material and has a retardance less than one selected from the group of 200, 100, 75, 50, 30, 20, 15, 10, 5 nanometers over a distance selected from the group of 12.5, 10, 7.5, 5, and 2.5 centimeters in one or more directions orthogonal to the thickness direction of the film with a fast axis orientation angle of retardation for light propagating by total internal reflection that is input from the face of the film (face-coupled) such as by one or more diffraction grating, blazed grating, binary grating, holographic grating, refractive structures, is edge coupled along a single edge of the film, or is coupled into an input surface formed by a stack of coupling lightguide strips extending from the film-based lightguide. In one embodiment, the fast axis orientation angle is an angle less than one selected from the group 90, 80, 70, 60, 50, 40, 30, 20, 15, 10, 8, and 5 degrees. In one embodiment, the light emitting device comprises one or more beam combiners, such as dichroic coatings, mirrors or multi-layer optical films, or reflective polarizers (such as multi-layer optical film polarizers, such as DBEF film by 3M Inc.) that combine one or more lasers prior to or while entering the film-based lightguide. In one embodiment, the film-based lightguide comprises two or more lasers wherein the light output from each laser of the two or more lasers propagates by total internal reflection through different film-based lightguides (such as film-based lightguides with a lower refractive index cladding or adhesive between them) wherein the light is extracted from each lightguide with a directional component parallel to the thickness direction of the film in a light emitting region by light extraction features or a grating or other optical element disclosed herein. In one embodiment, the light emitting device comprises a fluorophor or phosphor material (such as a film or coating on a film, for example) illuminated by one or more light sources disclosed herein, wherein the fluorophor or phosphor material is optically coupled, coated, and/or positioned at one or more locations selected from the group: between the light source and a light input surfaced defined by the ends of a stack of coupling lightguides; on a surface of the film-based lightguide core or cladding material; on the light mixing region; at the light emitting region of the film-based lightguide; at a plurality of light emitting regions of the film-based lightguide; on a plurality of film-based lightguide surfaces or plurality of lightguides; above or below the light emitting region of the film-based lightguide; and between the film-based lightguide light emitting region and a reflective film. In one embodiment, the light emitting device comprises a light source comprising one or more lasers or polarized light sources and the light emitting device comprises a depolarizing element or optical element that depolarizes the light or reduces the speckle of the light emitted from the light emitting region, such as one or more selected from the group: two or more diffusive elements; a vibrating element; an integrating rod or integrator defined by one or more lightguides; one or more scanning elements. In one embodiment, the ratio of the length of the light mixing region to the light emitting region is greater than one selected from the group: 0.05, 0.1, 0.2, 0.3, 0.4, 0.5, 0.6 and 0.7 and the speckle contrast is less than 70 percent or the size of the speckle pattern is less than one selected from the group of 0.5, 0.4, 0.3, 0.2, 0.1 and 0.05 millimeters. In another embodiment, the light emitting device comprises a film-based lightguide with one or more light input gratings or light output gratings that couple light into or out of the core of the film-based lightguide, respectively. In this embodiment, the gratings may substantially maintain polarization of the input or output light. In one embodiment, the light emitting device comprises a film-based lightguide that has a linear polarization loss of less than one selected from the group: 40%, 30% 20%, 10%, and 5% when measured by using a linear absorbing polarizer to generate a linearly polarized light source and evaluating with an analyzer polarizer receiving light from the light emitting region of the film-based lightguide taking into account the absorption of the analyzer polarizer. In another embodiment, the linear polarization loss is less than one selected from the group: 40%, 30% 20%, 10%, 5%, 2%, and 1% per inch along the film in the direction of the optical axis of the film orthogonal to the thickness direction of the film measured as indicated above. In another embodiment, the film-based lightguide has selective polarization outcoupling (such as only out-coupling less than 20, 10, 5, or 2% percent of the linearly polarized light polarized in the undesired direction).

Color Tuning

In one embodiment, the light emitting device includes two or more light sources and the relative output of the two light sources is adjusted to achieve a desired color in a light emitting region of the lightguide or an area of light output on the light emitting device including a plurality of lightguides overlapping in the region. For example, in one embodiment, the light emitting device includes a red, green, and blue LED disposed to couple light into the light input surface of a stack of coupling lightguides. The light mixes within the lightguide and is output in a light emitting region of the lightguide. By turning on the red and blue LEDs, for example, one can achieve a purple colored light emitting region. In another embodiment, the relative light output of the light sources is adjusted to compensate for the non-uniform spectral absorption in an optical element of the light emitting device. For example, in one embodiment, the output of the blue LED in milliwatts is increased to a level more than the red output in milliwatts in order to compensate for more blue light absorption in a lightguide (or blue light scattering) such that the light emitting region has a substantially white light output in a particular region.

Led Array Location

In one embodiment, a plurality of LED arrays is disposed to couple light into a single light input coupler or more than one light input coupler. In a further embodiment, a plurality of LEDs disposed on a circuit board are disposed to couple light into a plurality of light input couplers that direct light toward a plurality of sides of a light emitting device including a light emitting region.

Light Input Coupler Input Surface

In one embodiment, the light input coupler includes a collection of coupling lightguides with a plurality of edges forming a light coupler input surface. In another embodiment, an optical element is disposed between the light source and at least one coupling lightguide wherein the optical element receives light from the light source through a light coupler input surface. In some embodiments, the input surface is substantially polished, flat, or optically smooth such that light does not scatter forwards or backwards from pits, protrusions or other rough surface features. In some embodiments, an optical element is disposed to between the light source and at least one coupling lightguide to provide light redirection as an input surface (when optically coupled to at least one coupling lightguide) or as an optical element separate or optically coupled to at least one coupling lightguide such that more light is redirected into the lightguide at angles greater than the critical angle within the lightguide than would be the case without the optical element or with a flat input surface. The coupling lightguides may be grouped together such that the edges opposite the lightguide region are brought together to form an input surface including their thin edges.

Stacked Strips or Segments of Film Forming a Light Input Coupler

In one embodiment, the light input coupler is region of a film that includes the lightguide and the light input coupler which includes strip sections of the film which form coupling lightguides that are grouped together to form a light coupler input surface. The coupling lightguides may be grouped together such the edges opposite the lightguide region are brought together to form an input surface including their thin edges. A planar input surface for a light input coupler can provide beneficial refraction to redirect a portion of the input light from the surface into angles such that it propagates at angles greater than the critical angle for the lightguide. In another embodiment, a substantially planar light transmitting element is optically coupled to the grouped edges of coupling lightguides. One or more of the edges of the coupling lightguides may be polished, melted, smoothed using a caustic or solvent material, adhered with an optical adhesive, solvent welded, or otherwise optically coupled along a region of the edge surface such that the surface is substantially polished, smooth, flat, or substantially planarized.

Light Redirecting Optical Element

In one embodiment, a light redirecting optical element is disposed to receive light from at least one light source and redirect the light into a plurality of coupling lightguides. In another embodiment, the light redirecting optical element is at least one selected from the group: secondary optic, mirrored element or surface, reflective film such as aluminized PET, giant birefringent optical films such as Vikuiti™ Enhanced Specular Reflector Film by 3M Inc., curved mirror, totally internally reflecting element, beamsplitter, and dichroic reflecting mirror or film.

Light Collimating Optical Element

In one embodiment, the light input coupler includes a light collimating optical element. A light collimating optical element receives light from the light source with a first angular full-width at half maximum intensity within at least one input plane and redirects a portion of the incident light from the light source such that the angular full-width at half maximum intensity of the light is reduced in the first input plane. In one embodiment, the light collimating optical element is one or more of the following: a light source primary optic, a light source secondary optic, a light input surface, and an optical element disposed between the light source and at least one coupling lightguide. In another embodiment, the light collimating element is one or more of the following: an injection molded optical lens, a thermoformed optical lens, and a cross-linked lens made from a mold. In another embodiment, the light collimating element reduces the angular full-width at half maximum (FWHM) intensity within the input plane and a plane orthogonal to the input plane.

In one embodiment, a light emitting device includes a light input coupler and a film-based lightguide. In one embodiment the light input coupler includes a light source and a light collimating optical element disposed to receive light from one or more light sources and provide light output in a first output plane, second output plane orthogonal to the first plane, or in both output planes with an angular full-width at half maximum intensity in air less than one selected from the group: 60 degrees, 40 degrees, 30 degrees, 20 degrees, and 10 degrees from the optical axis of the light exiting the light collimating optical element.

In one embodiment, the collimation or reduction in angular FWHM intensity of the light from the light collimating element is substantially symmetric about the optical axis. In one embodiment, the light collimating optical element receives light from a light source with a substantially symmetric angular FWHM intensity about the optical axis greater than one selected from the group: 50, 60, 70, 80, 90, 100, 110, 120, and 130 degrees and provides output light with an angular FWHM intensity less than one selected from the group: 60, 50, 40, 30, and 20 degrees from the optical axis. For example, in one embodiment, the light collimating optical element receives light from a white LED with an angular FWHM intensity of about 120 degrees symmetric about its optical axis and provides output light with an angular FWHM intensity of about 30 degrees from the optical axis.

The angular full-width at half maximum intensity of the light propagating within the lightguide can be determined by measuring the far field angular intensity output of the lightguide from an optical quality end cut normal to the film surface and calculating and adjusting for refraction at the air-lightguide interface. In another embodiment, the average angular full-width at half maximum intensity of the extracted light from one or more light extraction features or light extraction regions including light extraction features of the film-based lightguide is less than one selected from the group: 50 degrees, 40 degrees, 30 degrees, 20 degrees, 10 degrees, and 5 degrees. In another embodiment, the peak angular intensity of the light extracted from the light extraction feature is within 50 degrees of the surface normal of the lightguide within the region. In another embodiment, the far-field total angular full-width at half maximum intensity of the extracted light from the light emitting region of the film-based lightguide is less than one selected from the group: 50 degrees, 40 degrees, 30 degrees, 20 degrees, 10 degrees, and 5 degrees and the peak angular intensity is within 50 degrees of the surface normal of the lightguide in the light emitting region.

Coupling Lightguides

In one embodiment, the coupling lightguide is a region wherein light within the region can travel in a waveguide condition and a portion of the light input into a surface or region of the coupling lightguides passes through the coupling lightguide toward a lightguide or light mixing region. The coupling lightguide, in some embodiments, may serve to geometrically transform a portion of the flux from a light source from a first shaped area to a second shaped area different from the first shaped area. In an example of this embodiment, the light input surface of the light input coupler formed from the edges of folded strips (coupling lightguides) of a planar film has dimensions of a rectangle that is 3 millimeters by 2.7 millimeters and the light input coupler couples light into a planar section of a film in the light mixing region with cross-sectional dimensions of 40.5 millimeters by 0.2 millimeters. In one embodiment, the extended direction of one or more coupling lightguides is the direction in which the one or more coupling lightguides extend from a common base area.

Coupling Lightguide Folds and Bends

In one embodiment, a light emitting device includes a light mixing region disposed between a lightguide and strips or segments cut to form coupling lightguides, whereby a collection of edges of the strips or segments are brought together to form a light input surface of the light input coupler disposed to receive light from a light source. In one embodiment, the light input coupler includes a coupling lightguide wherein the coupling lightguide includes at least one fold or bend in a plane such that at least one edge overlaps another edge. In another embodiment, the coupling lightguide includes a plurality of folds or bends wherein edges of the coupling lightguide can be abutted together in region such that the region forms a light input surface of the light input coupler of the light emitting device. In one embodiment, at least one coupling lightguide includes a strip or a segment that is bent or folded to radius of curvature of less than 75 times a thickness of the strip or the segment. In another embodiment, at least one coupling lightguide includes a strip or a segment that is bended or folded to radius of curvature greater than 10 times a thickness of the strip or the segment. In another embodiment, at least one coupling lightguide is bent or folded such that a longest dimension in a cross-section through the light emitting device or coupling lightguide in at least one plane is less than without the fold or bend. Segments or strips may be bent or folded in more than one direction or region and the directions of folding or bending may be different between strips or segments.

Coupling Lightguide Lateral Edges

In one embodiment, the lateral edges, defined herein as the edges of the coupling lightguide which do not substantially receive light directly from the light source and are not part of the edges of the lightguide region. The lateral edges of the coupling lightguide receive light substantially only from light propagating within the coupling light guide. In one embodiment, the lateral edges are at least one selected from the group: uncoated, coated with a reflecting material, disposed adjacent to a reflecting material, and cut with a specific cross-sectional profile. The lateral edges may be coated, bonded to or disposed adjacent to a specularly reflecting material, partially diffusely reflecting material, or diffuse reflecting material. In one embodiment, the edges are coated with a specularly reflecting ink including nano-sized or micron-sized particles or flakes which substantially reflect the light in a specular manner when the coupling lightguides are brought together from folding or bending. In another embodiment, a light reflecting element (such as a multi-layer mirror polymer film with high reflectivity) is disposed near the lateral edge of at least one region of a coupling lightguide disposed, the multi-layer mirror polymer film with high reflectivity is disposed to receive light from the edge and reflect it and direct it back into the lightguide. In another embodiment, the lateral edges are rounded, and the percentage of incident light diffracted out of the lightguide from the edge is reduced. One method of achieving rounded edges is by using a laser to cut the strips, segments or coupling lightguide region from a film and edge rounding through control of the processing parameters (speed of cut, frequency of cut, laser power, etc.). Other methods for creating rounded edges include mechanical sanding/polishing or from chemical/vapor polishing. In another embodiment, the lateral edges of a region of a coupling lightguide are tapered, angled, serrated, or otherwise cut or formed such that light from a light source propagating within the coupling lightguide reflects from the edge such that it is directed into an angle closer to the optical axis of the light source, toward a folded or bent region, or toward a lightguide or lightguide region.

Shaped or Tapered Coupling Lightguides

The width of the coupling lightguides may vary in a predetermined pattern. In one embodiment, the width of the coupling lightguides varies from a large width in a central coupling lightguide to smaller width in lightguides further from the central coupling lightguide as viewed when the light input edges of the coupling lightguides are disposed together to form a light input surface on the light input coupler. In this embodiment, a light source with a substantially circular light output aperture can couple into the coupling lightguides such that the light at higher angles from the optical axis are coupled into a smaller width strip such that the uniformity of the light emitting surface along the edge of the lightguide or lightguide region and parallel to the input edge of the lightguide region disposed to receive the light from the coupling lightguides is greater than one selected from the group: 60%, 70%, 80%, 90% and 95%.

Other shapes of stacked coupling lightguides can be envisioned, such as triangular, square, rectangular, oval, etc. that provide matched input areas to the light emitting surface of the light source. The widths of the coupling lightguides may also be tapered such that they redirect a portion of light received from the light source. The lightguides may be tapered near the light source, in the area along the coupling lightguide between the light source and the lightguide region, near the lightguide region, or some combination thereof.

The shape of a coupling lightguide is referenced herein from the lightguide region or light emitting region or body of the lightguide. One or more coupling lightguides extending from a side or region of the lightguide region may expand (widen or increase in width) or taper (narrow or decrease in width) in the direction toward the light source. In one embodiment, coupling lightguides taper in one or more regions to provide redirection or partial collimation of the light traveling within the coupling lightguides from the light source toward the lightguide region. In one embodiment, one or more coupling lightguides widens along one lateral edge and tapers along the opposite lateral edge. In this embodiment, the net effect may be that the width remains constant. The widening or tapering may have different profiles or shapes along each lateral side for one or more coupling lightguides. The widening, tapering, and the profile for each lateral edge of each coupling lightguide may be different and may be different in different regions of the coupling lightguide. For example, one coupling lightguide in an array of coupling lightguides may have a parabolic tapering profile on both sides of the coupling lightguides in the region near the light source to provide partial collimation, and at the region starting at about 50% of the length of the coupling lightguides one lateral edge tapers in a linear angle and the opposite side includes a parabolic shaped edge. The tapering, widening, shape of the profile, location of the profile, and number of profiles along each lateral edge may be used to provide control over one or more selected from the group: spatial or angular color uniformity of the light exiting the coupling lightguides into the light mixing region (or light emitting region), spatial or angular luminance uniformity of the light exiting the coupling lightguides into the light mixing region (or light emitting region), angular redirection of light into the light mixing region (or light emitting region) of the lightguide (which can affect the angular light output profile of the light exiting the light emitting region along with the shape, size, and type of light extraction features), relative flux distribution within the light emitting region, and other light redirecting benefits such as, without limitation, redirecting more light toward a second, extending light emitting region.

Interior Light Directing Edge

In one embodiment, the interior region of one or more coupling lightguides, light mixing region, lightguide region, or light emitting region includes one or more interior light directing edges. The interior light directing edge may be formed by cutting or otherwise removing an interior region of the coupling lightguide, light mixing region, lightguide region, or light emitting region. In one embodiment, the interior light directed edge redirects a first portion of light within the coupling lightguide, light mixing region, lightguide region, or light emitting region. In one embodiment, the interior light directing edges provide an additional level of control for directing the light within the coupling lightguides, light mixing region, lightguide region, or light emitting region and can provide light flux redistribution within the coupling lightguide, light mixing region, lightguide region and/or within the light emitting region to achieve a predetermined light output pattern (such as higher uniformity or higher flux output) in a specific region.

In one embodiment, at least one interior light directing edge is positioned within a coupling lightguide, the light mixing region, lightguide region, or light emitting region to receive light propagating within the coupling lightguide, light mixing region, lightguide region, or light emitting region, respectively, within a first angular range from the optical axis of light traveling within the coupling lightguide or region and direct the light to a second, different angular range propagating within the coupling lightguide or region.

Angular Rotation Optical Element

In some embodiments, it is desirable for light emitting systems comprising film-based lightguides to have a very thin profile in the thickness direction of the film. Also, in some embodiments, it is desirable to collimate or reduce the angular FWHM intensity in the thickness plane, such as by using a light collimating optical element. As used herein, the "thickness plane" is the plane comprising the thickness direction and optical axis of the light within a region of the film or element (such as light mixing region or region comprising coupling lightguide strips), within an angular rotation optical element, or within the optical element that has a thickness dimension less than 20% of the width dimension in the plane orthogonal to the thickness direction that may couple light or propagated light toward to the film-based lightguide. As used herein, the "width plane" is the plane orthogonal to the thickness plane that includes the optical axis. The collimated or reduced angular FWHM intensity in the thickness plane can enable greater control of the extraction and/or output angles of the light out of the lightguide in the thickness plane. However, with thin light emitting systems using film-based lightguides, the reduced thickness makes it impractical or very difficult to collimate light in the thickness plane in some embodiments. Also, in some embodiments, it is desirable to have wide strips or optical elements (relatively large dimension in the width plane) in order to reduce the number of interfacial reflections from the strip edges where imperfections and/or diffractive effects may redirect light into wide angles (relative to the optical axis) that could refract out of the strips or optical element instead of totally internally reflect. In some embodiments, the width of the strips or optical element provide reduced angular width or some collimation in the width plane and the light is subsequently angularly rotated such that a large portion of the light with a reduced angular width in the width plane is propagating with a reduced angular width in the thickness plane. In one embodiment, one or more angular rotation optical elements rotate the angular profile of the light propagating in the optical element such that the angular profile (such as angular FWHM intensity) in the width plane is substantially rotated to be the angular profile (such as angular FWHM intensity) in the thickness plane and the angular profile of the light propagating in the thickness plane is substantially rotated to be the angular profile of the light in the width plane. In one embodiment, a light emitting device comprises light with a reduced angular width in the width plane (such as the system comprising a light collimating optical element, or the edges of the strip are parabolic, angled, or non-parallel such that the provide some reduction in angular width in the width plane) relative to the thickness plane, and the light emitting device further comprises one or more angular rotation optical elements that rotate the angular profile by about 90 degrees about the optical axis of the light propagating in the one or more angular rotation optical elements such that the light output from the one or more angular rotation optical elements in the system has a reduced angular width (angular FWHM intensity) in the thickness plane relative to the width plane. In one embodiment, the light emitting device comprises a light source with a substantially symmetrical optical output in the thickness plane and width plane (such as a 120 degree angular FWHM intensity in the thickness plane and width plane, for example), one or more collimating or angular reduction optical elements (such as a light collimating optical element, secondary optical element, angled or curved strip edges, for example) that reduces the angular FWHM intensity of the light from the light source such that the angular FWHM intensity in the width plane is less than the angular FWHM intensity in the thickness plane, and one or more angular rotation optical elements that rotates all or a portion of the light from the one or more collimating or angular reduction optical elements such that the angular FWHM intensity of the light output from the one or more angular rotation optical elements is less in the thickness plane than the width plane.

In one embodiment, the light emitting device comprises one or more angular rotation optical elements. The one or more angular rotation optical elements may rotate a portion of the light propagating at a first angle to the optical axis of the light propagating within the angular rotation optical element in a first plane (such as the thickness plane) and a second angle to the optical axis in a second plane (such as the width plane) orthogonal to the first plane into a third angle to the optical axis in the first plane smaller than the first angle and a fourth angle to the optical axis in the second plane larger than the second angle. In some embodiments, the second angle is smaller than the first angle. In one embodiment, the first plane is the plane comprising the thickness direction of the film, thickness direction of the light emitting region of the film, thickness direction of the light mixing region of the film, thickness direction of one or more strips of the film forming coupling lightguides, or thickness direction of the optical element that has a thickness dimension less than 20% of the width dimension in the plane orthogonal to the thickness direction that couples light into the film-based lightguide.

Profiles of Angularly Rotated Light

In one embodiment, the light emitting device comprises one or more angular rotation optical elements that rotates a light input profile within the one or more angular rotation optical elements with a first angular FWHM intensity in the thickness plane and second angular FWHM intensity in the width plane to a light output profile with a third angular FWHM intensity in the thickness plane different from the first angular FWHM intensity and fourth angular FWHM intensity in the width plane different from the third angular FWHM intensity. In one embodiment, the second angular FWHM intensity is less than the first angular FWHM intensity. In another embodiment, the third angular FWHM intensity is less than the first angular FWHM intensity. In one embodiment, the third angular FWHM intensity is less than the fourth angular FWHM intensity. In a further embodiment, the second angular FWHM intensity is less than the first angular FWHM intensity and fourth angular FWHM intensity; and the third angular FWHM intensity is less than the first angular FWHM intensity and the fourth angular FWHM intensity.

In one embodiment, the second angular FWHM intensity is less than one selected from the group: 120, 100, 80, 60, 50, 40, 30, 20, and 10 degrees. In one embodiment, the third angular FWHM intensity is less than one selected from the group: 120, 100, 80, 60, 50, 40, 30, 20, and 10 degrees. In one embodiment, the first angular FWHM intensity is greater than one selected from the group: 120, 100, 80, 60, 50, 40, 30, 20, and 10 degrees. In one embodiment, the fourth angular FWHM intensity is less than one selected from the group: 120, 100, 80, 60, 50, 40, 30, 20, and 10 degrees. In one embodiment, the difference between the first angular FWHM intensity and the third angular FWHM is greater than one selected from the group: 80, 60, 50, 40, 30, 20, and 10 degrees. For example, in one example a light emitting device comprises a film-based lightguide with a light mixing region between a light emitting region and a stack of coupling lightguide strips; a light source; and an angular rotation optical element with a thickness less than 1 millimeter comprising angular reducing lateral edges that collimate a portion of incident light from the light source, wherein the angular rotation optical element comprises an array of slits oriented 45 degrees to the thickness plane and width plane. In this example, the light from the light source has a symmetrical output with an angular FWHM intensity (in air) of 120 degrees in the thickness plane and width plane. The light refracts upon entering the angular rotation optical element and the angular reducing lateral edges further reduces the angular width of the light in the width plane such that the first angular FWHM intensity is 60 degrees and the second angular FWHM is 30 degrees. The array of slits rotate the light such that the third angular FWHM intensity is 30 degrees and the fourth angular FWHM is 60 degrees. In some embodiment, the third angular FHWM intensity is larger than the second angular FWHM intensity. For example, in the previous example, the third angular FHWM intensity may be 40 degrees and the fourth angular FWHM may be 60 degrees.

Single Rotation Element Angular Rotation Optical Element

In one embodiment, the angular rotation optical element comprises a reflecting surface, element, or interface (such as a planar surface) oriented at a first orientation angle to the thickness plane. In one embodiment, the reflecting surface is formed from a cut, slice, or surface formed in an optical element that may be formed by cutting, slicing, stamping melting, laser ablation, scribing, or injection molding for example wherein a region of a lower refractive index material (such as air or a low refractive index oil) creates two reflective surfaces at the interfaces between the lower refractive index material and the material of the angular rotation optical element (such as polycarbonate or silicone, for example) adjacent the lower refractive index material. The single rotation element angular rotation optical element may comprise two parallel surfaces that reflect similarly. For example, in embodiments where the angular rotation optical element is formed by cutting a first material and filling in the cut region with a second material with a low refractive index (including air or a low refractive index oil, for example), two first material-second material interfaces are formed that may totally internally reflect light propagating within the first material at the first material-second material interface. Similarly two components formed independently or cut from a single component that are physically coupled together at a mating surface with a lower refractive index material between the mating surfaces is considered a single rotation element angular rotation optical element herein since the two interfaces with the low refractive index material are substantially parallel. In one embodiment, the first orientation angle is 45 degrees to the thickness plane. In another embodiment, the first orientation angle is within a range selected from the group: 40 and 45 degrees, 35 and 50 degrees, 30 and 55 degrees, 25 and 60 degrees, 20 and 65 degree, and 15 and 80 degrees from the thickness plane. In one embodiment, the angular rotation optical element comprises two sub-components which may be formed independently, that are physically coupled such that a substantially planar air gap or region of low refractive index material is positioned within the angular rotation optical element when the two sub-components are combined. In one embodiment, the angular rotation optical element is also a light collimating optical element with light collimating lateral edges, the reflecting surface of the angular rotation optical element is positioned substantially centrally with respect to the lateral width of the angular rotation optical element, and the reflective surface does not extend to the lateral, light collimating edges of the angular rotation optical element. In this embodiment, the light collimating optical element and the angular rotation optical element are effectively combined with the central region of the angular rotation optical element comprising the reflective surface. In this embodiment, by not extending the reflecting surface to the lateral edges, the light may effectively be collimated in the width plane.

Pluarlity of Rotation Surfaces Angular Rotation Optical Element

In one embodiment, the angular rotation optical element comprises a plurality of reflecting surfaces (such as an array of planar surfaces) oriented at an average orientation angle to the thickness plane. In one embodiment, the reflecting surfaces are cuts, slices, or surfaces formed in an optical element that may be formed by cutting, slicing, stamping melting, laser ablation, scribing, or injection molding for example wherein regions of a lower refractive index material (such as air or a low refractive index oil) create reflective surfaces at the boundaries between the lower refractive index material and the material of the angular rotation optical element adjacent the lower refractive index material (such as polycarbonate or silicone, for example). In one embodiment, the average orientation angle is 45 degrees. In another embodiment, the average orientation angle is within a range selected from the group: 40 and 45 degrees, 35 and 50 degrees, 30 and 55 degrees, 25 and 60 degrees, 20 and 65 degree, and 15 and 80 degrees. In one embodiment, the angular rotation optical element comprises two or more sub-components which may be formed independently, that are physically coupled such that substantially planar air gaps or region of low refractive index material is positioned within the angular rotation optical element when the two or more sub-components are combined. In one embodiment, the angular rotation optical element is also a light collimating optical element with light collimating lateral edges.

Side Optic Angular Rotation Optical Element

In one embodiment, the angular rotation optical element comprises a first lightguide region with a tapered thickness in the thickness plane and tapered width in the width plane from an input surface. In this embodiment, the first lightguide region of the angular rotation optical element is a "leaky" lightguide wherein light is reflected from an angled or curved lateral edge of the first lightguide region and/or an angled or curved top surface of the first lightguide region to reduce the propagation angle to the optical axis in the width plane in the first lightguide region or reduce the propagation angle to the optical axis in the thickness plane in the first lightguide region, respectively, to pass into an input region of a second lightguide region thinner in the thickness direction than the first lightguide region. In one embodiment, the first lightguide region directs the optical axis of light of the first lightguide region at an angle (such as 90 degrees) to an optical axis of the second lightguide region about 90 degrees to the optical axis of the first lightguide region. In one embodiment, the angular rotation optical element further comprises one or more light collimating or angular reduction light reflecting surfaces, lateral edges, or internal edges with a cross-sectional shape in the thickness plane (or width plane) at an angle to the optical axis or along a curve in the in the second lightguide region.

Light Mixing Region

In one embodiment, a light emitting device includes a light mixing region disposed in an optical path between the light input coupler and the lightguide region. The light mixing region can provide a region for the light output from individual coupling lightguides to mix together and improve at least one of a spatial luminance uniformity, a spatial color uniformity, an angular color uniformity, an angular luminance uniformity, an angular luminous intensity uniformity or any combination thereof within a region of the lightguide or of the surface or output of the light emitting region or light emitting device. In one embodiment, a width of the light mixing region is selected from a range from 0.1 mm (for small displays) to more than 10 feet (for large billboards). In one embodiment, the light mixing region is the region disposed along an optical path near the end region of the coupling lightguides wherein light from two or more coupling lightguides may inter-mix and subsequently travel to a light emitting region of the lightguide. In one embodiment, the light mixing region is formed from the same component or material as at least one of the lightguide, lightguide region, light input coupler, and coupling lightguides.

Width of the Light Mixing Region or Array of Coupling Lightguides

In one embodiment, the length of the array of coupling lightguides and/or the light mixing region is longer than the light emitting region or lightguide region in a direction parallel to the array direction of the coupling lightguides (perpendicular to the extended direction of the array of coupling lightguides). In one embodiment, the array of coupling lightguides and/or the light mixing region extends past a lateral side of the light emitting region in the direction parallel to the array direction of the coupling lightguides (the perpendicular to the extended direction of the coupling lightguides) by a distance selected from the group: greater than 1 millimeter; greater than 2 millimeters; greater than 4 millimeters; greater than 6 millimeters; greater than 10 millimeters; greater than 15 millimeters; greater than 20 millimeters; greater than 50% of the average width of the coupling lightguides; greater than 100% of the average width of the coupling lightguides; and greater than 1%, 2%, 5%, or 10% of the length of the light emitting region in the direction parallel to the array direction of the coupling lightguides. In one embodiment, the array of coupling lightguides or light mixing region extends past the lateral edge of the light emitting region opposite the direction of the fold. In a further embodiment, the array of coupling lightguides or light mixing region extends past the lateral side of the light emitting region in the direction of the fold. In one embodiment, more light can be introduced into the edge region (defined as the region of the light emitting area within 10% of the lateral edge) by extending the array of coupling lightguides past the lateral edge of the light emitting region and/or extending the light mixing region past the lateral edge of the light emitting region. In a further embodiment, a lateral edge of the light mixing region, a lateral edge of one or more coupling lightguides, or an interior light directing edge is oriented at a first extended orientation angle to the extended direction of the coupling lightguides to direct light from the extended region of the array of coupling lightguides or the light mixing region toward the light emitting region of the film-based lightguide. In one embodiment, the first extended orientation angle is greater than one selected from the group: 0, 2, 5, 10, 20, 30, 45, and 60 degrees. For example, in one embodiment, the array of coupling lightguides includes a coupling lightguide that extends past the far lateral edge (the edge furthest from the light source) of the light emitting area and the light mixing region includes a lateral edge with an extended orientation angle of 30 degrees. In this embodiment, the far coupling lightguides are longer in length, and thus more light is absorbed through the material. One method of compensation for the light flux difference reaching the far edge region of the light emitting area due to the longer path length of light traveling toward the far edge region of the light emitting area is to add an additional coupling lightguide that can receive a distributed portion of the light from the light source and direct it into the far edge region of the light emitting area by an angled lateral edge in the extended coupling lightguide, the light mixing region, or an interior light directing edge.

Housing or Holding Device for Light Input Coupler

In one embodiment, a light emitting device includes a housing or holding device that holds or includes at least part of a light input coupler and light source. The housing or holding device may house or contain within at least one selected from the group: light input coupler, light source, coupling lightguides, lightguide, optical components, electrical components, heat sink or other thermal components, attachment mechanisms, registration mechanisms, folding mechanisms devices, and frames. In another embodiment, the housing includes at least one curved surface. A curved surface can permit non-linear shapes or devices or facilitate incorporating non-planer or bent lightguides or coupling lightguides. In one embodiment, the housing includes a thermal transfer element disposed to transfer heat from a component within the housing to an outer surface of the housing. In another embodiment, the thermal transfer element is one selected from the group: heat sink, metallic or ceramic element, fan, heat pipe, synthetic jet, air jet producing actuator, active cooling element, passive cooling element, rear portion of a metal core or other conductive circuit board, thermally conductive adhesive, or other component known to thermally conduct heat.

Cladding Layer

In one embodiment, at least one of the light input coupler, coupling lightguide, light mixing region, lightguide region, and lightguide includes a cladding layer optically coupled to at least one surface. A cladding region, as used herein, is a layer optically coupled to a surface wherein the cladding layer includes a material with a refractive index, naiad, less than the refractive index of the material, nm, of the surface to which it is optically coupled. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material. In one embodiment, the cladding region is optically coupled to one or more of the following: a lightguide, a lightguide region, a light mixing region, one surface of the lightguide, two surfaces of the lightguide, a light input coupler, coupling lightguides, and an outer surface of the film. In another embodiment, the cladding is disposed in optical contact with the lightguide, the lightguide region, or a layer or layers optically coupled to the lightguide and the cladding material is not disposed on one or more coupling lightguides.

In one embodiment, the cladding is one selected from the group: methyl-based silicone pressure sensitive adhesive, fluoropolymer material (applied using a coating including a fluoropolymer substantially dissolved in a solvent), and a fluoropolymer film. The cladding layer may be incorporated to provide a separation layer between the core or core part of a lightguide region and the outer surface to reduce undesirable out-coupling (for example, frustrated totally internally reflected light by touching the film with an oily finger) from the core or core region of a lightguide. Components or objects such as additional films, layers, objects, fingers, dust etc. that come in contact or optical contact directly with a core or core region of a lightguide may couple light out of the lightguide, absorb light or transfer the totally internally reflected light into a new layer. By adding a cladding layer with a lower refractive index than the core, a portion of the light will totally internally reflect at the core-cladding layer interface. Cladding layers may also be used to provide the benefit of at least one of increased rigidity, increased flexural modulus, increased impact resistance, anti-glare properties, provide an intermediate layer for combining with other layers such as in the case of a cladding functioning as a tie layer or a base or substrate for an anti-reflection coating, a substrate for an optical component such as a polarizer, liquid crystal material, increased scratch resistance, provide additional functionality (such as a low-tack adhesive to bond the lightguide region to another element, a window "cling type" film such as a highly plasticized PVC). The cladding layer may be an adhesive, such as a low refractive index silicone adhesive which is optically coupled to another element of the device, the lightguide, the lightguide region, the light mixing region, the light input coupler, or a combination of one or more of the aforementioned elements or regions. In one embodiment, a cladding layer is optically coupled to a rear polarizer in a backlit liquid crystal display. In another embodiment, the cladding layer is optically coupled to a polarizer or outer surface of a front-lit display such as an electrophoretic display, e-book display, e-reader display, MEMs type display, electronic paper displays such as E-ink® display by E Ink Corporation, reflective or partially reflective LCD display, cholesteric display, or other display capable of being illuminated from the front. In another embodiment, the cladding layer is an adhesive that bonds the lightguide or lightguide region to a component such as a substrate (glass or polymer), optical element (such as a polarizer, retarder film, diffuser film, brightness enhancement film, protective film (such as a protective polycarbonate film), the light input coupler, coupling lightguides, or other element of the light emitting device. In one embodiment, the cladding layer is separated from the lightguide or lightguide region core layer by at least one additional layer or adhesive.

In one embodiment, the cladding region is optically coupled to one or more surfaces of the light mixing region to prevent out-coupling of light from the lightguide when it is in contact with another component. In this embodiment, the cladding also enables the cladding and light mixing region to be physically coupled to another component.

Cladding Location

In one embodiment, the cladding region is optically coupled to at least one selected from the group: lightguide, lightguide region, light mixing region, one surface of the lightguide, two surfaces of the lightguide, light input coupler, coupling lightguides, and an outer surface of the film. In another embodiment, the cladding is disposed in optical contact with the lightguide, lightguide region, or layer or layers optically coupled to the lightguide and the cladding material is not disposed on one or more coupling lightguides. In one embodiment, the coupling lightguides do not include a cladding layer between the core regions in the region near the light input surface or light source. In a one embodiment, the average thickness of one or both cladding layers of the lightguide is less than one selected from the group: 100 microns, 60 microns, 30 microns, 20 microns, 10 microns, 6 microns, 4 microns, 2 microns, 1 micron, 0.8 microns, 0.5 microns, 0.3 microns, and 0.1 microns. In one embodiment, the cladding layer includes an adhesive such as a silicone-based adhesive, acrylate-based adhesive, epoxy, radiation curable adhesive, UV curable adhesive, or other light transmitting adhesive. Fluoropolymer materials may be used as a low refractive index cladding material and may be broadly categorized into one of two basic classes. In one embodiment, the cladding material is birefringent and the refractive index in at least a first direction is less than refractive index of the lightguide region, lightguide core, or material to which it is optically coupled. In another embodiment, the cladding includes a material with an effective refractive index less than the core layer due to microstructures or nanostructures. In another embodiment, the cladding layer includes a porous region including air or other gas or material with a refractive index less than 1.2 such that the effective refractive index of the cladding layer is than that of the material around the porous regions. For example, in one embodiment, the cladding layer is an aerogel or arrangement of nano-structured materials disposed on the core layer that creates a cladding layer with an effective refractive index less than the core layer. In one embodiment, the nanostructured material includes fibers, particles, or domains with an average diameter or dimension in the plane parallel to the core layer surface or perpendicular to the core layer surface less than one selected from the group: 1000, 500, 300, 200, 100, 50, 20, 10, 5, and 2 nanometers. For example, in one embodiment, the cladding layer is a coating including nanostructured fibers, including polymeric materials such as, without limitation, cellulose, polyester, PVC, PTFE, polystyrene, PMMA, PDMS, or other light transmitting or partially light transmitting materials. In another embodiment, materials that normally scattering too much light in bulk form (such as HDPE or polypropylene) to be used as a core or cladding material for lightguide lengths greater than 1 meter (such as scattering greater than 10% of the light out of the lightguide over the 1 meter length) are used in a nanostructured form. For example, in one embodiment, the nanostructured cladding material on the film based lightguide, when formed into a bulk solid form (such as a 200 micron thick homogeneous film formed without mechanically formed physical structures volumetrically or on the surface under film processing conditions designed to minimize haze substantially) has an ASTM haze greater than 0.5%.

Lightguide Configuration and Properties

In one embodiment, the thickness of the film, light redirecting optical element, reflective display, lightguide, and/or lightguide region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, a greater than 90% of the entire thickness of the film, a lightguide, and a lightguide region is less than 0.2 millimeters.

Optical Properties of the Lightguide or Light Transmitting Material

With regards to the optical properties of lightguides, light redirecting optical element or region, light extraction film or region, or light transmitting materials for certain embodiments, the optical properties specified herein may be general properties of the lightguide, the core, the cladding, or a combination thereof or they may correspond to a specific region (such as a light emitting region, light mixing region, or light extracting region), surface (light input surface, diffuse surface, flat surface), and direction (such as measured normal to the surface or measured in the direction of light travel through the lightguide).

Refractive Index of the Light Transmitting Material

In one embodiment, the core material of the lightguide has a higher refractive index than the cladding material. In one embodiment, the core is formed from a material with a refractive index ($n_D$) greater than one selected from the group: 1.3, 1.4, 1.5, 1.6, 1.7, 1.8, 1.9, 2.0, 2.1, 2.2, 2.3, 2.4, 2.5, 2.6, 2.7, 2.8, 2.9, and 3.0. In another embodiment, the refractive index ($n_D$) of the cladding material is less than one selected from the group: 1.1, 1.2, 1.3, 1.4, 1.5, 1.6, 1.7, 1.8, 1.9, 2.0, 2.1, 2.2, 2.3, 2.4, and 2.5.

Shape of the Lightguide

In one embodiment, at least a portion of the lightguide shape or lightguide surface is substantially planar, curved, cylindrical, a formed shape from a substantially planar film, spherical, partially spherical, angled, twisted, rounded, have a quadric surface, spheroid, cuboid, parallelepiped, triangular prism, rectangular prism, ellipsoid, ovoid, cone pyramid, tapered triangular prism, wave-like shape, and/or other known suitable geometrical solids or shapes.

Thickness of the Lightguide

In one embodiment, the thickness of the film, lightguide, lightguide region, and/or light emitting region is within a range of 0.005 mm to 0.5 mm. In another embodiment, the thickness of the film or lightguide is within a range of 0.025 mm (0.001 inches) to 0.5 mm (0.02 inches). In a further embodiment, the thickness of the film, lightguide and/or lightguide region is within a range of 0.050 mm to 0.175 mm. In one embodiment, the thickness of the film, lightguide or lightguide region is less than 0.2 mm or less than 0.5 mm. In one embodiment, one or more of a thickness, a largest thickness, an average thickness, greater than 90% of the entire thickness of the film, a lightguide, and a lightguide region is less than 0.2 millimeters. In one embodiment, the separation between the two surfaces of the core layer or region of the lightguide in the light emitting region deviates from the average separation by less than one selected from the group of 30%, 20%, 10%, and 5% of the average separation. In another embodiment, the separation distance between the two surfaces defining the total internal reflection surfaces for the lightguide within the light emitting region deviates from the average separation distance by less than one selected from the group of 30%, 20%, 10%, and 5% of the average separation distance. In one embodiment, the average angle between the two surfaces defining the total internal reflection surfaces for the lightguide within the light emitting region is less than one selected from the group of 10, 8, 6, 5, 4, 3, 2, 1 and 0.5 degrees.

In one embodiment, the light emitting region tapers from a first thickness at a first side of the light emitting region receiving light from the light mixing region and/or the light input coupler to a second thickness less than the first thickness at an opposite side of the light emitting region along the direction of propagation of the light within the core region or layer of the lightguide in the light emitting region. In one embodiment, the average angle of the taper, the average angle between the two opposite layer surfaces or regions of the core layer of the lightguide from the first side to the second side, is less than one selected from the group 10, 8, 6, 5, 4, 3, 2, 1, and 0.5 degrees.

In another embodiment the light emitting region comprises one or more regions or layers optically coupled to the core region of the film-based lightguide that increase the effective thickness of the lightguide defined by the interfaces that define the total internal reflection of light propagating from the first end to the opposite end of the lightguide in the light emitting region. In another embodiment, the ratio of the average thickness of the light emitting region defined by the interfaces that define the total internal reflection of light propagating from the first end to the opposite end of the light emitting region to the average thickness of the light mixing region is greater than one or more selected from the group: 1, 2, 5, 10, 15, 20, 25, 30, 40, and 50. In another embodiment the light emitting region comprises one or more regions or layers optically coupled to the core region of the film-based lightguide that increase the effective thickness of the lightguide defined by the interfaces that define the total internal reflection of light propagating lightguide from the first end to the opposite end of the light emitting region.

In another embodiment, a light emitting device (such as a frontlight for a reflective display, for example) comprises a film-based lightguide with the surfaces of the film defining a first lightguide and the first lightguide is optically coupled to a light redirecting optical element or other film and one or more surfaces of the light redirecting optical element or other film in combination with a surface of the first lightguide define a second lightguide, wherein the second lightguide may comprise the first lightguide. In this embodiment, the ratio of the average thickness of the light emitting region defined by the interfaces that define the total internal reflection of light propagating from the first end to the opposite end of the light emitting region of the second lightguide or first lightguide to the average thickness of the light mixing region or the film is greater than one or more selected from the group: 1, 2, 5, 10, 15, 20, 25, 30, 40, and 50. In another embodiment, the ratio of the largest dimension of the light emitting area of the first lightguide or second lightguide in a plane orthogonal to the thickness direction of the light emitting surface or region of the light emitting surface (parallel to a surface of the core layer) to the average thickness of the first lightguide or second lightguide in the light emitting region is greater than one or more selected from the group: 1, 2, 5, 10, 15, 20, 25, 30, 40, 50.100, 200, 300, 500, 700, 1000, and 2000.

In one embodiment, a reflective display comprises a lightguide wherein an effective thickness of the lightguide bounded by total internal reflection interfaces is increased for totally internally reflected light within the core layer that is frustrated by the plurality of light extraction features such that it passes through the first cladding layer and totally internally reflects at one of the total internal reflection interfaces of a light redirecting optical element. In another embodiment, a light emitting device comprises a first lightguide having a core layer having opposing surfaces with a thickness not greater than about 0.5 millimeters therebetween, the first lightguide defined by the opposing surfaces guiding light by total internal reflection, and a second lightguide comprising the core layer, the second lightguide defined by a second portion of the frustrated totally internally reflected light from the first lightguide propagating by total internal reflection between a surface of the first lightguide and an area of the surface of the light redirecting optical element between the light redirecting features. In a further embodiment, a first lightguide and a second lightguide comprise the core layer, the second lightguide defined by a portion of the frustrated totally internally reflected light from the first lightguide propagating by total internal reflection between a surface of the first lightguide and an area of a surface of the light redirecting optical element, wherein the light redirecting features of a light redirecting optical element occupy less than 50% of the surface of the light redirecting optical element, the area of the surface of the light redirecting element is defined between the light redirecting features and reflects by total internal reflection a second portion of the frustrated totally internally reflected light from the light extraction features back through a first cladding layer and into a core layer of the first lightguide where it totally internally reflects from the surface of the first lightguide and is subsequently reflected by a light redirecting feature toward a reflective spatial light modulator.

Lightguide Material

In one embodiment, a light emitting device includes a lightguide or lightguide region formed from at least one light transmitting material. In one embodiment, the lightguide is a film includes at least one core region and at least one cladding region, each including at least one light transmitting material. In one embodiment, the light transmitting material is a thermoplastic, thermoset, rubber, polymer, high transmission silicone, glass, composite, alloy, blend, silicone, or other suitable light transmitting material, or a combination thereof. In one embodiment, a component or region of the light emitting device includes a suitable light transmitting material, such as one or more of the following: cellulose derivatives (e.g., cellulose ethers such as ethylcellulose and cyanoethylcellulose, cellulose esters such as cellulose acetate), acrylic resins, styrenic resins (e.g., polystyrene), polyvinyl-series resins [e.g., poly(vinyl ester) such as poly(vinyl acetate), poly(vinyl halide) such as poly(vinyl chloride), polyvinyl alkyl ethers or polyether-series resins such as poly(vinyl methyl ether), poly(vinyl isobutyl ether) and poly(vinyl t-butyl ether)], polycarbonate-series resins (e.g., aromatic polycarbonates such as bisphenol A-type polycarbonate), polyester-series resins(e.g., homopolyesters, for example, polyalkylene terephthalates such as polyethylene terephthalate and polybutylene terephthalate, polyalkylene naphthalates corresponding to the polyalkylene terephthalates; copolyesters including an alkylene terephthalate and/or alkylene naphthalate as a main component; homopolymers of lactones such as polycaprolactone), polyamide-series resin (e.g., nylon 6, nylon 66, nylon 610), urethane-series resins (e.g., thermoplastic polyurethane resins), copolymers of monomers forming the above resins [e.g., styrenic copolymers such as methyl methacrylate-styrene copolymer (MS resin), acrylonitrile-styrene copolymer (AS resin), styrene-(meth)acrylic acid copolymer, styrene-maleic anhydride copolymer and styrene-butadiene copolymer, vinyl acetate-vinyl chloride copolymer, vinyl alkyl ether-maleic anhydride copolymer]. Incidentally, the copolymer may be whichever of a random copolymer, a block copolymer, or a graft copolymer.

Lightguide Material with Adhesive Properties

In another embodiment, the lightguide includes a material with at least one selected from the group: chemical adhesion, dispersive adhesion, electrostatic adhesion, diffusive adhesion, and mechanical adhesion to at least one element of the light emitting device (such as a carrier film with a coating, an optical film, the rear polarizer in an LCD, a brightness enhancing film, another region of the lightguide, a coupling lightguide, a thermal transfer element such as a thin sheet including aluminum, or a white reflector film). In a further embodiment, at least one of the core material or cladding material of the lightguide is an adhesive material. In a further embodiment, at least one selected from the group: core material, cladding material, and a material disposed on a cladding material of the lightguide is at least one selected from the group: a pressure sensitive adhesive, a contact adhesive, a hot adhesive, a drying adhesive, a multi-part reactive adhesive, a one-part reactive adhesive, a natural adhesive, and a synthetic adhesive.

Multilayer Lightguide

In one embodiment, the lightguide includes at least two layers or coatings. In another embodiment, the layers or coatings function as at least one selected from the group: a core layer, a cladding layer, a tie layer (to promote adhesion between two other layers), a layer to increase flexural strength, a layer to increase the impact strength (such as Izod, Charpy, Gardner, for example), and a carrier layer. In a further embodiment, at least one layer or coating includes a microstructure, surface relief pattern, light extraction features, lenses, or other non-flat surface features which redirect a portion of incident light from within the lightguide to an angle whereupon it escapes the lightguide in the region near the feature. For example, the carrier film may be a silicone film with embossed light extraction features disposed to receive a thermoset polycarbonate resin core region including a thermoset material. In one embodiment, a thermoset material is coated onto a thermoplastic film wherein the thermoset material is the core material and the cladding material is the thermoplastic film or material. In another embodiment, a first thermoset material is coated onto a film including a second thermoset material wherein the first thermoset material is the core material and the cladding material is the second thermoset plastic.

Light Extraction Method

In one embodiment, one or more of the lightguide, the lightguide region, and the light emitting region includes at least one light extraction feature or region. In one embodiment, the light extraction region may be a raised or recessed surface pattern or a volumetric region. Raised and recessed surface patterns include, without limitation, scattering material, raised lenses, scattering surfaces, pits, grooves, surface modulations, microlenses, lenses, diffractive surface features, holographic surface features, photonic bandgap features, wavelength conversion materials, holes, edges of layers (such as regions where the cladding is removed from covering the core layer), pyramid shapes, prism shapes, and other geometrical shapes with flat surfaces, curved surfaces, random surfaces, quasi-random surfaces, and combinations thereof. The volumetric scattering regions within the light extraction region may include dispersed phase domains, voids, absence of other materials or regions (gaps, holes), air gaps, boundaries between layers and regions, and other refractive index discontinuities or inhomogeneities within the volume of the material different that co-planar layers with parallel interfacial surfaces.

In one embodiment, the light extraction feature is substantially directional and includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, an extruded mixture, a blended materials, an alloy of materials, a composite of symmetric or asymmetrically shaped materials, a laser ablated surface feature, an embossed surface feature, a coated surface feature, an injection molded surface feature, an extruded surface feature, and one of the aforementioned features disposed in the volume of the lightguide. For example, in one embodiment, the directional light extraction feature is a 100 micron long, 45-degree angled facet groove formed by UV cured embossing a coating on the lightguide film that substantially directs a portion of the incident light within the lightguide toward 0 degrees from the surface normal of the lightguide.

In one embodiment, the light extraction feature is a specularly, diffusive, or a combination thereof reflective material. For example, the light extraction feature may be a substantially specularly reflecting ink disposed at an angle (such as coated onto a groove) or the light extraction feature may be a substantially diffusely reflective ink such as an ink including titanium dioxide particles within a methacrylate-based binder. In one embodiment, the thin lightguide film permits smaller features to be used for light extraction features or light extracting surface features to be spaced further apart due to the thinness of the lightguide. In one embodiment, the average largest dimensional size of the light extracting surface features in the plane parallel to the light emitting surface corresponding to a light emitting region of the light emitting device is less than one selected from the group of 3 mm, 2 mm, 1 mm, 0.5 mm, 0.25 mm, 0.1 mm, 0.080, 0.050 mm, 0.040 mm, 0.025 mm, and 0.010 mm.

In another embodiment, the fill factor of the light extracting features, light turning features, or low angle directing features defined as the percentage of the area comprising the features in a square centimeter in a light emitting region, surface or layer of the lightguide or film, is one selected from the group of less than 80%, less than 70%, less than 60%, less than 50%, less than 40%, less than 30%, less than 20%, and less than 10%. The fill factor can be measured within a full light emitting square centimeter surface region or area of the lightguide or film (bounded by region is all directions within the plane of the lightguide which emit light) or it may be the average of the light emitting areas of the lightguides. The fill factor may be measured when the light emitting device is in the on state or in the off state (not emitting light) where in the off state, the light extracting features are defined as visual discontinuities seen by a person with average visual acuity at a distance of less than 10 cm.

The pattern or arrangement of light extraction features may vary in size, shape, pitch, location, height, width, depth, shape, orientation, in the x, y, or z directions. Patterns and formulas or equations to assist in the determination of the arrangement to achieve spatial luminance or color uniformity are known in the art of edge-illuminated backlights. In one embodiment, a light emitting device comprises a film-based lightguide comprising light extraction features disposed beneath lenticules wherein the light extraction features are substantially arranged in the form of dashed lines beneath the lenticules such that the light extracted from the line features has a lower angular Full Width at Half Maximum (FWHM) intensity after redirection from the lenticular lens array light redirecting element and the length of the dashes varies to assist with the uniformity of light extraction. In another embodiment, the dashed line pattern of the light extraction features varies in the x and y directions (where the z direction is the optical axis of the light emitting device). Similarly, a two-dimensional microlens array film (closepacked or regular array) or an arrangement of microlenses may be used as a light redirecting element and the light extraction features may comprise a regular, irregular, or other arrangement of circles, ellipsoidal shapes, or other pattern or shape that may vary in size, shape, or position in the x direction, y direction, or a combination thereof. In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density of the low angle directing features in the first and/or second direction is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In another embodiment, the low angle directing features are light extraction features for a first lightguide and a second lightguide. In another embodiment, the light emitting device comprises low angle directing features in two or more layers or regions in the direction of the light output of the light emitting device.

Aligned Extraction Features

In one embodiment, the arrangement of light extraction features is aligned with one or more color filters, such as the color filters in an array of color filters. In one embodiment, the light extraction features are aligned and positioned within an illumination volume defined by the lateral edges of the color filters in an array of color filters or spatial light modulating pixels and the thickness of the light emitting device in a direction normal to the light emitting area surface. In another embodiment, the light extraction features are aligned and positioned within an illumination volume defined by the lateral edges of the color filters in the array of color filters or the spatial light modulating pixels and a direction parallel to the angle of peak intensity of light exiting the lightguide from the light extraction features. For example, in one embodiment, a light emitting display includes a film-based frontlight emitting light into a cladding or air region from light extraction features with an angle of peak intensity of 60 degrees from the normal to the light emitting area surface in air or the cladding and the arrangement of light extraction features are within the illumination volume defined by the lateral edges (parallel to the surface of the film) of the color filters in the array of color filters and extending at an angle (above or below the lightguide) of 60 degrees from the light exiting the lightguide where the angle is measured within the cladding (or air if air is the cladding) or within a component or substrate of a component adjacent the core region. In one embodiment, more than one percentage selected from the group: 50%, 60%, 70%, 80%, 90%, and 95% of the light extraction features are aligned and positioned within the illumination volume defined by the lateral edges of the color filters in the array of color filters or spatial light modulating pixels, and a direction normal to the light emitting area surface or a direction parallel to the angle of peak intensity of the light exiting the lightguide region due to the light extraction features. In another embodiment, less than one selected from the group of 50%, 40%, 30%, 20%, 10% and 5% of the light extraction features are positioned within the volume defined outside of the lateral edges of the color filters in an array of color filters or spatial light modulating pixels, and the direction normal to the light emitting area surface or the direction parallel to the angle of peak intensity of the light exiting the lightguide region. In one embodiment, the light extraction features are positioned such that the percentage of light exiting the lightguide in the light emitting area corresponding to the active area of the display that reaches the light transmitting color filters in the array of color filters or the light modulating regions of the display pixels is greater than the fill factor percentage of the array of color filters or the array of spatial light modulating pixels, respectively. In a further embodiment, the light extraction features are positioned such that a visible Moiré pattern is not introduced into the system due to the arrangement of light extraction features, color filters and/or pixels. Moiré patterns and methods for avoiding or reducing their visibility are known in the display industry and are detailed, for example in U.S. Pat. Nos. 6,333,817 and 5,684,550. In another embodiment, the illumination volume includes an average of one light extraction feature per color filter or pixel. In another embodiment, the illumination volume includes at least an average of one selected from the group: 2, 3, 4, 5, 6, 7, 8, 9, 10, 15, 20, and 30 light extraction features per color filter in an array of color filters or spatial light modulating pixel in a spatial array of light modulating pixels.

Low Angle Directing Features

In one embodiment, at least one of the coupling lightguides, light mixing region, or light emitting region comprises two or more low angle directing features. As used herein, low angle directing features are refractive, total internal reflection, diffractive, or scattering surfaces, features, or interfaces that redirect light propagating within a totally internally reflecting lightguide at a first angle to the thickness direction of the film in the core region of the lightguide to a second angle in the core region of the lightguide smaller than the first angle by an average total angle of deviation of less than 20 degrees. In another embodiment, the low angle directing features redirect incident light to a second angle with an average total angle of deviation less than one selected from the group 18, 16, 14, 12, 10, 8, 6, 5, 4, 3, 2, and 1 degrees from the angle of incidence. In one embodiment, the low angle directing features are defined by one or more reflective surfaces of the reflective spatial light modulator. For example, in one embodiment, the rear reflective surface of a reflective spatial light modulator comprises low angle directing features and the reflective spatial light modulator is optically coupled to the lightguide in the light emitting region. In another example, the reflective pixels of a reflective spatial light modulator are low angle directing features and the reflective spatial light modulator is optically coupled to the lightguide in the light emitting region.

In one embodiment, at least one of the pitch, first dimension of the feature in a first direction perpendicular to the thickness direction of the film, second dimension of the feature in a second direction perpendicular to the first direction and perpendicular to the thickness direction of the film; dimension of the feature in the thickness direction; and density of the features in the first direction and/or second direction varies in the first direction and/or second direction. In one embodiment, the non-uniform pitch, feature dimension, or density is used to direct light to an angle less than the critical angle for one or more interfaces of the core region of the lightguide with a spatially uniform luminous flux such that the light coupling through the cladding layer or region with the higher refractive index than the cladding layer or region on the opposite surface of the core region of the lightguide is incident on one or more light turning features that direct the light to an angular range within thirty degrees from the thickness direction of the lightguide in the light emitting region. In one embodiment, varying the pitch, feature dimension, or density of the low angle directing features in the first and/or second direction enables spatial control of the light flux redirected toward the light turning features wherein the low angle directing features do not cause moiré interference with the object being illuminated by the light emitting device (such as a reflective or transmissive liquid crystal display). Thus, in this example, the pitch of the light turning features can be chosen to be a constant pitch that does not create moiré interference and the luminance uniformity of the light reaching the object of illumination is achieved by spatially varying the pitch, feature dimension, or density of the low angle directing features. In one embodiment, a method of providing uniform illuminance for an object includes providing a plurality of types of light directing features (such as low angle directing features and light turning features) wherein the uniformity is provided by varying the pitch, dimension, or density of a first type of feature and the redirection of light to an angle that escapes the lightguide to illuminate an object (such as a reflective or transmissive LCD) is achieved by a second type of feature with a substantially constant pitch, dimension, and/or density such that the moiré contrast between the light directing features and the object of illumination is less than one selected from the group of 50%, 40%, 30%, 20% and 10%. The low angle directing feature may be formed on a surface or within a volume of material and the material may be thermoplastic, thermoset, or adhesive material. In one embodiment, the low angle directing features are light extraction features. In a further embodiment, the light redirecting features are low angle directing features. In another embodiment, the low angle directing features are light extraction features for a first lightguide and a second lightguide. In another embodiment, the light emitting device comprises low angle directing features in two or more layers or regions in the direction of the light output of the light emitting device.

In one embodiment, the light redirecting element has a refractive index less than or equal to the refractive index of the core layer of the film-based lightguide. For example, in one embodiment a reflective display comprises a frontlight having a light redirecting element formed in a polycarbonate material with a refractive index of about 1.6 that is optically coupled to a polycarbonate lightguide with a refractive index of about 1.6 using an adhesive functioning as a cladding layer with a refractive index of about 1.5 where the lightguide comprises low angle directing features that are light extracting features for the film-based lightguide and the lightguide is optically coupled to a reflective spatial light modulator on a side opposite the light redirecting optical element using an adhesive that functions as a cladding with a refractive index of about 1.42.

In one embodiment, a light emitting device comprises a film-based lightguide comprising a core layer having opposing surfaces with a thickness not greater than about 0.5 millimeters therebetween wherein light propagates by total internal reflection between the opposing surfaces; a first cladding layer having a first side optically coupled to the core layer and an opposing second side; an array of coupling lightguides continuous with a lightguide region of the lightguide, each coupling lightguide of the array of coupling lightguides terminates in a bounding edge, and each coupling lightguide is folded in a fold region such that the bounding edges of the array of coupling lightguides are stacked; a light emitting region comprising a plurality of light extraction features arranged in a pattern that varies spatially in the light emitting region, the plurality of light extraction features frustrate totally internally reflected light propagating within the core layer such that light exits the core layer in the light emitting region into the first cladding layer; a light source positioned to emit light into the stacked bounding edges, the light propagating within the array of coupling lightguides to the lightguide region, with light from each coupling lightguide combining and totally internally reflecting within the lightguide region; a light redirecting optical element optically coupled to the second side of the first cladding layer, the light redirecting optical element comprising light redirecting features that direct frustrated totally internally reflected light from the light extraction features toward the reflective spatial light modulator, the light redirecting features occupy less than 50% of a surface of the light redirecting optical element in the light emitting region, and wherein the core layer has an average thickness in the light emitting region, the light emitting region has a largest dimension in a plane of the light emitting region orthogonal to the thickness direction of the core layer, the largest dimension of the light emitting region divided by the average thickness of the core layer in the light emitting region is greater than 100, the light extraction features are low angle directing features, the light exiting the light source has a first full angular width at half maximum intensity in a plane orthogonal to the thickness direction of the film, the light exiting the light emitting device has second full angular width at half maximum intensity in a second plane parallel to the thickness direction and a third full angular width at half maximum intensity in a third plane parallel to the thickness direction of the film and orthogonal to the second plane. In one embodiment, the first full angular width at half maximum intensity is less than one selected from the group: 1, 2, 5, 7, 10, 15, 20, 25, 30, 35, 40, 45, and 50 degrees. In another embodiment, the second full angular width at half maximum intensity is less than one selected from the group: 1, 2, 5, 7, 10, 15, 20, 25, 30, 35, 40, 45, and 50 degrees. In another embodiment, the third full angular width at half maximum intensity is less than one selected from the group: 1, 2, 5, 7, 10, 15, 20, 25, 30, 35, 40, 45, and 50 degrees. In another embodiment, the first, second, and third full angular widths are each less than one selected from the group 1, 2, 5, 7, 10, 15, 20, 25, 30, 35, 40, 45, and 50 degrees. In one embodiment, the light exiting the light source has a full angular width at half maximum intensity in a plane parallel to the thickness direction of the film greater than the first full angular width. For example, in one embodiment, a light source is substantially collimated in a plane perpendicular to the thickness direction of the lightguide, film, or stack of coupling lightguides, in the light emitting region (or has a first angular width at half maximum intensity less than 10 degrees) and is not collimated or has a larger full angular width at half maximum intensity in the plane parallel to the thickness direction of the film or stack of coupling lightguides. In one embodiment, light from the light sources passes through the coupling lightguides and into the lightguide region, it is redirected by the low angle directing features, passes through the first cladding layer, is redirected by the light redirecting optical element and exits the light emitting device with second angular full width at half maximum intensity that can be low (such as less than 10 degrees) due to the collimation of the light source output (such as by a primary and/or secondary lens or reflector) and a third angular full width at half maximum intensity that can be low (such as less than 10 degrees) due to the collimation from the combination of the low angle directing features, the difference in refractive index between the two cladding layers, and the light redirecting features of the light redirecting optical element.

Reflecting Low Angle Directing Features

In one embodiment, a film-based lightguide comprises a light emitting region with low angle directing features defined by angled or curved interfaces between materials with two different refractive indexes. In this embodiment, the refractive index difference can cause at least a portion of the incident light to be reflected with an average total angle of deviation less than 20 degrees from the angle of incidence. In one embodiment, light propagating within a core region of a lightguide of a first core material with a first core refractive index adjacent a region with a second refractive index less than the first refractive index interacts and reflects from angled surface features embossed into the first core material such that at least a portion of the incident light is reflected with an average total angle of deviation less than 20 degrees from the angle of incidence.

In one embodiment, the reflection at the angled or curved surface feature is a total internal reflection. For example, in one embodiment, a film-based lightguide comprises a light emitting region with low angle directing features defined by an arrangement of linear surface features angled at an average of 4 degrees from the direction parallel to the film surface (or core region layer interface) in the light emitting region (an average of 86 degrees from the surface normal of the film in the light emitting region). In this example, the surfaces can be formed (such as by scribing or embossing) in the core layer of material and a material with a lower refractive index may be positioned adjacent the surface such that a portion of the light incident on the surface is reflected (low angle directed) at a total angle of deviation of 8 degrees.

Refractive Low Angle Directing Features

In another example, a film-based lightguide comprises a light emitting region with low angle directing features defined by an arrangement of surfaces wherein light passing through the surface is refracted (and optionally reflected) at least once to a new angle with an average total angle of deviation less than 20 degrees from the angle of incidence. In this example, the surfaces can be formed in the core layer of material and have a material with a lower refractive index adjacent the surface such that a portion of the light incident on the surface is refracted (low angle directed) at the interface, passes through the lower refractive index material and reflects off a second interface, passes back through the lower refractive index material and back through the lightguide where it may escape the lightguide at the opposite surface interface and be subsequently redirected by light turning features.

Diffracting Low Angle Directing Features

In another example, a film-based lightguide comprises a light emitting region with low angle directing features defined by an arrangement of diffractive features or surfaces wherein light passing through the features or surfaces is diffracted (and optionally reflected) at least once to a new angle with an average total angle of deviation less than 20 degrees from the angle of incidence. For example, in one embodiment, one surface of the film-based lightguide in the light emitting region of the film comprises binary gratings or blazed diffraction gratings that redirect light incident at a first angle within a first wavelength bandwidth to a second angle different from the first angle with an average total angle deviation less than 20 degrees from the angle of incidence. In one embodiment, the pitch, size, length size, depth, or angle of the one or more diffractive features or surfaces varies in a first direction from the first side of the light emitting region to the opposite side in the direction of light propagation within the light emitting region. For example, in one embodiment, the core region of the lightguide in the light emitting region comprises diffraction gratings with a repeating array of first, second, and third pitches configured to diffract the average angle of incident light into average total angle deviations less than 20 degrees for blue, green, and red light, respectively.

Scattering Low Angle Directing Features

In a further example, a film-based lightguide comprises a light emitting region with low angle directing features defined by a layer or region with light scattering features, domains, or particles wherein light passing through the light scattering layer or region is scattered at least once to a new angle with an average total angle of deviation less than 20, 15, 10, 8, 6, 4, 3, 2, or 1 degrees from the angle of incidence. In one embodiment, the light scattering layer or region can be formed adjacent, above, below, or within a region of the core layer of material. In this example, the light scattering layer or region may comprise or be defined by a light scattering interface with a regular or irregular surface structure on a first material with a first refractive index in contact with a second surface of a second material conforming to the first material surface with a lower or higher refractive index than the first material such that a portion of the light incident on the interface is scattered (forward and/or back scattering) such that it escapes the lightguide at a surface interface and is subsequently redirected by light turning features. In another embodiment, the film-based lightguide comprises low angle scattering features defined by a dispersed phase of a first material in a second matrix material (such as dispersed beads within a coating matrix). In this embodiment, the light incident scatters or refracts from one or more domain-matrix interfaces such that the average total angle of deviation of the incident light is less than 20 degrees from the angle of incidence. In one embodiment, the low angle directing features progressively redirect light such that the light is deviated into an angle such that all or a portion of the light escapes the total internal reflection condition within the lightguide.

Polarization Dependent Low Angle Directing Features

In one embodiment, the low angle directing features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light and the second polarization is p-polarized light. In one embodiment, the low angle directing features or surface, or a material optically coupled to the low angle directing features or surface comprise a substantially isotropic material, a birefringent material, or a trirefringent material. In one embodiment, a structured low angle directing feature in a birefringent material is used to redirect light of a first polarization such that the average total angle of deviation of the incident light is less than 20 degrees from the angle of incidence. For example, in one embodiment, light of the first polarization, such as s-polarized light, is directed into a low angle such that it is at an angle less than the critical angle for the side of the lightguide optically coupled to the cladding layer with a higher refractive index than the cladding layer on the opposite side. Thus, in this example, light of the desired polarization state, s-polarized light, is preferentially extracted by the low angle directing features. In another embodiment, one or more layers or regions optically coupled to the lightguide comprises a waveplate, birefringent material, trirefringent material, or anisotropic material that converts light remaining in the lightguide into the desired polarization state such that it can be redirected through a second or subsequent interaction with the polarization dependent low angle directing feature.

Light Turning Features

In one embodiment, the light emitting region of the lightguide comprises or is optically coupled to a layer or region with light turning features. As used herein, light turning features are refractive, total internal reflection, diffractive, or scattering surfaces, features, or interfaces that redirect at least a portion of light incident within a first angular range to a second angular range different from the first, wherein the second angular range is within 30 degrees from the thickness direction of the film in the light emitting region. For example, in one embodiment, a polycarbonate film with grooves on a first outer surface is optically coupled to a film-based lightguide using a pressure sensitive adhesive on the second surface of the polycarbonate film opposite the first outer surface. In this embodiment, light escaping the lightguide (such as by low angle directing features) through the pressure sensitive adhesive totally internally reflects at the groove-air interface in the polycarbonate film and is directed to an angle within 30 degrees from the thickness direction of the film in the light emitting region where it further passes through the lightguide to illuminate an object, such as a reflective LCD, and may optionally pass back through the lightguide. In one embodiment, the light turning features receive light from the low angle directing features and redirect the light into an angle less than 30 degrees from the thickness direction in the light emitting region. The light turning feature may be formed on a surface or within a volume of material and the material may be thermoplastic, thermoset, or adhesive material. In one embodiment, the light turning features are embossed (UV cured or thermomechanically embossed) surface features in a light turning film that is optically coupled (such as by using a pressure sensitive adhesive) to the film-based lightguide in the light emitting region. In another embodiment, the light turning film or region or layer comprising the light turning features extends into less than one selected from the group of 30%, 20%, 10%, and 5% of the light mixing region of the film-based lightguide.

Film Covering Light Turning Features Creating Air Gaps

In one embodiment, a light turning film comprising light turning features on a first surface of the film is optically coupled to the lightguide on the second surface opposite the first surface, the light turning features comprise recessed regions or grooves in the first surface, and the first surface is adhered to a second film in regions between the recessed regions or grooves using a pressure sensitive adhesive that leaves an air gap in the recessed region or grooves. In this embodiment, the large refractive index difference between the polymer light turning film and the air within the recessed region or grooves increases the percentage of totally internally reflected light at the interface over that of an adhesive that effectively planarizes the surface by filing in the recessed regions or grooves with the adhesive. The second film covering the light turning features may be a cover layer, adhered or laminated (such as by a pressure sensitive adhesive) to the film or layer comprising the light turning features, that is one or more selected from the group: protective PET film, touchscreen film, film comprising a hardcoat, protective glass layer, polarizer or substrate of a polarizer, linear polarizer, circular polarizer, anti-glare film, anti-reflection film, protective lens, protective substrate, protective sheet, varying angle diffuser film, and protective film. In one embodiment, a frontlit reflective display comprises a reflective LCD with a film-based frontlight (such as a configuration disclosed elsewhere herein) optically coupled to the top of the reflective LCD, a film or layer with light turning features, and a cover layer covering the light turning features that is a linear polarizer adhered (such as by a pressure sensitive adhesive) to the film or layer comprising the recessed regions forming the light turning features, wherein the polarization axis of the linear polarizer is aligned with the polarization axis of the top linear polarizer (the polarizer on the viewing side of the reflective LCD). In another embodiment, a frontlit reflective LCD comprises one or more layers between the top polarizer of the reflective LCD that rotates the polarized modulated light from the reflective LCD and the cover layer covering the light turning features is a circular polarizer adhered (such as by a pressure sensitive adhesive) to the film or layer comprising the recessed regions forming the light turning features with the quarter wave plate portion of the circular polarizer positioned between the linear polarizer portion of the circular polarizer and the light turning features. In this embodiment, one or more film or layers, such as a lightguide, adhesive, touchscreen film or layer, protective film, cladding layer or film may rotate the polarization, such as by a quarter wave, such that the circular polarizer rotates the polarization by another quarter wave and the linear polarizer, optically coupled to the film or layer comprising the light turning features, is oriented with its polarization axis substantially orthogonal to the polarization axis of the top polarizer of the LCD. In a further embodiment, a reflective display comprises a film-based lightguide positioned between a top polarizer of a reflective LCD and the liquid crystal material of the reflective LCD (such as laminating the lightguide (optionally comprising light turning features and low angle directing features) to the top substrate of the reflective LCD and laminating the top polarizer to layer comprising recessed light turning features using pressure sensitive adhesive layers). In this embodiment, any depolarization or contrast reducing effects, such as from scattering or undesired reflections, may be reduced by putting the top polarizer above the frontlight (comprising the film-based lightguide and optionally other films, layers, or features disclosed herein).

Size and Shape of the Light Turning Features

In one embodiment, a light emitting device comprises the film-based lightguide providing front illumination, such as a frontlight for a reflective display, and the density of the light turning features in the light emitting region of the film (or in a film optically coupled to the light emitting region) is less than about 50% in order to reduce undesired second light deviations (such as unwanted reflections) of the light reflected from the object illuminated and passing back through the lightguide and layer or region comprising the light turning features. In one embodiment, the area density or density along a first direction of the light turning features in the light emitting region of the lightguide is a first density selected from the group: less than 50%; less than 40%; less than 30%; between 1% and 50%; between 1% and 40%; between 1% and 30%; between 5% and 30%; and between 5% and 20%. In a further embodiment, area density in a plane comprising the first direction and the second direction of the light turning features is less than the first density and the light turning features redirect less than one selected from the group: 50%, 40%, 30%, 20%, and 10% of the light reflected from the object of illumination (such as a reflective display) back toward the object of illumination. Thus, in this embodiment, the density and/or dimensions of the light turning features can be configured to reduce the light reflected back toward the object which could reduce the visible luminance contrast of the object.

In another embodiment, the average depth of the light turning features in the thickness direction of the layer or region of film comprising the light turning features is one or more selected from the group: between 1 and 500 microns, between 3 and 300 microns, between 5 and 200 microns, greater than 2 microns, less than 500 microns, less than 200 microns, less than 100 microns, less than 75 microns, less than 50 microns, and less than 10 microns.

In another embodiment, the average width of the light turning features in the direction of light propagation from a first input side of the light emitting region of the lightguide to the opposite side of the light emitting region of the lightguide is one or more selected from the group: between 2 and 500 microns, between 5 and 300 microns, between 10 and 200 microns, greater than 5 microns, less than 500 microns, less than 200 microns, less than 100 microns, less than 75 microns, less than 50 microns, less than 25 microns, and less than 10 microns.

In one embodiment, the light turning feature includes one or more of the following: an angled surface feature, a curved surface feature, a rough surface feature, a random surface feature, an asymmetric surface feature, a scribed surface feature, a cut surface feature, a non-planar surface feature, a stamped surface feature, a molded surface feature, a compression molded surface feature, a thermoformed surface feature, a milled surface feature, a composite of symmetric or asymmetrically shaped materials, a laser ablated surface feature, an embossed surface feature, a coated surface feature, an injection molded surface feature, an extruded surface feature, and one of the aforementioned features positioned in the volume of the lightguide.

In one embodiment, a reflective display comprises a light emitting device with a film-based lightguide and a reflective spatial light modulator. In this embodiment, the light emitting device comprises a light redirecting optical element with light redirecting features or light turning features with a dimension in a plane orthogonal to the thickness direction of the film-based lightguide larger than the average size of a pixel of the reflective spatial light modulator or larger than the size of 2, 3, 4, 5, 7, 10, 20, 30, or 50 average size pixels.

In another embodiment, the ratio of the average spacing between light redirecting features or light turning features to the average dimension of the light redirecting features or light turning features in a direction in a plane orthogonal to the thickness direction of the film-based lightguide is greater than one selected from the group 1, 1.5, 2, 3, 4, 5, 7, 10, 15, 20, 30, 40, 50, 70, and 100.

Pitch of the Light Turning Features

In one embodiment the average pitch or spacing between the light redirecting features or light turning features is constant. In one embodiment, the average pitch of the light turning features in the direction of light propagation from a first input side of the light emitting region of the lightguide to the opposite side of the light emitting region of the lightguide (such as the direction of the average angle of propagation within the lightguide in the light emitting region, for example) is one or more selected from the group: between 5 and 500 microns, between 10 and 300 microns, between 20 and 200 microns, greater than 5 microns, less than 500 microns, less than 200 microns, less than 100 microns, less than 75 microns, and less than 50 microns. In one embodiment, the pitch of the light turning features is substantially constant. In one embodiment, the pitch of the light turning features or light redirecting features is configured to reduce moiré contrast with regularly spaced elements of the object of illumination, such as a reflective or transmissive LCD.

The visibility of the moiré interference pattern can be visually distracting in a light emitting device such as a display and reduces the luminance uniformity. The visibility, or luminance contrast of the moiré patterns is defined as LMmax−LMmin/(LMmax+LMmin) where LMmax and LMmin are the maximum and minimum luminance, respectively, along a cross section substantially perpendicular to the repeating moiré pattern when the elements are illuminated. In one embodiment, the moiré contrast of the light emitting device comprising the light turning features or light redirecting features, is low such that the moiré contrast is less than one selected from the group of 50%, 40%, 30%, 20% and 10%. The moiré contrast may be reduced by shifting the pitch of the light turning features or light redirecting features relative to the regular features of the object of illumination such that the moiré contrast is sufficiently small enough not to be visible to the naked eye or be seen without close inspection. The moiré contrast can be reduced or essentially eliminated by one or more of the following methods: adjusting the pitch of the light turning features or light redirecting features, rotating the light turning features or light redirecting features relative to the regular array of features in the object of illumination, randomizing the pitch of the light turning features or light redirecting features, or increasing the spacing between the light turning features or light redirecting features and the object of illumination.

In another embodiment, the light redirecting features or light turning features are spaced at a first distance from the pixels of a spatial light modulator, where the first distance is greater than one selected from the group: 0.05, 0.1, 0.2, 0.3, 0.4, 0.5, 0.6, 0.7, 0.8, 0.9, 1, 1.5, and 2 millimeters. In another embodiment, a light emitting device comprises a lens positioned to receive light redirected by the light redirecting features or light turning features that reflects or transmits through a spatial light modulator, wherein the modulation transfer function for the lens at the first distance or location of the light turning features or light redirecting features is less than 0.5 and modulation transfer function for the lens is greater than 0.7 at a plane comprising the pixels of the spatial light modulator. For example, in one embodiment, a head-mounted display comprises a film-based lightguide, a light redirecting element, a reflective spatial light modulator, and a lens (or combination of lenses) to magnify the pixels of the reflective spatial light modulator wherein the light redirecting features of the light redirecting element are positioned at a first distance from the pixels of the reflective spatial light modulator such that the modulation transfer function for the light redirecting features is less than 0.5 and the light redirecting features are not discernable or barely discernable for a person with an average acuity of 1 arcminute. Similarly, in a projection system, the modulation transfer function of a lens for the location of the light turning features or light redirecting features may be less than 0.5.

By adjusting the pitch of the light turning features when they are substantially parallel to the features in the object of illumination, the moiré contrast can be reduced. In one embodiment, the ratio of the pitches between the array of light turning features and the pitch of the regular features in the object of illumination (such as pixels in a display) is equal to 1/(N+0.5) where N is an integer and the moiré contrast is reduced or eliminated. A pitch ratio from 0.9/(N+0.5) to 1.1/(N+0.5) will have a relatively low visibility of moiré. In one embodiment, the pitch of the light turning features and the pitch of the regular array of elements on the object of illumination (such a regular array of pixels in a reflective LCD) is in accordance with the above equation and has an acceptable level of moiré visibility. In one embodiment, a light emitting device comprises light turning features with a first pitch P1, the light turning features positioned to redirect light to an angle within 30 degrees from the thickness direction of the film toward an object of illumination with a regular array of elements (such as pixels in a reflective LCD) with a second pitch P2 wherein 0.9/(N+0.5)<P2/P1<1.1/(N+0.5) where N is an integer.

Polarization Dependent Light Turning Features

In one embodiment, the light turning features redirect light with a first polarization more than light with a second polarization different than the first polarization. In another embodiment, the ratio of the percentage of the light with the first polarization that is redirected to the percentage of light with the second polarization that is redirected, the polarization directing ratio, is greater than one selected from the group: 1, 2, 3, 4, 5, 10, 15, 20, 30, and 50. For example, in one embodiment, the first polarization is s-polarized light and the second polarization is p-polarized light. In one embodiment, the light turning features or surface, or a material optically coupled to the light turning features or surface comprise a substantially isotropic material, a birefringent material, or a trirefringent material. In one embodiment, a structured light turning feature in a birefringent material is used to redirect light of a first polarization such that the average total angle of deviation of the incident light is less than 20 degrees from the angle of incidence. For example, in one embodiment, light from low angle directing features incident on the light turning feature of the first polarization, such as s-polarized light, is directed into an angle from the thickness direction of the film in the light emitting region less than 30 degrees such that it escapes the film-based lightguide in the light emitting region, such as to illuminate a reflective display, and may optionally pass back through the lightguide. Light of the second polarization may pass through the light turning feature and totally internally reflect at an interface further from the core region of the lightguide. In this example, the light of the second polarization may be changed to the first polarization state and be recycled within the lightguide and layers optically coupled to the lightguide. Thus, in this example, light of the desired polarization state, s-polarized light for example, is preferentially directed to an angle such that it can transmit out of the lightguide and layers by the light turning features. The light turning features may directly couple light out of the lightguide without passing back through the core region of the lightguide or the light turning features may direct the light to the opposite side of the lightguide toward an object for front illumination. In another embodiment, one or more layers or region optically coupled to the lightguide comprises a waveplate, birefringent, trirefringent, or anisotropic material that converts light remaining in the lightguide into the desired polarization state such that it can be redirected through a second or subsequent interaction with the polarization dependent light turning feature.

Multiple Lightguides

In one embodiment, a light emitting device includes more than one lightguide to provide one or more of the following: color sequential display, localized dimming backlight, red, green, and blue lightguides, animation effects, multiple messages of different colors, NVIS and daylight mode backlight (one lightguide for NVIS, one lightguide for daylight for example), tiled lightguides or backlights, and large area light emitting devices including smaller light emitting devices. In another embodiment, a light emitting device includes a plurality of lightguides optically coupled to each other. In another embodiment, at least one lightguide or a component thereof includes a region with anti-blocking features such that the lightguides do not substantially couple light directly into each other due to touching.

Multiple Lightguides to Provide Pixelated Color

In one embodiment, a light emitting device includes a first lightguide and second lightguide disposed to receive light from a first and second light source, respectively, through two different optical paths wherein the first and second light source emit light of different colors and the light emitting regions of the first and second lightguides include pixelated regions spatially separated in the plane including the light output plane of the light emitting device at the pixelated regions (for example, separated in the thickness direction of the film-based lightguides). In one embodiment, the colors of the first and second pixelated light emitting regions are perceived by a viewer with a visual acuity of 1 arcminute without magnification at a distance of two times the diagonal (or diameter) of the light emitting region to be the additive color of the combination of sub-pixels. For example, in one embodiment, the color in different spatial regions of the display is spatially controlled to achieve different colors in different regions, similar to liquid crystal displays using red, green, and blue pixels and LED signs using red green and blue LEDs grouped together. For example, in one embodiment, a light emitting device includes a red light emitting lightguide optically coupled to a green light emitting lightguide that is optically coupled to a blue lightguide. Various regions of the lightguides and the light output of this embodiment are described hereafter. In a first light emitting region of the light emitting device, the blue and green lightguides have no light extraction features and the red lightguide has light extraction features such that the first light emitting region emits red in one or more directions (for example, emitting red light toward a spatial light modulator or out of the light emitting device). In a second light emitting region of the light emitting device, the red and green lightguides have no light extraction features and the blue lightguide has light extraction features such that the second light emitting region emits blue light in one or more directions. In a third light emitting region of the light emitting device, the blue and red lightguides have light extraction features and the green lightguide does not have any light extraction features such that the third light emitting region emits purple light in one or more directions. In a fourth light emitting region of the light emitting device, the blue, green, and red lightguides have light extraction features such that the fourth light emitting region emits white light in one or more directions. Thus, by using multiple lightguides to create light emitting regions emitting light in different colors, the light emitting device, display, or sign, for example, can be multi-colored with different regions emitting different colors simultaneously or sequentially. In another embodiment, the light emitting regions include light extraction features of appropriate size and density on a plurality of lightguides such that a full-color graphic, image, indicia, logo or photograph, for example, is reproduced.

Stacked Lightguides

In one embodiment, a light emitting device comprises at least one film lightguide or lightguide region disposed to receive and transmit light from a second film lightguide or lightguide region such that the light from the second lightguide improves the luminance uniformity, improves the illuminance uniformity, improves the color uniformity, increases the luminance of the light emitting region, or provides a back-up light emitting region when component failure causes light from the first lightguide to fall below specification (such as color uniformity, luminance uniformity, or luminance) in the overlapping region.

Lightguide Folding Around Components

In one embodiment, at least one selected from the group: lightguide, lightguide region, light mixing region, plurality of lightguides, coupling lightguides, and light input coupler bends or folds such that the component other components of the light emitting device are hidden from view, located behind another component or the light emitting region, or are partially or fully enclosed. These components around which they may bend or fold include components of the light emitting device such as light source, electronics, driver, circuit board, thermal transfer element, spatial light modulator, display, housing, holder, or other components such that the components are disposed behind the folded or bent lightguide or other region or component. In one embodiment, a frontlight for a reflective display includes a lightguide, coupling lightguides and a light source wherein one or more regions of the lightguide are folded and the light source is disposed substantially behind the display. In one embodiment, the light mixing region includes a fold and the light source and/or coupling lightguides are substantially disposed on the side of the film-based lightguide opposite the light emitting region of the device or reflective display. In one embodiment, a reflective display includes a lightguide that is folded such that a region of the lightguide is disposed behind the reflective spatial light modulator of the reflective display. In one embodiment, the fold angle is between 150 and 210 degrees in one plane. In another embodiment, the fold angle is substantially 180 degrees in one plane. In one embodiment, the fold is substantially 150 and 210 degrees in a plane parallel to the optical axis of the light propagating in the film-based lightguide. In one embodiment, more than one input coupler or component is folded behind or around the lightguide, light mixing region or light emitting region. In this embodiment, for example, two light input couplers from opposite sides of the light emitting region of the same film may be disposed adjacent each other or utilize a common light source and be folded behind the spatial light modulator of a display. In another embodiment, tiled light emitting devices include light input couplers folded behind and adjacent or physically coupled to each other using the same or different light sources. In one embodiment, the light source or light emitting area of the light source is disposed within the volume bounded by the edge of the light emitting region and the normal to the light emitting region on the side of the lightguide opposite the viewing side. In another embodiment, at least one of the light source, light input coupler, coupling lightguides, or region of the light mixing region is disposed behind the light emitting region (on the side of the lightguide opposite the viewing side) or within the volume bounded by the edge of the light emitting region and the normal to the light emitting region on the side of the lightguide opposite the viewing side.

In another embodiment, the lightguide region, light mixing region, or body of the lightguide extends across at least a portion of the array of coupling lightguides or a light emitting device component. In another embodiment, the lightguide region, light mixing region, or body of the lightguide extends across a first side of the array of coupling lightguides or a first side of the light emitting device component. In a further embodiment, the lightguide region, light mixing region or body of the lightguide extends across a first side and a second side of the array of coupling lightguides. For example, in one embodiment, the body of a film-based lightguide extends across two sides of a stack of coupling lightguides with a substantially rectangular cross section. In one embodiment, the stacked array of coupling lightguides is oriented in a first orientation direction substantially parallel to their stacked surfaces toward the direction of light propagation within the coupling lightguides, and the light emitting region is oriented in a second direction parallel to the optical axis of light propagating within the light emitting region where the orientation difference angle is the angular difference between the first orientation direction and the second orientation direction. In one embodiment, the orientation difference angle is selected from the group: 0 degrees, greater than 0 degrees, greater than 0 degrees and less than 90 degrees, between 70 degrees and 110 degrees, between 80 degrees and 100 degrees, greater than 0 degrees and less than 180 degrees, between 160 degrees and 200 degrees, between 170 degrees and 190 degrees, and greater than 0 degrees and less than 360 degrees.

In one embodiment, at least one selected from the group: lightguide, lightguide region, light mixing region, plurality of lightguides, coupling lightguides, and light input coupler bends or folds such that it wraps around a component of the light emitting device more than once. For example, in one embodiment, a lightguide wraps around the coupling lightguides two times, three times, four times, five times, or more than five times. In another embodiment, the lightguide, lightguide region, light mixing region, plurality of lightguides, coupling lightguides, or light input coupler may bend or fold such that it wraps completely around a component of the light emitting device and partially wraps again around. For example, a lightguide may wrap around a relative position maintaining element 1.5 times (one time around and halfway around again). In another embodiment, the lightguide region, light mixing region or body of the lightguide further extends across a third, fourth, fifth, or sixth side of the array of coupling lightguides or light emitting device component. For example, in one embodiment, the light mixing region of a film-based lightguide extends completely around four sides of the relative position maintaining element plus across a side again (fifth side). In another example, the light mixing region wraps around a stack of coupling lightguides and relative position maintaining element more than three times.

In one embodiment, wrapping the lightguide, lightguide region, light mixing region, plurality of lightguides, coupling lightguides, or light input coupler around a component provides a compact method for extending the length of a region of the lightguide. For example, in one embodiment, the light mixing region is wrapped around the stack of coupling lightguides to increase the light mixing distance within the light mixing region such that the spatial color or the light flux uniformity of the light entering the light emitting region is improved.

In one embodiment, the wrapped or extended region of the lightguide is operatively coupled to the stack of coupling lightguides or a component of the light emitting device. In one embodiment, the wrapped or extended region of the lightguide is held with adhesive to the stack of coupling lightguides or the component of the light emitting device. For example, in one embodiment, the light mixing region includes a pressure sensitive adhesive cladding layer that extends or wraps and adheres to one or more surfaces of one or more coupling lightguides or to the component of the light emitting device. In another embodiment, the light mixing region includes a pressure sensitive adhesive layer that adheres to at least one surface of a relative position maintaining element. In another embodiment, a portion of the film-based lightguide includes a layer that extends or wraps to one or more surfaces of one or more coupling lightguides or a component of the light emitting device. In another embodiment, the wrapped or extended region of the lightguide extends across one or more surfaces or sides or wraps around one or more light sources. The wrapping or extending of a lightguide or lightguide region across one or more sides or surfaces of the stack of coupling lightguides or the component of the light emitting device, may occur by physically translating or rotating the lightguide or the lightguide region, or may occur by rotating the stack of coupling lightguides or the component. Thus, the physical configuration does not require a particular method of achieving the wrapping or extending.

Light Absorbing Region or Layer

In one embodiment, one or more of the cladding, the adhesive, the layer disposed between the lightguide and lightguide region and the outer light emitting surface of the light emitting device, a patterned region, a printed region, and an extruded region on one or more surfaces or within a volume of the film includes a light absorbing material which absorbs a first portion of light in a first predetermined wavelength range.

Light Redirecting Element Disposed to Redirect Light from the Lightguide

In one embodiment, a light emitting device includes a lightguide with light redirecting elements disposed on or within the lightguide and light extraction features disposed in a predetermined relationship relative to one or more light redirecting elements. In another embodiment, a first portion of the light redirecting elements are disposed above a light extraction feature in a direction substantially perpendicular to the light emitting surface, lightguide, or lightguide region. As used herein, the light redirecting element is an optical element which redirects a portion of light of a first wavelength range incident in a first angular range into a second angular range different than the first. In one embodiment, the light redirecting element includes at least one element selected from the group: refractive features, totally internally reflected feature, reflective surface, prismatic surface, microlens surface, diffractive feature, holographic feature, diffraction grating, surface feature, volumetric feature, and lens. In a further embodiment, the light redirecting element includes a plurality of the aforementioned elements.

Illuminating the Light Emitting Area from Many Directions

In one embodiment, the light emitting region and or display is illuminated from coupling lightguides or light mixing regions extending from the light emitting region or lightguide region on opposite sides, neighboring sides, or along a curve or other sides of the light emitting region, lightguide region, or display such that the coupling lightguides and/or light mixing regions along the sides are folded behind the display. For example, in one embodiment, a watch comprises an octagonal display and the lightguide has an octagonal light emitting area where along four adjacent sides light mixing regions of the film extend from the light emitting region (or lightguide region comprising the light emitting region) and are folded at different fold angles, optionally corresponding to the angle of the side of the display, behind the display where each light mixing region may comprise an array of coupling lightguides. Similarly, a circular or oval-shaped light emitting region and/or display may have arcuate sections of the light mixing region or sections of coupling lightguides along the light emitting region or lightguide region that may be folded behind and optionally stacked to optionally a single light source such as a light emitting diode.

Location of the Film-Based Lightguide

In one embodiment, the core region of the film-based lightguide is positioned between two layers selected from the group: hardcoating substrate, layer, or adhesive; anti-glare layer or anti-reflection layer, substrate or adhesive; color filter material, layer, substrate, or adhesive; first cladding of the lightguide; second cladding of the lightguide; cladding substrate or adhesive; film-based lightguide adhesive; electro-optic layer (such as liquid crystal layer or electrophoretic layer, for example); viewer side substrate for the electro-optic layer; substrate for the electro-optic layer on non-viewer side; adhesive or substrate for the electro-optic layer; reflective material, film, layer, or substrate or adhesive for reflective layer; polarizer layer substrate, or adhesive for polarizer; light redirecting layer; light extraction feature film; impact protection layer; internal coating; conformal coating; circuit board; flexible connector; thermally conducting film, layer (such as a stainless steel, copper, or aluminum foil layer), substrate, or adhesive; sealant layer, film substrate or adhesive; air gap layer; spacer layer or substrate for the spacer layer; electrically conducting layer (transparent or opaque), substrate, or adhesive; anode layer, substrate, or adhesive for anode layer; cathode layer, substrate or adhesive for cathode layer; active matrix layer, substrate or adhesive for active matrix layer; passive matrix layer, substrate or adhesive for passive matrix layer; and touchscreen layer, substrate for touchscreen, or adhesive for touchscreen layer. In another embodiment, the film-based lightguide functions as one or more of the aforementioned layers in addition to propagating light in a waveguide condition.

In one embodiment, the film based lightguide is positioned between the color filter layer and the electro-optical layer such that the parallax effects due to high angle light are minimized (thus resulting in higher contrast, greater resolution, or increased brightness). In another embodiment, the film-based lightguide is the substrate for the color filter material or layer. In another embodiment, the film-based lightguide is the substrate for the electro-optic material or layer.

In one embodiment, the film-based lightguide is folded around a first edge of the active area of a reflective spatial light modulator behind a reflective spatial light modulator and one or more selected from the group: a touchscreen connector, touchscreen film substrate, reflective spatial light modulator connector, and reflective spatial light modulator film substrate is folded behind the first edge, a second edges substantially orthogonal to the first edge, or an opposite edge to the first edge. In the aforementioned embodiment, a portion of the lightguide region, light mixing region, or coupling lightguide includes the bend region of the fold and may extend beyond the reflective spatial light modulator flexible connector, reflective spatial light modulator substrate, touchscreen flexible connector or touchscreen flexible substrate.

Orientation of Light within the Display

In one embodiment, a film-based lightguide illumination device illuminates a spatial light modulator (from the viewer side, from the side opposite the viewer, or from within the display) at a display illumination angle within the layer or material adjacent the electro-optical material or layer of the spatial light modulator in a first illumination plane. As used herein, the display illumination angle is defined as the angle of peak intensity from the surface normal of the spatial light modulating component or layer measured (or calculated) within the layer or material adjacent (on the viewer side) the spatial light modulating component or layer (such as for example, the electro-optical elements of an electrophoretic display, or liquid crystal layer in a liquid crystal display) in a first illumination plane. In one embodiment, the display illumination angle is less than one selected from the group: 60, 50, 40, 30, 20, 10, and 5 degrees. In one embodiment, the first illumination plane is parallel to the extended direction of the coupling lightguides. In another embodiment, the first illumination plane is perpendicular to the extended direction of the coupling lightguides.

In another embodiment, a film-based lightguide illumination device illuminates a color filter layer or material (from the viewer side, from the side opposite the viewer, or from within the display) at a color filter illumination angle within the material or layer adjacent the color filter layer or material in a first illumination plane. As used herein, the color filter illumination angle is defined as the angle of peak intensity from the surface normal of the color filter layer or material measured (or calculated) within the layer or material adjacent (on the viewer side) the color filter layer or material (such as for example, a red, green, and blue array of color filter materials in an electrophoretic display) in a first illumination plane. In one embodiment, the color filter illumination angle is less than one selected from the group: 70, 60, 50, 40, 30, 20, 10, and 5 degrees.

As used herein, the lightguide illumination angle in a first illumination plane is the peak angular intensity of light exiting the film-based lightguide (due to extraction features) measured or calculated within the core layer (or within the cladding layer if present) from the normal to the light emitting device surface (or normal to the film-based lightguide surface). In one embodiment, the lightguide illumination angle is less than one selected from the group: 70, 60, 50, 40, 30, 20, 10, and 5 degrees in a first illumination plane. In one embodiment the lightguide illumination angle is the same as the display illumination angle or the color filter illumination angle.

In another embodiment, the angular bandwidth illumination angle is the full angular width at half maximum intensity of the light exiting the film-based lightguide due to extraction features measured or calculated within the core layer (or within the cladding layer if present) in a first illumination plane from the normal to the light emitting device surface. In one embodiment, the angular bandwidth illumination angle is less than one selected from the group: 60, 50, 40, 30, 20, 10, and 5 degrees in a first illumination plane.

In another embodiment, an adhesive layer adjacent to the recessed light extraction features permits a gas or air cavity of a low refractive index that causes light propagating within the lightguide (or material or layer that the extraction feature is formed within) to totally internally reflect at the interface between the lightguide (or material or layer that the extraction feature is formed within) and the gas or air cavity at the light extraction feature. For example, in one embodiment, a pressure sensitive adhesive layer is laminated onto a film-based lightguide including groove cavities in a core region of the lightguide such that there is an air gap for total internal reflection of the light within the lightguide at the extraction feature—air cavity interface. In another embodiment, the thickness of the adhesive layer adjacent one or more cavity based light extraction features is less than one selected from the group 2, 1.5, 1, 0.75, 0.5, 0.2, and 0.1 times the depth of the light extraction feature in the thickness direction of the film. In another embodiment, the thickness of the adhesive adjacent one or more cavity based light extraction features is less than one selected from the group: 200, 175, 150, 125, 100, 75, 60, 50, 40, 30, 20, and 10 microns. In another embodiment, the thickness of the cladding adjacent one or more cavity based light extraction features is less than one selected from the group: 200, 175, 150, 125, 100, 75, 60, 50, 40, 30, 20, and 10 microns.

In one embodiment, the full angular width at half maximum intensity of the light from the light source exiting the coupling lightguides is greater in a first plane including the thickness direction of the film than in a second plane including the direction orthogonal to the thickness direction. In one embodiment, the light output profile from the light source is rotated such that the collimation or plane including the lowest divergence is rotated or switched within the light mixing region, lightguide region, or light emitting region. In one embodiment, the light propagating within the film-based lightguide is redirected by light redirecting features, interior light directing edges or optical elements such that the full angular width at half maximum intensity of the light from the light source incident upon one or more light extraction features is greater in the second plane than in the first plane.

Light Emitting Device

In one embodiment, a light emitting device comprises: a film lightguide of a lightguide material with a lightguide refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first cladding layer comprising a first material with a first refractive index, $n_{D1}$, a second cladding layer comprising a second material with a second refractive index $n_{D2}$ where $n_{DL} > n_{D2} > n_{D1}$; a plurality of low angle directing features optically coupled to the body of the lightguide; a plurality of light turning features optically coupled to the lightguide, wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In this embodiment, light propagating within the core layer or region of the film-based lightguide in the light emitting region that undergoes a low angle light redirection, such as by a low angle directing feature, will preferentially leak or exit the core layer or region of the lightguide on the side with the second refractive index since it is higher than the first refractive index and the critical angle is higher. In this embodiment, light deviating from angles higher than the critical angle to smaller angles to the normal of the film surface (or core-layer interface) will first pass the critical angle boundary on the side of the core layer or region optically coupled to the cladding layer or region with the higher refractive index than the cladding layer or region on the opposite side of the core region or layer.

In one embodiment, the low angle directing feature is configured to deviate light by a total angle of deviation less than a maximum first total angle of deviation, $\theta_f$, from the angle of incidence, following the equation: $\theta_f = \theta_{c2} - \theta_{c1}$, where $\theta_{c2}$ is the critical angle between the core layer or region and the second cladding layer or region and can also be expressed as $\theta_{c2} = \sin^{-1}(n_{D2}/n_{DL})$, and $\theta_{c1}$ is the critical angle between the core layer or region and the first cladding layer or region and can be expressed as $\theta_{c1} = \sin^{-1}(n_{D1}/n_{DL})$. In another embodiment, the low angle directing feature is configured to provide a maximum total angle of deviation, $\theta_{max}$ of less than 110% of the maximum first total angle of deviation or $\theta_{max} < 1.1 \times \theta_f$. In another embodiment, the low angle directing feature is configured to provide an average first total angle of deviation, $\theta_{fave}$, from the angle of incidence of $\theta_{fave} = \theta_{c2} - \theta_{c1}$. In another embodiment, the low angle directing feature is configured to provide an average total angle of deviation, $\theta_{ave}$ of less than 110% of the average first total angle of deviation or $\theta_{ave} < 1.1 \times \theta_{fave}$.

For example, in one embodiment, the first material has a refractive index of $n_{D1} = 1.4$, the second material has a refractive index of $n_{D2} = 1.5$, and the core layer or region material has a refractive index of $n_{D2} = 1.6$. In this example, a low angle light directing feature comprises an angled reflective surface wherein the angle of the surface causes a total light deviation less than $\theta_f$ such that the light preferentially escapes the core layer of the lightguide through the higher index cladding layer or region. In this example, $\theta_{c1} = 61$ degree, $\theta_{c2} = 70$ degrees, and thus the maximum first total angle of deviation for optimum coupling into the second cladding region is less than 9 degrees. Since light reflecting from an angled surface undergoes a total angle of deviation of twice the angle of the feature, the angle of the features is chosen to be less than 4.5 degrees $$\left(\frac{\theta_f}{2}\right)$$

from the direction perpendicular to the thickness direction of the film at the feature. In one embodiment the average angle from a direction perpendicular to the thickness direction of the film at the feature of the surface of a reflective low angle directing feature receiving light propagating within the lightguide is less than $$\left(\frac{\theta_f}{2}\right)$$

degrees or less than $$1.1 \times \left(\frac{\theta_f}{2}\right)$$

degrees. In another embodiment, the thickness of the core layer or region of the film-based lightguide is less than 100 microns and the low angle directing feature directs (such as by reflection or refraction, for example) less than one selected from the group 100%, 80%, 60%, 40%, 30%, 20%, 10%, and 5% of the incident light in a single interaction (such as a single reflection or single refraction, for example). In a further embodiment, the light propagating within the lightguide that interacts with the low angle light directing features and propagates to the light turning features interacts with an average of more than 1, 2, 3, 4, 5, 10, 15, or 20 low angle directing features before reaching a light turning feature.

In one embodiment, the ratio of the length of the light emitting region in the direction of light propagating from the first side to the second side of the light emitting region to the average thickness of the light emitting region is greater than one selected from the group: 300, 500, 1000, 5,000, 7,000, 10,000, 15,000, and 20,000.

Backlight or Frontlight

In one embodiment, the film-based lightguide illuminates a display, forming an electroluminescent display. In one embodiment, the film based lightguide is a frontlight for a reflective or transflective display. In another embodiment, the film-based lightguide is a backlight for a transmissive or transflective display. Typically, with displays including light emitting lightguides for illumination, the location of the lightguide will determine whether or not it is considered a backlight or frontlight for an electroluminescent display where traditionally a frontlight lightguide is a lightguide disposed on the viewing side of the display (or light modulator) and a backlight lightguide is a lightguide disposed on the opposite side of the display (or light modulator) than the viewing side. However, the frontlight or backlight terminology to be used can vary in the industry depending on the definition of the display or display components, especially in the cases where the illumination is from within the display or within components of the spatial light modulator (such as the cases where the lightguide is disposed in-between the liquid crystal cell and the color filters or in-between the liquid crystal materials and a polarizer in an LCD). In some embodiments, the lightguide is sufficiently thin to be disposed within a spatial light modulator, such as between light modulating pixels and a reflective element in a reflective display. In this embodiment, light can be directed toward the light modulating pixels directly or indirectly by directing light to the reflective element such that is reflects and passes through the lightguide toward the spatial light modulating pixels. In one embodiment, a lightguide emits light from one side or both sides and with one or two light distribution profiles that contribute to the "front" and/or "rear" illumination of light modulating components. In embodiments disclosed herein, where the light emitting region of the lightguide is disposed between the spatial light modulator (or electro-optical regions of the pixels, sub-pixels, or pixel elements) and a reflective component of a reflective display, the light emitting from the light emitting region may propagate directly toward the spatial light modulator or indirectly via directing the light toward a reflective element such that the light reflected passes back through the lightguide and into the spatial light modulator. In this specific case, the terms "frontlight" and "backlight" used herein may be used interchangeably.

In one embodiment, a light emitting display backlight or frontlight includes a light source, a light input coupler, and a lightguide. In one embodiment, the frontlight or backlight illuminates a display or spatial light modulator selected from the group: transmissive display, reflective display, liquid crystal displays (LCD's), MEMs based display, electrophoretic displays, cholesteric display, time-multiplexed optical shutter display, color sequential display, interferometric modulator display, bistable display, electronic paper display, LED display, TFT display, OLED display, carbon nanotube display, nanocrystal display, head mounted display, head-up display, segmented display, passive matrix display, active matrix display, twisted nematic display, in-plane switching display, advanced fringe field switching display, vertical alignment display, blue phase mode display, zenithal bistable device, reflective LCD, transmissive LCD, electrostatic display, electrowetting display, bistable TN displays, micro-cup EPD displays, grating aligned zenithal display, photonic crystal display, electrofluidic display, and electrochromic displays.

LCD Backlight or Frontlight

In one embodiment, a backlight or frontlight suitable for use with a liquid crystal display panel includes at least one light source, light input coupler, and lightguide. In one embodiment, the backlight or frontlight includes a single lightguide wherein the illumination of the liquid crystal panel is white. In another embodiment, the backlight or frontlight includes a plurality of lightguides disposed to receive light from at least two light sources with two different color spectra such that they emit light of two different colors. In another embodiment, the backlight or frontlight includes a single lightguide disposed to receive light from at least two light sources with two different color spectra such that they emit light of two different colors. In another embodiment, the backlight or frontlight includes a single lightguide disposed to receive light from a red, green and blue light source. In one embodiment, the lightguide includes a plurality of light input couplers wherein the light input couplers emit light into the lightguide with different wavelength spectrums or colors. In another embodiment, light sources emitting light of two different colors or wavelength spectrums are disposed to couple light into a single light input coupler. In this embodiment, more than one light input coupler may be used, and the color may be controlled directly by modulating the light sources.

In a further embodiment, the backlight or frontlight includes a lightguide disposed to receive light from a blue or UV light emitting source and further includes a region including a wavelength conversion material such as a phosphor film. In another embodiment, the backlight includes 3 layers of film lightguides wherein each lightguide illuminates a display with substantially uniform luminance when the corresponding light source is turned on. In this embodiment, the color gamut can be increased by reducing the requirements of the color filters and the display can operate in a color sequential mode or all-colors-on simultaneously mode. In a further embodiment, the backlight or frontlight includes 3 layers of film lightguides with 3 spatially distinct light emitting regions including light extraction features wherein each light extraction region for a particular lightguide corresponds to a set of color pixels in the display. In this embodiment, by registering the light extracting features (or regions) to the corresponding red, green, and blue pixels (for example) in a display panel, the color filters are not necessarily needed, and the display is more efficient. In this embodiment, color filters may be used, however, to reduce crosstalk.

In a further embodiment, the light emitting device includes a plurality of lightguides (such as a red, green and blue lightguide) disposed to receive light from a plurality of light sources emitting light with different wavelength spectrums (and thus different colored light) and emit the light from substantially different regions corresponding to different colored sub-pixels of a spatial light modulator (such as an LCD panel), and further includes a plurality of light redirecting elements disposed to redirect light from the lightguides towards the spatial light modulator. For example, each lightguide may include a cladding region between the lightguide and the spatial light modulator wherein light redirecting elements such as microlenses are disposed between the light extraction features on the lightguide and the spatial light modulator and direct the light toward the spatial light modulator with a FWHM of less than 60 degrees, a FWHM of less than 30 degrees, an optical axis of emitted light within 50 degrees from the normal to the spatial light modulator output surface, an optical axis of emitted light within 30 degrees from the normal to the spatial light modulator output surface, or an optical axis of emitted light within 10 degrees from the normal to the spatial light modulator output surface. In a further embodiment, an arrangement of light redirecting elements are disposed within a region disposed between the plurality of lightguides and the spatial light modulator to reduce the FWHM of the light emitted from the plurality of lightguides. The light redirecting elements arranged within a region, such as on the surface of a film layer, may have similar or dissimilar light redirecting features. In one embodiment, the light redirecting elements are designed to redirect light from light extraction features from a plurality of lightguides into FWHM angles or optical axes within 10 degrees of each other. For example, a backlight including a red, green, and blue film-based lightguides may include an array of microlenses with different focal lengths substantially near the 3 depths of the light extraction features on the 3 lightguides. In one embodiment, lightguide films less than 100 microns thick enable light redirecting elements to be closer to the light extraction features on the lightguide and therefore capture more light from the light extraction feature. In another embodiment, a light redirecting element such as a microlens array with substantially the same light redirection features (such as the same radius of curvature) may be used with thin lightguides with light extraction features at different depths since the distance between the nearest corresponding light extraction feature and farthest corresponding light extraction feature in the thickness direction is small relative to the diameter (or a dimension) of the light redirecting element, pixel, or sub-pixel.

Reflective Display

In one embodiment, a method of producing a display includes: forming an array of coupling lightguides from a lightguide region of a film including a core region and a cladding region by separating the coupling lightguides from each other such that they remain continuous with the lightguide region of the film and include bounding edges at the end of the coupling lightguides; folding the plurality of coupling lightguides such that the bounding edges are stacked; directing light from a light source into the stacked bounding edges such that light from the light source propagates within the core region through the coupling lightguides and lightguide region of the film by total internal reflection; forming light extraction features on or within the core layer in a light emitting region of the lightguide region of the film; disposing a light extracting region on the cladding region or optically coupling a light extracting region to the cladding region in a light mixing region of the lightguide region between the coupling lightguides and the light emitting region; and disposing the light emitting region adjacent a reflective spatial light modulator.

The lightguides disclosed herein may be used to illuminate a reflective display. In one embodiment, a reflective display comprises a first reflective surface and a film-based lightguide comprising a plurality of coupling lightguides. In this embodiment, the reflective display may be a diffusely reflective spatial light modulator or a specularly reflecting spatial light modulator. For example, a diffusely reflective spatial light modulator can include a reflective display such as an electrophoretic particle based reflective display and a specularly reflecting spatial light modulator can include a reflective LCD with specularly reflecting rear electrodes. The reflective spatial light modulator, or a component of the light emitting device, lightguide, or a coating or layer positioned within, may include a light scattering or diffusive surface or volumetric light scattering particles or domains.

In one embodiment, the light emitting device is a frontlight for a watch that comprises a reflective display. In another embodiment, the largest dimension in a plane orthogonal to the thickness direction of the lightguide or display of the light emitting region is less than one selected from the group of 100, 75, 50, 40, 30, and 25 millimeters.

In one embodiment, a reflective display comprises a liquid crystal material positioned between a top linear absorbing polarizer and a bottom reflective polarizer (such as a wire-grid polarizer or multi-layer optical film polarizer such as DBEF™ film by the 3M Company). Depending on the type and configuration of the liquid crystal material, the polarization axis of the top linear absorbing polarizer may be oriented parallel, perpendicular, or at an angle between 0 degrees and 90 degrees to the reflective polarization axis of the reflective polarizer. In one embodiment, the rear reflecting polarizer is the rear electrode for the liquid crystal cell. In another embodiment, the reflective display with a rear reflective polarizer may be front-illuminated or back illuminated, such as by a film-based lightguide as disclosed herein. In one embodiment, the use of a frontlight with a reflective display with a rear reflective polarizer enables the rear reflective polarizer to help filter out undesired light not of the correct polarization more than a non-polarizing reflector and can increase the contrast of the reflective display. In one embodiment, the film-based lightguide is positioned between a top polarizer and a liquid crystal cell with a reflective polarizer positioned within the liquid crystal cell (or outside of the liquid crystal cell) on the opposite side of the liquid crystal material (or liquid crystal cell) than the film-based lightguide. In a further embodiment, the film-based lightguide is positioned above the linear absorbing polarizer of the reflective LCD.

Film-Based Lightguide Between Angularly Varying Diffusion Film and Reflective Spatial Light Modulator In one embodiment, a film-based lightguide is positioned between one or more angularly varying diffusion films (also known as a directional diffuser film or anisotropic diffuser film or layer) and the spatial light modulating layer(s) of a spatial light modulator (such as the liquid crystal layer in a reflective liquid crystal display). The angularly varying diffusion films comprise one or more axes of diffusion which scatter incident light about the one or more axes and substantially transmit un-deviated light from other angles. Angularly varying diffusion films (such as directional diffuser films/layers) with one more layers formed by one or more exposure methods are described, for example, in "Design of Light Diffusion Film with Bent Structure for Reflective Displays," Kentaro Kusama, Takahiro Ishinabe, Baku Katagiri, Tomoo Orui, Satoru Shoshi, Hideo Fujikake, Society for Information Displays, International Symposium, Digest of Technical Papers, Vol. 46, Issue 1, June 2015, p. 1629-1632; "Wide-Color-Gmut and Wide-Viewing-Angle Color Reflective LCD with Novel Anisotropic Diffusion Layer", T. Ishinabe, H. Fujikake, K. Kusama and S. Shoshi, SID International Symposium Digest of Technical Papers, Vol. 44-1, 350-353 (2013); Honda M., Hozumi S., Kitayama S. (1994) A Novel Polymer Film that Controls Light Transmission. In: Ghiggino K. P. (eds) Progress in Pacific Polymer Science 3. Springer, Berlin, Heidelberg; and K. Kusama, B. Katagiri, T. Orui and S. Shoshi, "Light-Diffusing Films Using Two-step UV Irradiation for Various Displays", SID International Symposium Digest of Technical Papers, Vol. 44-3, 1177-1180 (2013). Examples of angularly varying diffusion film include Lumisty® manufactured by Sumitomo Chemical Co., Ltd.

In one embodiment, a reflective LCD comprises one or more angularly varying diffusion films wherein the display is configured to provide optimum viewing contrast when illuminated by light ambient to the display at an angle within the range from −20 to −50 degrees in air from a first direction perpendicular to the outer surface of the display within a first plane parallel to the first direction. In this embodiment, the reflective display comprises an angularly varying diffusion film above the polarizer of the LCD (or between the polarizer and the liquid crystal layer) wherein the angularly varying diffusion film includes diffusion angles that that diffuse light incident from about −15 and +40 degrees (measured in air) from the first direction in the first plane. In one embodiment, the reflective LCD comprises a frontlight comprising a film-based lightguide wherein the lightguide is positioned between the angularly varying diffusion film and the liquid crystal layer (such as directly below the angularly varying diffusion film or below the polarizer in the display stack of layers). In one embodiment, light from a light source such as an LED exits the film-based lightguide toward the liquid crystal layer with a peak angle between 0 and −20 degrees (measured in air) from the first direction in the first plane or angle on the same side of the display normal as the peak axis of diffusion of the angularly varying diffuser. In another embodiment, light from a light source such as an LED exits the film-based lightguide toward the liquid crystal layer with an angular FWHM intensity between 5 and 30 degrees and the peak intensity may be centered at a peak angle of intensity between 0 and −20 degrees (measured in air) from the first direction or angle in the first plane or angle on the opposite side of the display normal than the peak diffusion angle of the angularly varying diffuser. In one embodiment, the film-based lightguide is sufficiently thin so as to not significantly create parallax problems, shadows, or overlapping pixels in the display by increasing the distance between the top polarizer and the angularly varying diffuser. In one embodiment, the reflective display comprises a film-based lightguide below a varying angle diffuser film wherein the film-based lightguide is less than one selected from the group 200, 100, 75, 60, 50, 40, 30, and 25 micrometers thick. In another embodiment, light from a light source such as an LED exits the film-based lightguide toward the liquid crystal layer with a peak angle between 0 and +20 degrees (measured in air) from the first direction in the first plane or angle on the opposite side of the first direction than the peak axis of diffusion of the angularly varying diffuser.

In one embodiment, a display comprises a film-based lightguide positioned between one or more angularly varying diffusion films and the spatial light modulating layer(s) of a spatial light modulator (such as the liquid crystal layer in a reflective liquid crystal display), and light exits the film-based lightguide in the light emitting region toward the spatial light modulating layer with a first angle of peak luminous intensity in air within a range selected from the group −20 and −40, −10 and −30, 20 and 40, 10 and 30, 0 and −20, −5 and −20, 5 and −20, −5 and −20, 0 and 20, −5 and 20, and 5 and 20 degrees from a first direction perpendicular to the outer surface of the display within a first plane parallel to the first direction, wherein the display has a highest contrast at a first viewing angle when illuminated with collimated light incident upon the display at an angle within the range of −45 and −15 degrees in air in the first plane from the ambient environment external to the display. In one embodiment, light from a light source such as an LED exits the film-based lightguide toward the liquid crystal layer with an angular FWHM intensity in the first plane between one selected from the group: less than 50 degrees, less than 40 degrees, less than 30 degrees, less than 20 degrees, less than 10 degrees, between 5 and 40 degrees, between 5 and 30 degrees, between 10 and 30 degrees, between 10 and 20 degrees in air.

In one embodiment, the peak axis of diffusion (the angle at which the un-deviated transmitted light intensity is the lowest due to scattering) in the first plane of the angularly varying diffusion film is within a range selected from the group: −10 and 25, −15 and 35, −5 and 25, −5 and 20, 0 and 15, 5 and 10, −10 and 10, −10 and 35, and −5 and 10 degrees in air from the first direction. In another embodiment, the FWHM intensity of the angular diffusion of the light from an angularly varying diffusion film in the first plane when illuminated at the peak axis of diffusion is between one selected from the group: less than 50 degrees, less than 40 degrees, less than 30 degrees, less than 20 degrees, less than 10 degrees, between 5 and 40 degrees, between 5 and 30 degrees, between 10 and 30 degrees, between 10 and 20 degrees in air.

In one embodiment, a display comprises a film-based lightguide positioned between one or more angularly varying diffusion films and the spatial light modulating layer(s) of a spatial light modulator (such as the liquid crystal layer in a reflective liquid crystal display), wherein the film-based lightguide is positioned above a polarizer in a reflective LCD and the angularly varying diffusion film is positioned above the film-based lightguide. In this embodiment, the display may further comprise a linear polarizer above the angularly varying diffusion film aligned with its polarization axis parallel to the polarization axis of the polarizer for the liquid crystal display. In one embodiment, the angularly varying diffusion film comprises a first layer or region, and a second layer or region wherein the first layer or region diffuses incident light within a range of angles symmetrical to the first direction (such as from −10 to 10 degrees) and a second layer or region diffuses incident light within a range of angles asymmetrical to the first direction in the first plane (such as from 5 to 25 degrees). In one embodiment, a display comprises a film-based lightguide frontlight and a reflective spatial light modulator and the light exiting the light emitting region of the film-based lightguide reflected from a rear reflective layer, material, region, or electrode of the reflective spatial light modulator (such as a reflective LCD) is diffused by the first layer or region of the angularly varying diffusion film and is not substantially diffused by the second layer or region of the angularly varying diffusion film.

Modes of the Light Emitting Device

In another embodiment, a light emitting device includes one or more modes selected from the group: normal viewing mode, daytime viewing mode, high brightness mode, low brightness mode, nighttime viewing mode, night vision or NVIS compatible mode, dual display mode, monochrome mode, grayscale mode, transparent mode, full color mode, high color gamut mode, color corrected mode, redundant mode, touchscreen mode, 3D mode, field sequential color mode, privacy mode, video display mode, photo display mode, alarm mode, nightlight mode, emergency lighting/sign mode. In one embodiment, the angle of peak luminous intensity at the center of the display from the light originally propagating with its optical axis in a first direction within a film-based lightguide is within a range selected from the group: −40 degrees to −30 degrees, −30 degrees to −20 degrees, −20 degrees to −10 degrees, and −10 degrees to −5 degrees from the normal to the display surface in a first output plane and the angle of peak luminous intensity at the center of the display from the light originally propagating with its optical axis in the film-based lightguide in a second direction is within a range selected from the group: +40 degrees to +30 degrees, +30 degrees to +20 degrees, +20 degrees to +10 degrees, and +10 degrees to +5 degrees from the normal to the display surface in the first output plane. In another embodiment, the first output plane is substantially parallel to the first and second directions.

Privacy Mode or Varying Angular Output Mode Using Two or More Backlights

In another embodiment, a light emitting device comprises a first backlight (such as an edge-lit backlight, direct-lit backlight, or film-based lightguide backlight) and a second backlight comprising a film-based lightguide with a light emitting region positioned over the light emitting region of the first backlight on the viewing (output) side of the first backlight. In another embodiment, the angular light output from the first backlight is different than the angular light output of the second lightguide. In one embodiment, the Full-Angular Width at Half-Maximum Luminous Intensity (FAWHMLI) along one or two light output planes orthogonal to the light emitting surface of the first backlight or second backlight is greater than one selected from the group: 40, 50, 60, 70, 80, 90, 100, 110, and 115 degrees (a "higher FAWHMLI"). In another embodiment, the FAWHMLI along one or two light output planes orthogonal to the light emitting surface of the first backlight or second backlight is less than one selected from the group: 5, 10, 15, 20, 30, 40, 50, 60, 70, and 80 degrees (a "lower FAWHMLI"). In these embodiments, the "lower FAWHMLI" and "higher FAWHMLI" refer to the FAWHMLI relative to each other. For example, one backlight may have a privacy mode with a lower FAWHMLI of less than 15 degrees and a wider viewing mode with a higher FAWHMLI of greater than 60 degrees. Likewise, in another embodiment one backlight may have a privacy mode with a lower FAWHMLI of less than 60 degrees and a wider viewing mode with a higher FAWHMLI of 115 degrees. In one embodiment, the light output from the light emitting region second film-based lightguide backlight is substantially collimated and suitable for use in a privacy mode application. In another embodiment, the FAWHMLI of the light output from the first backlight along one or two light output planes orthogonal to the light emitting surface of the first backlight is less or more than the light output from the second backlight in the same output plane by one selected from the group: 5, 10, 15, 20, 30, 40, 50, 60, 70, 80, and 90 degrees. For example, in one embodiment, the first backlight is an edge-lit backlight using an acrylic sheet waveguide and optionally one or more diffusion or brightness enhancement films and has a FAWHMLI of greater than 60 degrees in a horizontal light output plane (optionally, and/or in a vertical output plane) and the light emitting region of the second backlight (such as a film-based lightguide backlight comprising one or more light input couplers and one or more LEDs) is positioned over the light emitting region of the first backlight, wherein the angular output of the second backlight has a FAWHMLI of less than 60 degrees in the horizontal (optionally, and/or the vertical output plane). In this embodiment, when the first backlight is emitting light, the viewing angle of a display positioned over the first and second backlights has a wide horizontal viewing angle (a higher horizontal FAWHMLI) when only the first backlight is emitting light (and optionally the first and second backlight are emitting light); and when only the second backlight is emitting light, the display has a lower horizontal viewing angle (privacy mode, a lower horizontal FAWHMLI). In another embodiment, adding the light emitting region of the second backlight (such as a film-based lightguide) over the light emitting region of the first backlight changes the FAWHMLI light output of the device along one or two light output planes orthogonal to the light emitting surface of the first backlight by less than one selected from the group: 2, 5, 10, 15, 20 and 30 degrees when only the first backlight is emitting light. In one embodiment, the film-based lightguide of the second backlight has a light emitting area that does not substantially redirect or change the light output from the first backlight when placed above (or in the path of the light output) the light emitting region of the first backlight on the light emitting side of the first backlight. For example, the second, film-based, lightguide backlight may comprise a layer or region with light turning features wherein the light turning features occupy less than 40%, 30%, 20%, or 10% of the surface area of the light emitting region. In embodiments where the light redirecting element (and optionally the light extraction features) occupy a low percentage of the light emitting region surface area, the light from the first backlight can propagate through the second backlight substantially undeviated. In another embodiment, the percentage of total luminous flux out of a light emitting device comprising the first backlight and the second backlight when only the first backlight is emitting light and the light emitting region of the second backlight is positioned above the light emitting region of the first backlight is greater than one selected from the group 75%, 80%, 85%, 90%, 92%, 92%, 94%, 96%, and 98% of the total luminous flux out of only the first backlight without the second backlight positioned above the first backlight when only the first backlight is emitting light. In another embodiment, the second, film-based lightguide backlight comprises light extraction features that occupy less than 40%, 30%, 20%, 10%, 5% of the surface area of the light emitting region. In one embodiment, the location of the second, film-based lightguide backlight is between a lightguide sheet or diffusion sheet (for a direct-lit backlight) and one or more diffusion films and/or brightness enhancement films (such as linear prism films). In one embodiment the lower FAWHMLI of the second backlight is achieved in a first output plane (such as the horizontal output plane or vertical output plane) due to the use of low angle directing features in the lightguide and light turning features in another layer or region; and a lower FAWHMLI of the second backlight is optionally achieved in a second output plane orthogonal to the first output plane due to collimation (or reduction or lowering the FAWHMLI) of the light in an input plane at the light input surface orthogonal to the thickness direction of the film (and/or stacked coupling lightguides) from one or more light sources prior to passing into the light input surface (such as by using a light collimating optical element that collimates light in at least one plane of incidence), or is optionally achieved by collimation (or reduction or lowering the FAWHMLI) within the coupling lightguides or light mixing region (such as by shaped or tapered coupling lightguides or interior light directing edges). In another embodiment, the light emitting device comprises two or more backlights with different FAWHMLI light outputs in one or more light output planes and the relative light output from the two or more backlights can be adjusted to achieve FAWHMLI profiles between the FAWHMLI of the two or more backlights individually in the one or more light output planes. For example, in one embodiment, in the horizontal viewing plane, a first backlight has a light output with a FAWHMLI of 115 degrees, a second backlight positioned above the first backlight has a light output with a FAWHMLI of 40 degrees, and when the first backlight is driven at 40% luminous flux output and the second backlight is driven at 90% luminous flux output, the combination of the first backlight (and optionally the display) has a FAWHMLI of 60 degrees. In another embodiment, the angular light output profiles of the one or more backlights do not have angular luminous intensity peaks at 0 degrees. For example, in one embodiment, the first backlight may have a FAWHMLI of 40 degrees centered at 0 degrees from the normal to the light emitting surface (in the horizontal and/or the vertical light output plane) and the second backlight may have two luminous intensity peaks centered at +50 and −50 degrees. In this embodiment, for example, the first backlight may be used for a head-on low viewing angle mode, and when the viewer wishes to expand the viewing mode, the second backlight may be turned on to 100% power (or less than one or more of 100%, 90%, 80%, 70%, 60%, 50%, and 40%, for example) such that the viewing angle is increased accordingly.

Privacy Mode or Varying Angular Output Mode Using Two or More Light Sources

In one embodiment, a light emitting device comprises a plurality of light sources positioned to emit light into a first light input surface defined by one or more stacks of a plurality of coupling lightguides wherein the light from one or more first light sources in a light input coupler for a film-based lightguide has a lower FAWHMLI prior to entering into the first light input surface in at least the input plane orthogonal to the thickness direction of the coupling lightguides and the light from one or more second light sources has a higher FAWHMLI prior to entering into the first light input surface in at least the input plane orthogonal to the thickness direction of the coupling lightguides. In this embodiment, for example, a light collimating optical element (such as a total internal reflection lens or metalized collimation lens or mirror) is positioned to receive light from the one or more first light sources and output light with a lower FAWHMLI in at least the light input plane at the light input surface orthogonal to the thickness direction of the coupling lightguides of the film-based lightguide that is less than one selected from the group: 5, 10, 15, 20, 30, 40, 50, 60, 70, and 80 degrees. In this embodiment, one or more second light sources emits light such that the FAWHMLI in at least the light input plane at the light input surface orthogonal to the thickness direction of the coupling lightguides of the film-based lightguide is greater than one selected from the group: 40, 50, 60, 70, 80, 90, 100, 110, and 115 degrees. Thus, by selectively turning on the first light sources only, the light output from the light emitting region of the light emitting device (and optionally the display) has a lower FAWHMLI in a light output plane from the light emitting region parallel to the array direction of the array of coupling lightguide dues to the light collimating optical element; and when turning on only the second light sources, the light output from the light emitting region of the light emitting device has a higher FAWHMLI in a light output plane from the light emitting region parallel to the array direction of the array of coupling lightguide. In this embodiment, by the first light sources emitting light corresponding with a lower FAWHMLI (narrow viewing angle or privacy mode) in one plane and by turning off the first light sources and turning on the second light sources, the light from the second light sources is emitted from the light emitting region in the output plane parallel to the array direction at a wider FAWHMLI (wide viewing angle or non-privacy mode). In another embodiment, the light emitting device comprises two or more light sources with different corresponding FAWHMLI light outputs in one or more light output planes and the relative light output from the two or more light sources can be adjusted to achieve FAWHMLI profiles between the FAWHMLI of the two or more light sources individually in the one or more light output planes. For example, in one embodiment, in the horizontal viewing plane, the light output from a backlight has a FAWHMLI of 115 degrees when illuminated by only the first light sources, and the backlight has a FAWHMLI of 40 degrees when illuminated by only the second light sources, and when the first light sources are driven at 40% luminous flux output and the second light sources are driven at 90% luminous flux output, the backlight (and optionally the display) has light output with a FAWHMLI of 60 degrees.

In the case of the backlight or display illuminated by the first light sources, the light output in a light output plane parallel to the array direction of the array of coupling lightguides may have a FAWHMLI less than one selected from the group: 5, 10, 15, 20, 30, 40, 50, 60, 70, and 80 degrees. In the case of the backlight or display illuminated by the first second sources, the light output in a light output plane parallel to the array direction of the array of coupling lightguides may have a FAWHMLI greater than one selected from the group: 40, 50, 60, 70, 80, 90, 100, 110, and 115 degrees. In one embodiment, a light collimating element may be positioned to receive and collimate (or reduce the FAWHMLI) the light output from two or more light sources. In another embodiment, one or more light sources with a corresponding light collimating element are positioned adjacent and/or between two or more light sources that do not have a corresponding light collimating element positioned to receive the light output. In one embodiment, the one or more light sources corresponding to a lower FAWHMLI light output from a light emitting device are positioned on the same circuit board or flexible printed circuit as one or more light sources corresponding to a higher FAWHMLI light output from the light emitting device.

Multiple Light Emitting Areas or Displays

In one embodiment, the light emitting device includes two or more light emitting areas or displays defined by regions with one or more properties selected from the group: emit different color gamuts; emit light within different functional areas of the display; emit light with different angular properties; emit light to illuminate a button, key, keyboard area, or other user interface region; have different sizes or shapes; and are positioned on different sides or surfaces of the device. In one embodiment, the light emitting device includes two or more light emitting regions with different use modes or different illumination modes. A different illumination mode can include one or more different light output properties selected from the group: different times in the "on" state or "off" state of illumination; different frequencies of illumination; different durations of illumination; different colors of illumination; different color gamuts; different angular light output profiles; different spatial light output profiles; different spatial luminance uniformity; and different color, luminances or luminous intensity at a specific angle. For example, in one embodiment, the light emitting device illuminates a main display and a sub-display. The main display and sub-display could be two light emitting areas defined by the same spatial light modulator or two light emitting areas defined by two separate spatial light modulators. In one embodiment, each light emitting area or display may be illuminated by the same or different lightguides and/or light sources. For example, in one embodiment, the light emitting device has a high color gamut lightguide positioned to illuminate the main display of a device with a main display and sub-display from the front in a first mode using light from monochrome red, green, and blue LEDs. In this embodiment, the sub-display can be illuminated by a second lightguide that emits only white light to reduce the power required for illuminating the sub-display (which could include icons or keys, for example) to the same luminance. In another embodiment, a first display region includes an array of color filters and a second display region does not include an array of color filters. For example, in one embodiment, the sub-display may be designed without a color filter array such that the monochrome sub-display illuminated by a white (or monochrome) light source can operate at a significantly lower power for the same luminance as the main display with color filters since light is not absorbed by a color filter array.

In one embodiment, the device includes two or more lightguides spatially separated in the plane of the active area of the light emitting device such that they can be illuminated independently. In this embodiment, for example, the edges of one or more lightguides opposite the side of the lightguide with the light input coupler may include a light reflective or absorptive coating to prevent light from exiting one lightguide and entering into an adjacent lightguide. In one embodiment, the spatially separated lightguides permit the light emitting display device to have a substantially uniform thickness.

Angular Profile of Light Emitting from the Light Emitting Device

In one embodiment, the light emitting from at least one surface of the light emitting device has an angular Full-Width at Half-Maximum intensity (FWHM) less than one selected from the group: 120 degrees, 100 degrees, 80 degrees, 60 degrees, 40 degrees, 20 degrees and 10 degrees. In another embodiment, the light emitting from at least one surface of the light emitting device has at least one angular peak of intensity within at least one angular range selected from the group: 0-10 degrees, 20-30 degrees, 30-40 degrees, 40-50 degrees, 60-70 degrees, 70-80 degrees, 80-90 degrees, 40-60 degrees, 30-60 degrees, and 0-80 degrees from the normal to the light emitting surface. In another embodiment, the light emitting from at least one surface of the light emitting device has two peaks within one or more of the aforementioned angular ranges and the light output resembles a "bat-wing" type profile known in the lighting industry to provide uniform illuminance over a predetermined angular range. In another embodiment, the light emitting device emits light from two opposing surfaces within one or more of the aforementioned angular ranges and the light emitting device is one selected from the group: a backlight illuminating two displays on either side of the backlight, a light fixture providing up-lighting and down-lighting, a frontlight illuminating a display and having light output on the viewing side of the frontlight that has not reflected from the modulating components of the reflective spatial light modulator with a peak angle of luminance greater than 40 degrees, 50 degrees, or 60 degrees. In another embodiment, the optical axis of the light emitting device is within an angular range selected from the group: 0-20, 20-40, 40-60, 60-80, 80-100, 100-120, 120-140, 140-160, 160-180, 35-145, 45-135, 55-125, 65-115, 75-105, and 85-95 degrees from the normal to a light emitting surface. In a further embodiment, the shape of the lightguide is substantially tubular and the light substantially propagates through the tube in a direction parallel to the longer (length) dimension of the tube and the light exits the tube wherein at least 70% of the light output flux is contained within an angular range of 35 degrees to 145 degrees from the light emitting surface. In a further embodiment, the light emitting device emits light from a first surface and a second surface opposite the first surface wherein the light flux exiting the first and second surfaces, respectively, is chosen from the group: 5-15% and 85-95%, 15-25% and 75-85%, 25-35% and 65-75%, 35-45% and 65-75%, 45-55% and 45-55%. In another embodiment, the first light emitting surface emits light in a substantially downward direction and the second light emitting surface emits light substantially in an upward direction. In another embodiment, the first light emitting surface emits light in a substantially upward direction and the second light emitting surface emits light substantially in a downward direction.

Method of Manufacturing Light Input/Output Coupler

In one embodiment, the lightguide and light input or output coupler are formed from a light transmitting film by creating segments of the film corresponding to the coupling lightguides and translating and bending the segments such that a plurality of segments overlap. In a further embodiment, the input surfaces of the coupling lightguides are arranged to create a collective light input surface by translation of the coupling lightguides to create at least one bend or fold.

Film Production

In one embodiment, the film or lightguide is one selected from the group: extruded film, co-extruded film, cast film, solvent cast film, UV cast film, pressed film, injection molded film, knife coated film, spin coated film, and coated film. In one embodiment, one or two cladding layers are co-extruded on one or both sides of a lightguide region.

Relative Position Maintaining Element

In one embodiment, at least one relative position maintaining element substantially maintains the relative position of the coupling lightguides in the region of the first linear fold region, the second linear fold region or both the first and second linear fold regions. In one embodiment, the relative position maintaining element is disposed adjacent the first linear fold region of the array of coupling lightguides such that the combination of the relative position maintaining element with the coupling lightguide provides sufficient stability or rigidity to substantially maintain the relative position of the coupling lightguides within the first linear fold region during translational movements of the first linear fold region relative to the second linear fold region to create the overlapping collection of coupling lightguides and the bends in the coupling lightguides.

Folder

In one embodiment, the coupling lightguides are folded or bent using opposing folding mechanisms. In another embodiment, grooves, guides, pins, or other counterparts facilitate the bringing together opposing folding mechanisms such that the folds or bends in the coupling lightguides are correctly folded. In another embodiment, registration guides, grooves, pins or other counterparts are disposed on the folder to hold in place or guide one or more coupling lightguides or the lightguide during the folding step.

The following are more detailed descriptions of various embodiments illustrated in the Figures.

FIG. 1 is a top view of one embodiment of a light emitting device 100 including a light input coupler 101 disposed on one side of a film-based lightguide. The light input coupler 101 includes coupling lightguides 104 and a light source 102 disposed to direct light into the coupling lightguides 104 through a light input surface 103 including input edges of the coupling lightguides 104. In one embodiment, each coupling lightguide 104 includes a coupling lightguide terminating at a bounding edge. Each coupling lightguide is folded such that the bounding edges of the coupling lightguides are stacked to form the light input surface 103. The light emitting device 100 further includes a lightguide region 106 defining a light mixing region 105, a lightguide 107, and a light emitting region 108. Light from the light source 102 exits the light input coupler 101 and enters the lightguide region 106 of the film. This light spatially mixes with light from different coupling lightguides 104 within the light mixing region 105 as the light propagates through the lightguide 107. In one embodiment, light is emitted from the lightguide 107 in the light emitting region 108 due to light extraction features (not shown).

Figure 2:
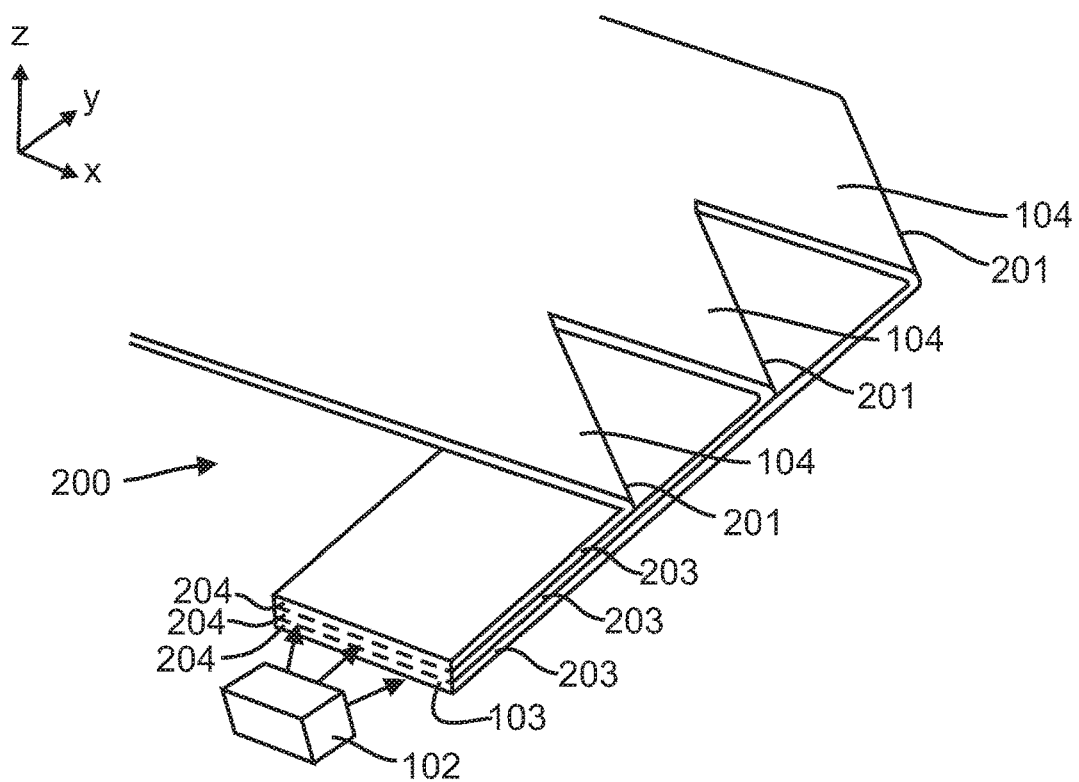
FIG. 2 is a perspective view of one embodiment of a light input coupler with coupling lightguides folded in the −y direction.

FIG. 2 is a perspective view of one embodiment of a light input coupler 200 with coupling lightguides 104 folded in the −y direction. Light from the light source 102 is directed into the light input surface 103 through or along input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction.

Figure 3:
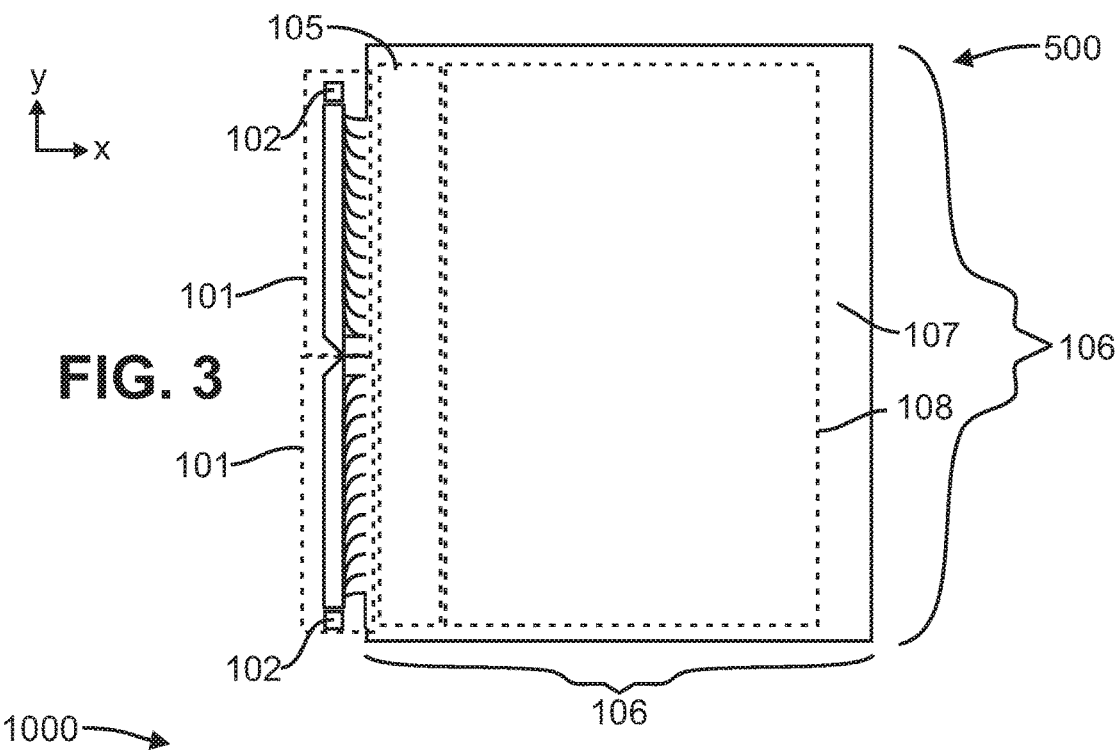
FIG. 3 is a top view of one embodiment of a light emitting device with two light input couplers disposed on the same side of a lightguide wherein the optical axes of the light sources are oriented substantially toward each other.

FIG. 3 is a top view of one embodiment of a light emitting device 500 with two light input couplers 101 disposed on the same side of the lightguide region 106. In this embodiment, the light sources 102 are oriented substantially with the light directed toward each other in the +y and −y directions.

Figure 4:
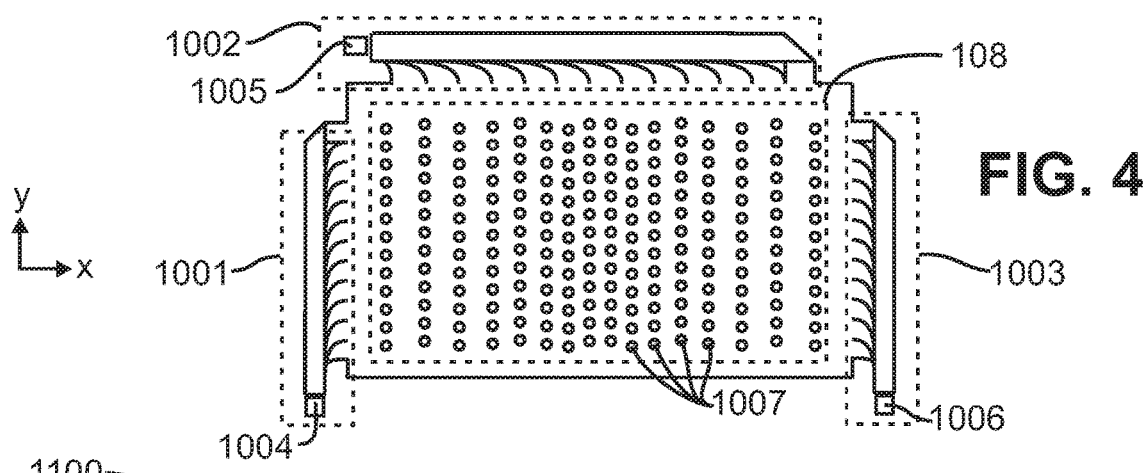
FIG. 4 is a top view of one embodiment of a light emitting device including three light input couplers.

FIG. 4 is a top view of one embodiment of a light emitting backlight 1000 configured to emit red, green, and blue light. The light emitting backlight 1000 includes a red light input coupler 1001, a green light input coupler 1002, and a blue light input coupler 1003 disposed to receive light from a red light source 1004, a green light source 1005, and a blue light source 1006, respectively. Light from each of the light input couplers 1001, 1002, and 1003 is emitted from the light emitting region 108 due to the light extraction features 1007 which redirect a portion of the light to angles closer to the surface normal within the lightguide region 106 such that the light does not remain within the lightguide 107 and exits the light emitting backlight 1000 in a light emitting region 108. The pattern of the light extraction features 1007 may vary in one or more of a size, a space, spacing, a pitch, a shape, and a location within the x-y plane or throughout the thickness of the lightguide in the z direction.

Figure 5:
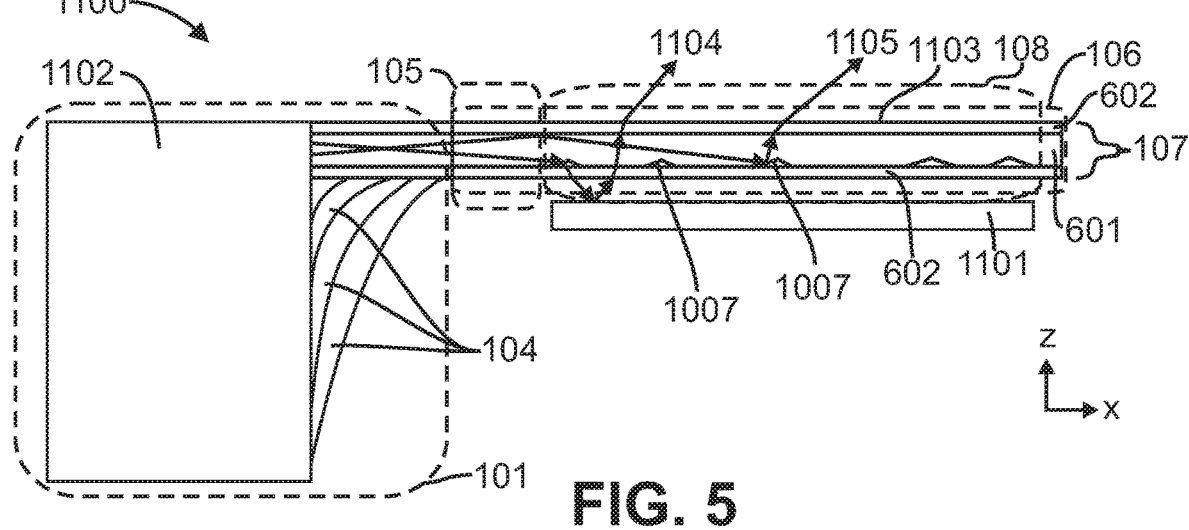
FIG. 5 is a cross-sectional side view of one embodiment of a light emitting device including a light input coupler and lightguide with a reflective optical element disposed adjacent a surface.

FIG. 5 is a cross-sectional side view of one embodiment of a light emitting device 1100 including the light input coupler 101 and the lightguide 107 with a reflective optical element 1101 disposed adjacent the cladding region 602 and a light source 1102 with an optical axis in the +y direction disposed to direct light into the coupling lightguides 104. Light from the light source 1102 propagates through the coupling lightguides 104 within the light input coupler 101, through the light mixing region 105, and through the core layer 601 of the lightguide 107 within light emitting region 108 of the lightguide region 106. Referring to FIG. 5, a first portion of light 1104 reaching the light extraction features 1007 is redirected toward the reflective optical element 1101 at an angle less than the critical angle such that the light can escape the lightguide 107, reflect from the reflective optical element 1101, pass back through the lightguide 107, and exit the lightguide 107 through the light emitting surface 1103 of the light emitting region 108. A second portion of light 1105 reaching the light extraction features 1007 is redirected toward the light emitting surface 1103 at an angle less than the critical angle, escapes the lightguide 107, and exits the lightguide 107 through the light emitting surface 1103 of the light emitting region 108.

Figure 6:
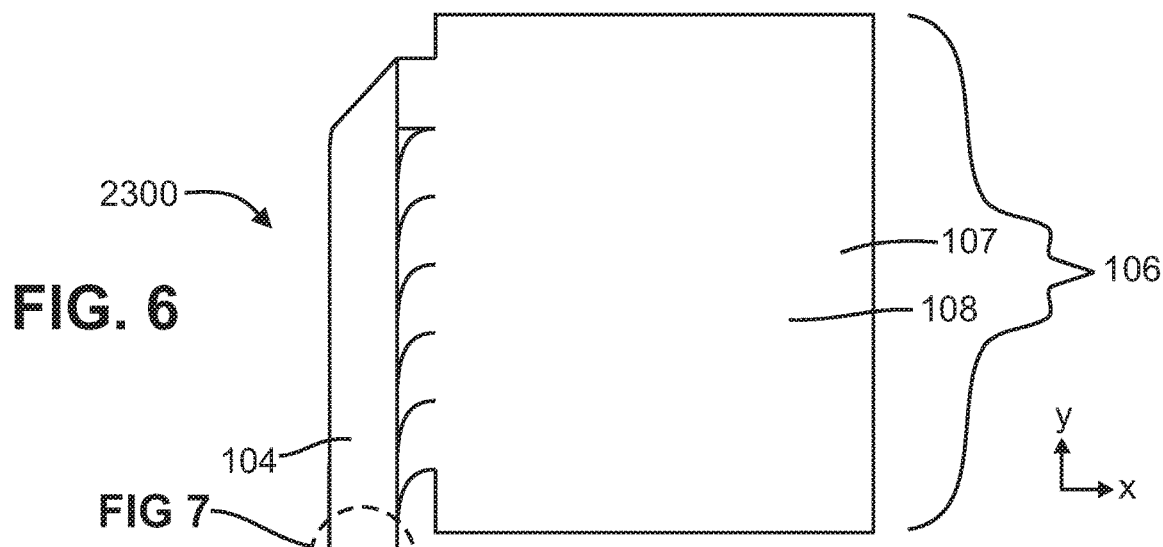
FIG. 6 is a top view of one embodiment of a light emitting device including coupling lightguides with a plurality of first reflective surface edges and a plurality of second reflective surface edges within each coupling lightguide.

FIG. 6 is a top view of one embodiment of a light emitting device 2300 including a plurality of coupling lightguides 104 with a plurality of first reflective surface edges 3908 and a plurality of second reflective surface edges 3907 within each coupling lightguide 104. In the embodiment shown in FIG. 6, three light sources 102 are disposed to couple light into respective light input edges 204 at least partially defined by respective first reflective surface edges 3908 and second reflective surface edges 3907.

Figure 7:
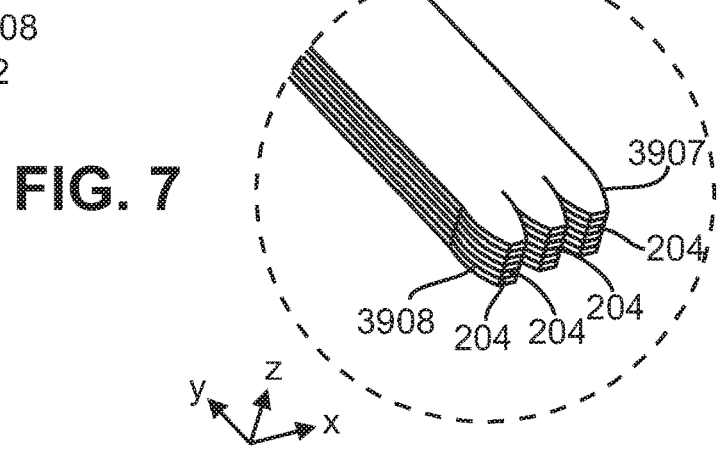
FIG. 7 is an enlarged perspective view of the input end of the coupling lightguides of FIG. 6.

FIG. 7 is an enlarged perspective view of the coupling lightguides 104 of FIG. 6 with the light input edges 204 disposed between the first reflective surface edges 3908 and the second reflective surface edges 3907. The light sources 102 are omitted in FIG. 7 for clarity.

Figure 8:
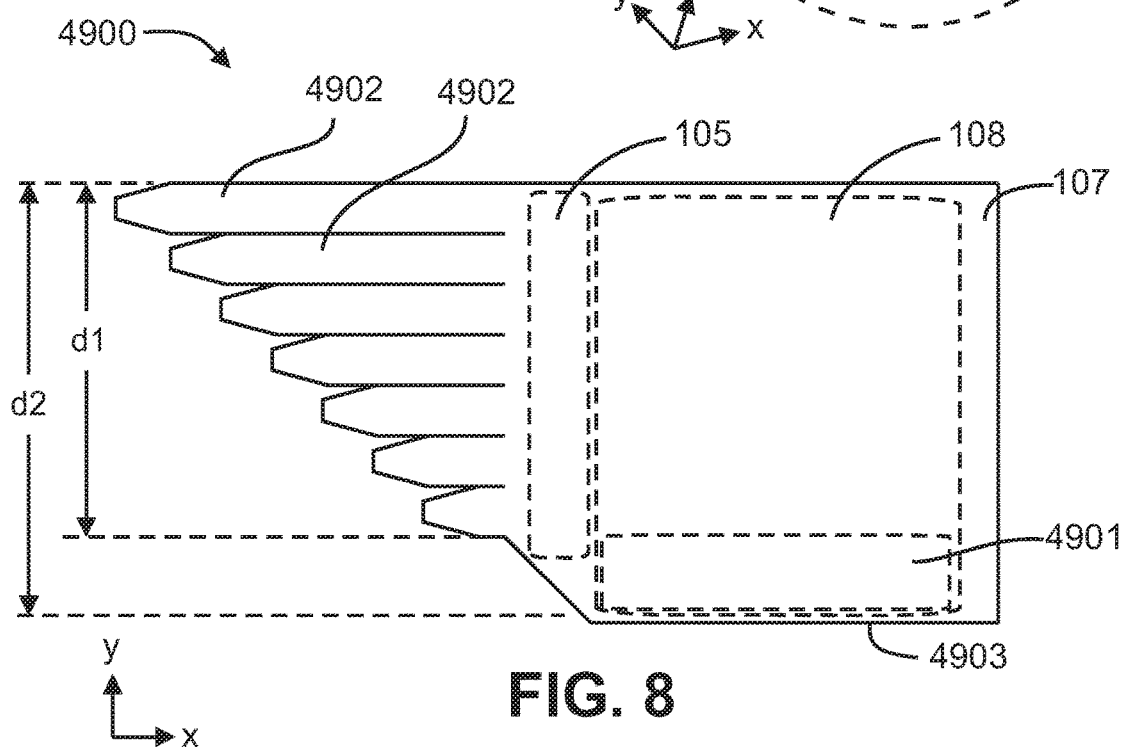
FIG. 8 is a top view of one embodiment of a film-based lightguide including an array of tapered coupling lightguides.

FIG. 8 is a top view of one embodiment of a film-based lightguide 4900 including an array of tapered coupling lightguides 4902 formed by cutting regions in a lightguide 107. The array of tapered coupling lightguides 4902 are formed in a first direction (y direction as shown) with an array dimension length, d1, which is less than a parallel dimension length, d2, of the light emitting region 108 of the lightguide 107. A compensation region 4901 is defined within the film-based lightguide 4900 and does not include tapered coupling lightguides 4902 extending therefrom. In this embodiment, the compensation region 4901 provides a volume having sufficient length in the y direction to place a light source (not shown) such that the light source does not extend past the lower edge 4903 of the lightguide 107. The compensation region 4901 of the light emitting region 108 may have a higher density of light extraction features (not shown) to compensate for the lower input flux directly received from the tapered coupling lightguides 4902 into the light emitting region 108. In one embodiment, a substantially uniform luminance or light flux output per area in the light emitting region 108 is achieved despite the lower level of light flux received by the light extraction features within the compensation region 4901 of the light emitting region 108 by, for example, increasing the light extraction efficiency or area ratio of the light extraction features to the area without light extraction features within one or more regions of the compensation region 4901, increasing the width of the light mixing region 105 between the coupling lightguides 4902 and the light emitting region 108, decreasing the light extraction efficiency or the average area ratio of the light extraction features to the areas without light extraction features in one or more regions of the light emitting region 108 outside the compensation region 4901, or any suitable combination thereof.

Figure 9:
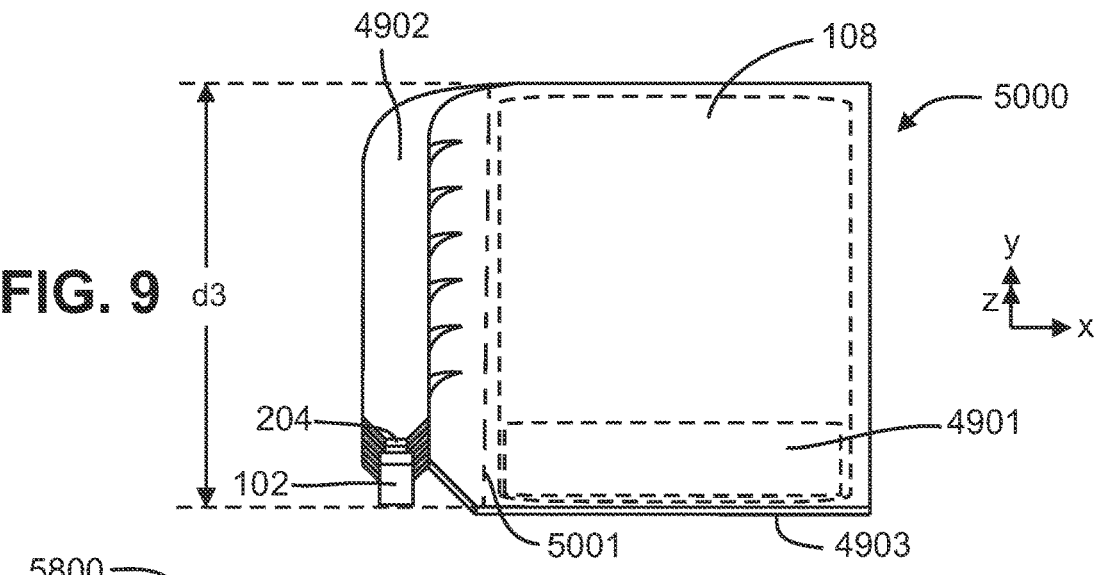
FIG. 9 is a perspective top view of a light emitting device of one embodiment including the film-based lightguide of FIG. 8 and a light source.

FIG. 9 is a perspective top view of one embodiment of a light emitting device 5000 including the film-based lightguide 4900 shown in FIG. 8 and a light source 102. In this embodiment, the tapered coupling lightguides 4902 are folded in the −y direction toward the light source 102 such that the light input edges 204 of the coupling lightguides 4902 are disposed to receive light from the light source 102. Light from the light source 102 propagating through the tapered coupling lightguides 4902 exits the tapered coupling lightguides 4902 and enters into the light emitting region 108 generally propagating in the +x direction while expanding in the +y and −y directions. In this embodiment, the light source 102 is disposed within the region that did not include a tapered coupling lightguide 4902 and the light source 102 does not extend in the y direction past a lower edge 4903 of the light emitting device 5000. By not extending past the lower edge 4903, the light emitting device 5000 has a shorter overall width in the y direction. Furthermore, the light emitting device 5000 can maintain the shorter dimension, d3, in the y direction (shown in FIG. 9) when the tapered coupling lightguides 4902 and the light source 102 are folded under (−z direction and then +x direction) the light emitting region 108 along the fold (or bend) line 5001.

Figure 10:
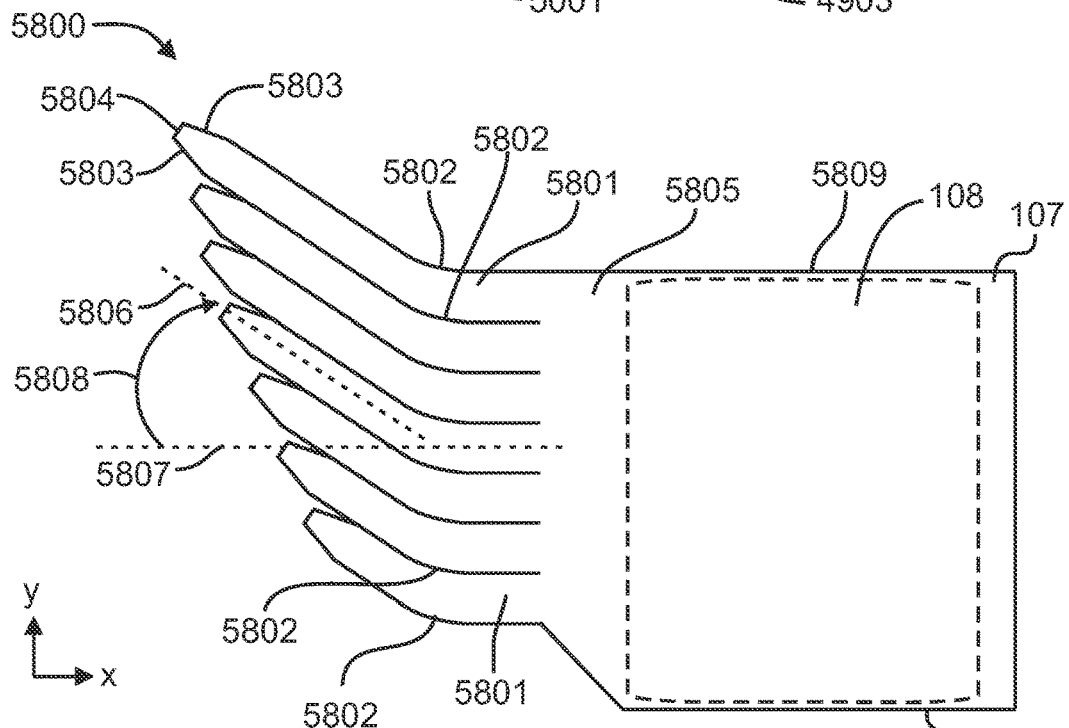
FIG. 10 is top view of one embodiment of a film-based lightguide including an array of oriented coupling lightguides with tapered light collimating lateral edges adjacent the input surface and light turning edges between the light input surface and the light mixing region of the film-based lightguide.

FIG. 10 is top view of one embodiment of a film-based lightguide 5800 including an array of oriented coupling lightguides 5801 oriented parallel to a first direction 5806 at a coupling lightguide orientation angle 5808 from the second direction 5807 perpendicular to the direction (y-direction) of the array of oriented coupling lightguides 5801 at the light mixing region 5805. The array of oriented coupling lightguides 5801 includes tapered light collimating lateral edges 5803 adjacent the light input surface 5804 and light turning lateral edges 5802 between the light input surface 5804 and the light mixing region 5805 of the film-based lightguide 107. In this embodiment, light from a light source (not shown) disposed to emit light into the light input surface 5804 when the array of oriented coupling lightguides 5801 are folded propagates with its optical axis parallel to the first direction 5806 of the array of oriented coupling lightguides 5801 and the optical axis is turned by the light turning lateral edges 5802 such that the optical axis is substantially parallel to the second direction 5807 perpendicular to the direction (y-direction) of the array of oriented coupling lightguides 5801 at the light mixing region 5805. In this embodiment, when the oriented coupling lightguides 5801 are folded, the light source can be positioned between the planes (parallel to the z direction) including the lateral edges (5809, 5810) of the lightguide 107 such that a device or display including the light emitting device with the film-based lightguide 5800 does not require a large frame or a border region extending significantly past the lateral edges (5809, 5810) of the film-based lightguide in they direction (as folded once or when the array of oriented coupling lightguides 5801 are folded and the light source, the array of oriented coupling lightguides 5801, and the light mixing region 5805 are folded behind the light emitting region 108 of the film based lightguide 107). The array of oriented coupling lightguides 5801 permit the light source to be positioned between the planes including the lateral edges (5809, 5810) of the film-based lightguide and the light turning lateral edges 5802 redirect the optical axis of the light toward the second direction 5807 perpendicular to the direction (y-direction) of the array of oriented coupling lightguides 5801 at the light mixing region 5805 such that the optical axis of the light is oriented substantially parallel to the second direction 5807 when the light is extracted by light extraction features (not shown) with light redirecting surface oriented substantially parallel to the array direction (y direction) of the array of oriented coupling lightguides 5801.

Figure 11:
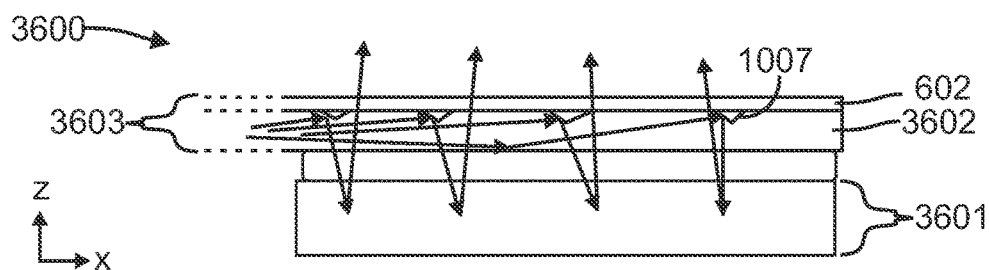
FIG. 11 is a cross-sectional side view of one embodiment of a spatial display including a frontlight.

FIG. 11 is a cross-sectional side view of one embodiment of a spatial display 3600 including a frontlight 3603 optically coupled to a reflective spatial light modulator 3601. The frontlight 3603 includes a film-based lightguide 3602 with the light extracting features 1007 that direct light to the reflective spatial light modulator 3601 at angles near the surface normal of the reflective spatial light modulator 3601. In one embodiment, the reflective spatial light modulator 3601 is an electrophoretic display, a microelectromechanical system (MEMS)-based display, or a reflective liquid crystal display. In one embodiment, the light extraction features 1007 direct one of 50%, 60%, 70%, 80%, and 90% of the light exiting the frontlight 3603 toward the reflective spatial light modulator 3601 within an angular range of 60 degrees to 120 degrees from the light emitting surface of the frontlight 3603.

FIG. 12 is a cross-sectional side view of one embodiment a light emitting display 1550 with a film-based lightguide 1551 physically coupled to a flexible display connector 1556. In this embodiment, the reflective spatial light modulator 1559 includes a bottom substrate 1554 and the film-based lightguide 1551 is a top substrate. Light 1552 from the light source 102 physically coupled to the flexible display connector 1556 is directed into the film-based lightguide 1551 and is redirected by light extraction features 1561 to the active layer 1553 where the light 1552 reflects and passes back through the film-based lightguide 1551, and the upper cladding layer 1557, and exits the light emitting display 1550.

FIG. 13 is a perspective view of one embodiment of a light emitting device 3800 including a film-based lightguide 3802 physically coupled to a flexible display connector 1556 for the reflective spatial light modulator 1559 with a light source 102 disposed on a circuit board 3805 physically coupled to the flexible display connector 1556. In this embodiment, the reflective spatial light modulator 1559 includes an active layer 1553 positioned between a bottom substrate 1554 and a top substrate 1650. The top substrate 1650 of the reflective spatial light modulator 1559 is optically coupled to the film-based lightguide 3802 using an adhesive cladding layer 3806.

FIG. 14 is a cross-sectional side view of a portion of one embodiment of a spatial display 9200 illuminated by a frontlight 9211 including a film-based lightguide 9210 optically coupled to a reflective spatial light modulator 3601 using an adhesive 9206 (such as an acrylate-based pressure sensitive adhesive) in the active area 9208 of the reflective spatial light modulator 3601. After exiting the light source (not shown) and the folded, stacked coupling lightguides (not shown) light 9212 exits the light mixing region 9209 of the film-based lightguide 9210 and reflects from the light extracting features 1007 on the surface of the film-based lightguide 9210 toward the reflective spatial light modulator 3601 at angles near the surface normal 9202 of the reflective spatial light modulator 3601. The light 9212 reflects from the reflective spatial light modulator 3601 and passes back through the film-based lightguide 9210 and out of the spatial display 9200. A scratch resistant hardcoating 9204 on a hardcoating substrate 9203 protects the outer top surface 9207 of the spatial display 9200 and is optically coupled to the film-based lightguide 9210 using an adhesive 9205 (such as a silicone-based pressure sensitive adhesive). In this embodiment, the adhesive 9205 between the hardcoating substrate 9203 and the film-based lightguide 9210, and the adhesive 9206 between the film-based lightguide 9210 and the reflective spatial light modulator 3601 also function as cladding layers for the film-based lightguide 9210 and are shown partially coated in a region extended in the active area of the display but not coated completely across the light mixing region 9209 of the film-based lightguide 9210.

FIG. 15 is a cross-sectional side view of a portion of one embodiment of a spatial display 9600 illuminated by a frontlight 9604 including a film-based lightguide 9610. The film-based lightguide 9610 is optically coupled to a color reflective display 9622 including a color filter substrate 9606, a color filter layer 9611, and a reflective spatial light modulator 9621. In this embodiment, the film-based lightguide 9610 is adhered and optically coupled to the color reflective display 9622 using a light transmitting adhesive 9620 (such as an optically clear pressure sensitive adhesive) to adhere the film-based lightguide 9610 to the color filter substrate 9606 in the active area 9608 of the color reflective display 9622. The color filter layer 9611 includes an array of first color filters 9601 and second color filters 9602 separated by inactive areas 9603 (areas without color filters) of the color filter layer 9611. Light 9623, after exiting the light source (not shown) and the folded, stack coupling lightguides (not shown), propagating through the frontlight 9604 exits the film-based lightguide 9610 by reflecting from the light extracting features 1007 on the surface of the film-based lightguide 9610 toward the color reflective display 9622 at angles near the surface normal 9607 of the color reflective display 9622. The light 9623 is directed toward the first color filters 9601 and second color filters 9602 due to the physical and optical properties (such as position and facet angle) of the light extraction features 1007. In one embodiment, the light 9623 does not pass through the inactive areas 9603 of the color filter layer 9611. In another embodiment, by aligning the light extraction features 1007 with the first color filters 9601 and the second color filters 9602 and directing the light 9623 through the first color filters 9601 and second color filters 9602 at an angle near the surface normal 9607 of the color reflective display 9622, light 9623 is not directed to the inactive areas 9603 of the color filter layer 9611 where it could be absorbed. In the embodiment illustrated in FIG. 15, a scratch resistant hardcoating 9204 on a hardcoating substrate 9203 protects the outer top surface 9207 of the spatial display 9600 and is optically coupled to the film-based lightguide 9610 using an adhesive 9205 (such as a silicone-based pressure sensitive adhesive). In one embodiment, the adhesive 9205 between the hardcoating substrate 9203 and the film-based lightguide 9610, and the light transmitting adhesive 9620 between the film-based lightguide 9610 and the color filter substrate 9606 also function as cladding layers for the film-based lightguide 9610 in the active area 9608 of the color reflective display 9622.

Figure 16:
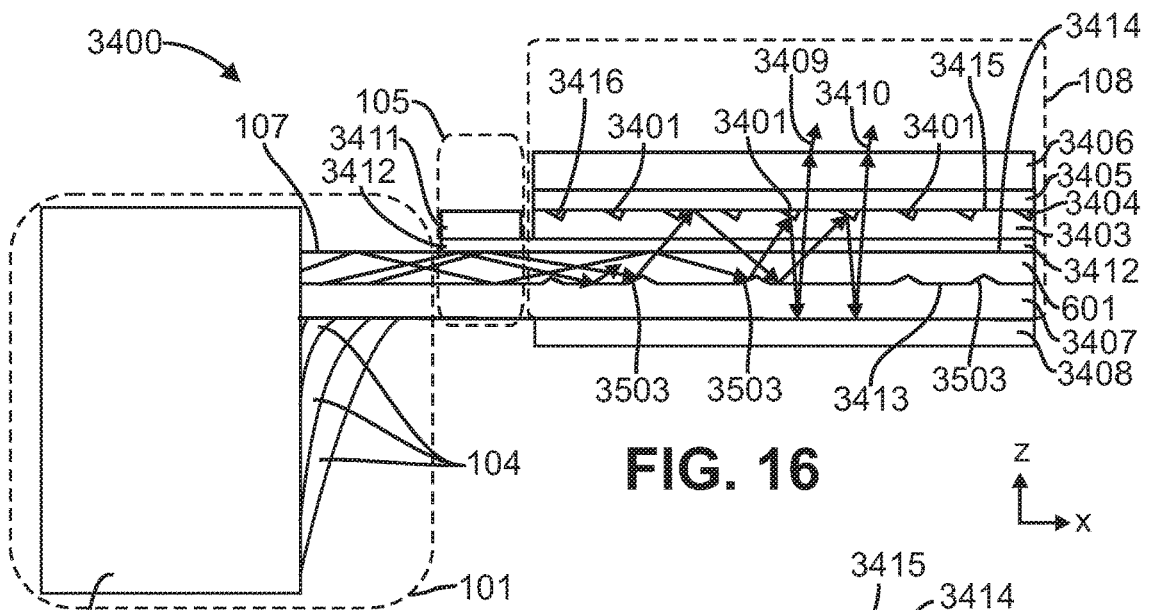
FIG. 16 is a cross-sectional side view of one embodiment of a light emitting device comprising low angle light directing features.

FIG. 16 is a cross-sectional side view of one embodiment of a light emitting device 3400 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index mi. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of reflective light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the reflective light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3409 and second light 3410 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3409 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3409 and the second light 3410 preferentially escape a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108.

After being redirected by the low angle directing feature 3503, the second light 3410 propagates from the core layer 601 into the second pressure sensitive adhesive layer 3412 and into the light turning film 3403. The second light 3410 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3410 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 17:
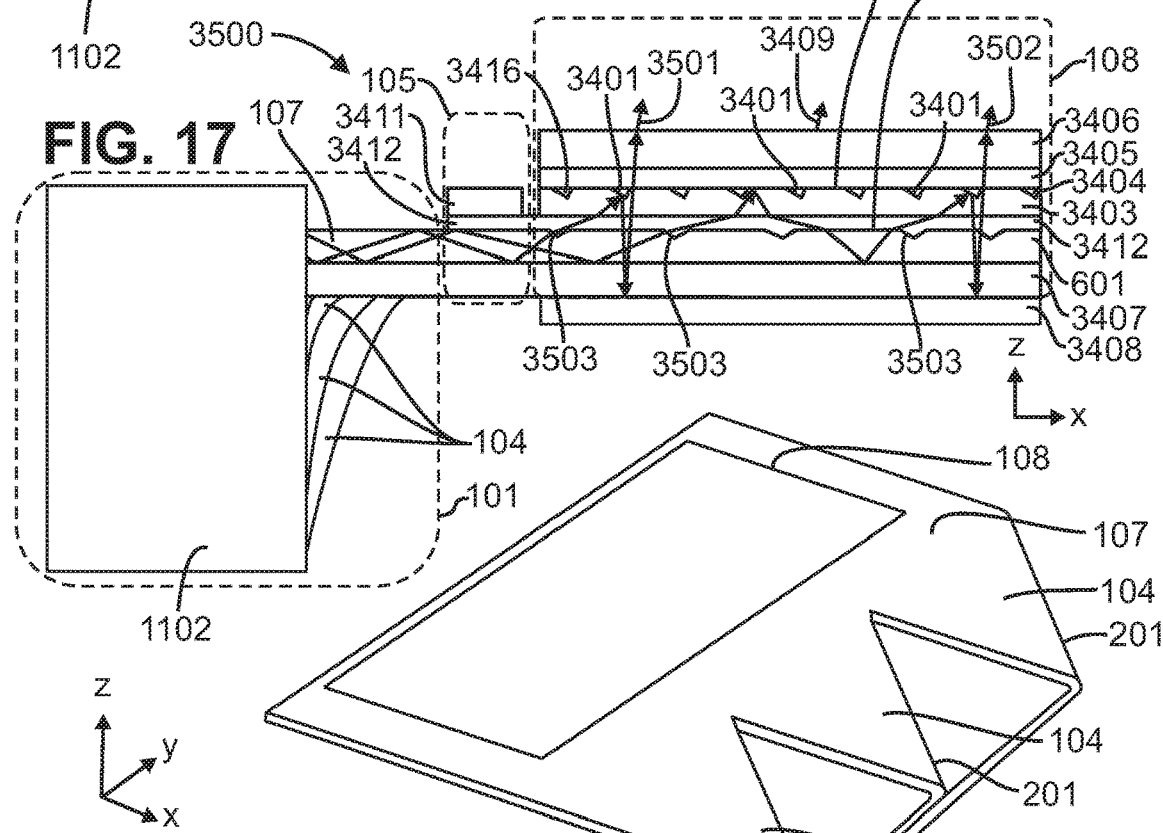
FIG. 17 is a cross-sectional side view of one embodiment of a light emitting device comprising light turning features.

FIG. 17 is a cross-sectional side view of one embodiment of a light emitting device 3500 comprising the light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index nm. A light source 1102 with an optical axis parallel to the +y direction (into the page) is positioned to emit light into the folded stack of coupling lightguides 104. The film-based lightguide 107 comprises a plurality of refractive low angle directing features 3503 on the upper surface 3414 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of reflective light turning features 3401 on the top surface 3415 of the light turning film 3403 opposite the second pressure sensitive adhesive layer 3412. A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the reflective light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, first light 3501 and second light 3502 from the light source 1102 propagate through the coupling lightguides 104 within the light input coupler 101, totally internally reflect within the core layer 601 of the film-based lightguide 107 and propagate through the light mixing region 105 and into the light emitting region 108 of the film-based lightguide 107. First light 3501 refracts to a new angle smaller than the incident angle by an average total angle of deviation of less than 20 degrees at a refractive low angle directing feature 3503 such that it propagates out of the core layer 601 of the lightguide. In this embodiment, a portion of the light from within the core layer 601 that intersects a refractive low angle directing feature 3503 may transmit through the refractive low angle directing feature 3503 and a portion may reflect from the low angle directing feature 3503. In this embodiment, $n_{DL} > n_{D2} > n_{D1}$ such that a portion of the light that reflects from the low angle directing feature 3503 may reflect at a total angle of deviation of less than 20 degrees such that it reflects from the boundary between the core layer 601 and the first pressure sensitive adhesive layer 3407 and exits the core layer 601 at the upper surface 3414 of the core layer 601. After crossing the interface between the core layer 601 and the second pressure sensitive adhesive, the first light 3501 then propagates through the second pressure sensitive adhesive layer 3412 into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3501 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3500 in the light emitting region 108.

After being redirected by the low angle directing feature 3503, the second light 3502 propagates through the second pressure sensitive adhesive layer 3412 and into the light turning film 3403. The second light 3502 does not intersect a light turning feature 3401 on the first pass and totally internally reflects from the top surface 3415 of the light turning film 3403 between the light turning features 3401 and propagates back through the light turning film 3403, through the second pressure sensitive adhesive layer 3412, through the core layer 601 and totally internally reflects at the interface between the core layer 601 and the first pressure sensitive adhesive layer 3407, passes back through the aforementioned layers in reverse order and totally internally reflects from a light turning feature 3401 in the light turning film 3403 to an angle within 30 degrees from the thickness direction (parallel to the z direction in this embodiment) of the film-based lightguide 107. The second light 3502 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, and is emitted from the light emitting device 3400 in the light emitting region 108.

Figure 18:
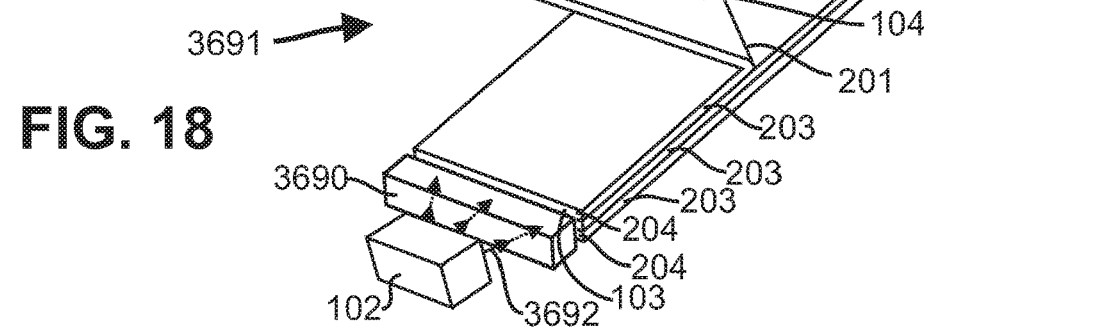
FIG. 18 is a perspective view of one embodiment of a light emitting device comprising a phase compensation element.

FIG. 18 is a perspective view of one embodiment of a light emitting device 3691 comprising a light input coupler 200 with coupling lightguides 104 folded in the −y direction. Light 3692 from the light source 102 is directed through a phase compensation element 3690 into the light input surface 103 through or along input edges 204 of the coupling lightguides 104. A portion of the light from the light source 102 propagating within the coupling lightguides 104 with a directional component in the +y direction will reflect in the +x and −x directions from the lateral edges 203 of the coupling lightguides 104 and will reflect in the +z and −z directions from the top and bottom surfaces of the coupling lightguides 104. The light propagating within the coupling lightguides is redirected by the folds 201 in the coupling lightguides 104 toward the −x direction and the light emitting region 108 of the lightguide 107. In this embodiment, the phase compensation element 3690 pre-compensates for the phase deviation of the light propagating through the coupling lightguides 104 and the lightguide 107 such that a uniform or pre-determined spatial phase output profile of light emitting from the light emitting region 108 of the light emitting device 3691 is achieved.

FIG. 19 is a cross-sectional side view of one embodiment of a light emitting device 3700 comprising the light input coupler 101, a film-based lightguide 107 comprising a core layer 601 of a core material with a core refractive index $n_{DL}$ optically coupled to a light turning film 3403 over a portion of the top surface 3704 of the light turning film 3403 (such that air gaps 3416 are formed at the reflective light turning features 3401) using a second pressure sensitive adhesive layer 3412 comprising a second material with a second refractive index $n_{D2}$. The reflective spatial light modulator 3408 is optically coupled to the light turning film 3403 using a third pressure sensitive adhesive layer 3405. The light turning film 3403 comprises a plurality of reflective light turning features 3401 on the top surface 3705 of the light turning film 3403 opposite the third pressure sensitive adhesive layer 3405. A light source 1102 with an optical axis parallel to the +y direction (into the page) is positioned to emit light into the folded stack of coupling lightguides 104. The film-based lightguide 107 comprises a plurality of low angle directing features 3503 on the top surface 3705 of the core layer 601 of the film-based lightguide 107 and is optically coupled to a cover layer 3406 (such as a protective PET film or touchscreen film, for example) using a first pressure sensitive adhesive layer 3407 comprising a first material with a first refractive index nm.

A light mixing region 105 is positioned between the light input coupler 101 and the light emitting region 108 of the light emitting device 3700. An opaque layer 3411 is optically coupled to the film-based lightguide 107 in the light mixing region 105 using the first pressure sensitive adhesive layer 3407. In this embodiment, the opaque layer 3411 is a light absorbing layer that absorbs at least 70% of the light within a wavelength range between 400 nanometers and 700 nanometers that reaches the opaque layer 3411 through the first pressure sensitive adhesive layer 3407. In this embodiment, first light 3701 from the light source 1102 propagates through the coupling lightguides 104 within the light input coupler 101, totally internally reflect within the core layer 601 of the film-based lightguide 107 and propagates through the light mixing region 105 and into the light emitting region 108 of the film-based lightguide 107. First light 3701 reflects from a low angle directing feature 3503 to a second angle in the core layer 601 of the lightguide smaller than the incident angle by an average total angle of deviation of less than 20 degrees. In this embodiment, the second angle is less than the critical angle for the interface between the core layer 601 and second pressure sensitive adhesive layer 3412. In this embodiment, $n_{DL} > n_{D2} > n_{D1}$ such that the first light 3701 preferentially escapes a total internal reflection condition within the core layer 601 of the film-based lightguide 107 on the lower surface 3706 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, the first light 3409 propagates into the light turning film 3403 and totally internally reflects from a light turning feature 3401 in the light turning film 3403 to an angle within 30 degrees from the thickness direction (parallel to the z direction in this embodiment) of the film-based lightguide 107. The first light 3409 then propagates through the third pressure sensitive adhesive layer 3405 and reflects from the reflective spatial light modulator 3408, passes back through the aforementioned layers in the reverse order, does not interact a second time with a light turning feature 3401, and is emitted from the light emitting device 3400 in the light emitting region 108.

FIG. 20 is a cross-sectional side view of one embodiment of a light emitting device 5700 comprising a light input coupler 101, a film-based lightguide 107 comprising a core layer 601 of a core material with a core refractive index $n_{DL}$ optically coupled to a reflective spatial light modulator 3408 using a first pressure sensitive adhesive layer 3407 comprising a first material with a first refractive index $n_{D1}$. A light source 1102 with an optical axis parallel to the +y direction (into the page) is positioned to emit light into the folded stack of coupling lightguides 104. The film-based lightguide 107 comprises a plurality of low angle directing features 3503 on the lower surface 3413 of the core layer 601 of the film-based lightguide 107 and is optically coupled to a light turning film 3403 on the upper surface 3414 of the core layer 601 using a second pressure sensitive adhesive layer 3412 comprising a second material with a second refractive index $n_{D2}$. The light turning film 3403 comprises a plurality of reflective light turning features 3401 on the top surface 3415 of the light turning film 3403 opposite the second pressure sensitive adhesive layer 3412. The light turning film 3403 also comprises a plurality of printed black regions 5702 overprinted with a plurality of white, light scattering regions 5701 on the lower surface 5703 of the light turning film 3403 in the light emitting region 108. The white, light scattering regions 5701 increase the spread of light in the lateral direction (the direction into (+y direction) and out from (−y direction) the plane of the page), toward the excess width region or reflect light so as to create a new virtual origin and direction of light reflecting from the white, light scattering region 5701 to redirect light such that it indirectly appears to originate from the excess width region and reduces angular shadow visibility (increases the relative luminance in the shadow region).

A third pressure sensitive adhesive layer 3405 optically couples a cover layer 3406 (such as a protective PET film or touchscreen film, for example) to the light turning film 3403 over a portion of the top surface 3415 such that air gaps 3416 are formed at the reflective light turning features 3401. A light mixing region 105 is positioned between the light input coupler 101 and the light emitting region 108 of the light emitting device 3400. An opaque layer 3411 is optically coupled to the film-based lightguide 107 in the light mixing region 105 using the second pressure sensitive adhesive layer 3412. In this embodiment, the opaque layer 3411 is a light absorbing layer that absorbs at least 70% of the light within a wavelength range between 400 nanometers and 700 nanometers that reaches the opaque layer 3411 through the second pressure sensitive adhesive layer 3412. In this embodiment, light 5704 from the light source 1102 propagates through the coupling lightguides 104 within the light input coupler 101, totally internally reflects within the core layer 601 of the film-based lightguide 107, and propagates through the light mixing region 105 and into the light emitting region 108 of the film-based lightguide 107. Light 5704 reflects from a low angle directing feature 3503 to a second angle in the core layer 601 of the lightguide smaller than the incident angle by an average total angle of deviation (such as smaller by less than 20 degrees, for example). In this embodiment, the second angle is less than the critical angle for the interface between the core layer 601 and second pressure sensitive adhesive layer 3412. In this embodiment, $n_{DL} > n_{D2} > n_{D1}$ such that the light 5704 preferentially escapes a total internal reflection condition within the core layer 601 of the film-based lightguide 107 on the upper surface 3414 of the core layer 601 since the refractive index, $n_{D2}$, of the second pressure sensitive adhesive layer 3412 is greater than the refractive index, $n_{D1}$, of the first pressure sensitive adhesive layer 3407. After transmitting from the core layer 601 into the second pressure sensitive adhesive layer 3412, light 5704 reflectively scatters more in they direction (lateral direction) such that a portion of the light 5704 is directed toward the excess width region. Light 5704 also passes back through the second pressure sensitive adhesive layer 3412 and the core layer 601 and reflects from the interface between the core layer 601 and the first pressure sensitive adhesive layer 3407 back into the core layer, propagates into the light turning film 3403 and totally internally reflects from a light turning feature 3401 in the light turning film 3403 to an angle (such as within 30 degrees from the thickness direction which is parallel to the z direction in this embodiment) of the film-based lightguide 107. The light 5704 then propagates back through the light turning film 3403, the second pressure sensitive adhesive layer 3412, the core layer 601, and the first pressure sensitive adhesive layer 3407, reflects from the reflective spatial light modulator 3408, passes back through the aforementioned layers in the reverse order, does not interact a second time with a light turning feature 3401, and is emitted from the light emitting device 3400 in the light emitting region 108. In another embodiment, alternatively, or in addition to the plurality of printed black regions 5702 overprinted with a plurality of white, light scattering regions 5701 on the lower surface 5703 of the light turning film 3403 in the light emitting region 108, the light emitting device 5700 may comprise a light scattering material, such as a thin white ink coating within the light turning features 3401 (such as grooves) of the light turning film 3403. As with the plurality of printed black regions 5702 overprinted with a plurality of white, light scattering regions 5701, the light scattering material in the light turning features 3401 may also increase the spread of light in the lateral direction (the direction into (+y direction) and out from (−y direction) the plane of the page), toward the excess width region or reflect light so as to create a new virtual origin and direction of light reflecting from the white, light scattering region 5701 to redirect light such that it indirectly appears to originate from the excess width region and reduces angular shadow visibility (increases the relative luminance in the shadow region).

FIG. 21 is a cross-sectional side view of one embodiment of a light emitting device 5900 comprising varying depth light turning features 5901 that vary in depth (have undulations or modulations of depth in the z direction along the length of the groove light directing feature in the y direction. The light emitting device 5900 is otherwise similar to the light emitting device 5700 of FIG. 20 except for the varying depth light turning features 5901 replaces the printed white and dark regions (shown in FIG. 20) as, for example, a method for reducing the visibility of the angular shadow. Light 5902 reflects off of the varying depth light turning features 5901 in the −z direction toward the reflective spatial light modulator 3408 and also into larger angles in the x-y plane toward the y direction (the light 5902 spreads further in the lateral y direction (in and out of the page of FIG. 21) due to the angles of the surface of the varying depth light turning features 5901 created by varying the depth in the z direction along the length in the y direction of the varying depth light turning features 5901. By spreading more light toward the +y and/or −y direction in the example shown, more light is directed toward the excess width region or light can reflect from the varying depth groove light directing features so as to create a new virtual origin and direction of light such that it indirectly appears to originate from the excess width region and reduces angular shadow visibility (increases the relative luminance in the shadow region). In a similar embodiment, the location groove may modulate or vary in the x direction along the groove oriented in the y direction (or at angle to the y direction) such that the surfaces of the groove spread more light in the lateral plane (x-y plane) toward the +y and/or −y directions as shown and toward the excess width regions.

Figure 22:
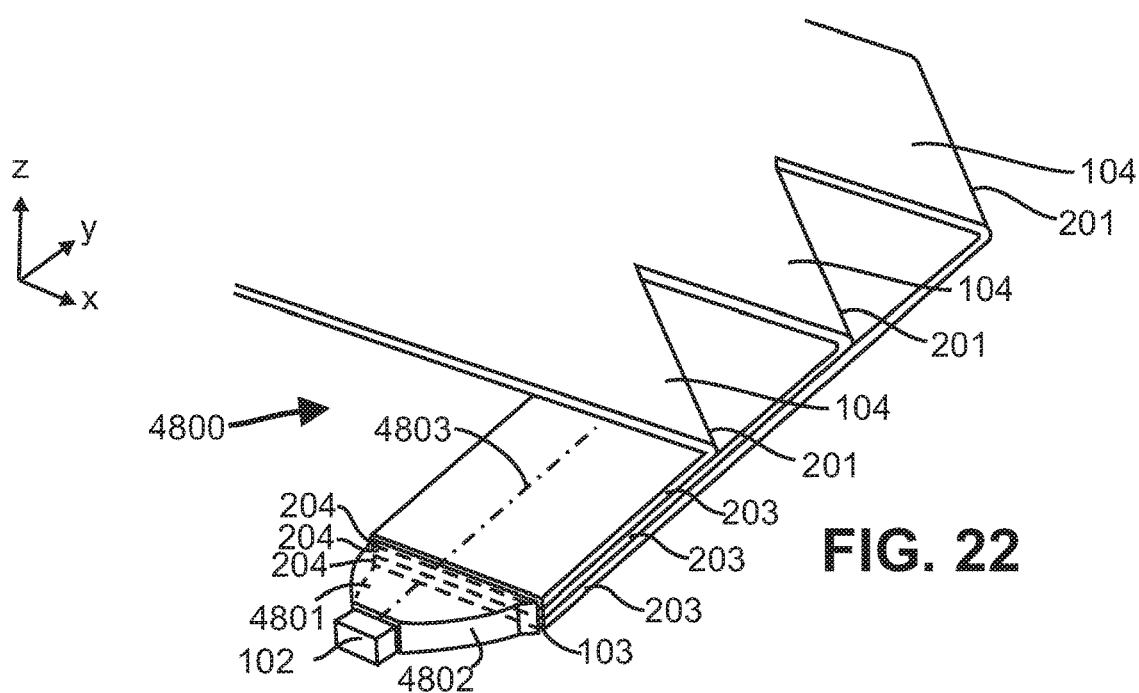
FIG. 22 is a perspective view of one embodiment of a light emitting device comprising an angular rotation optical element.

FIG. 22 is a top view of a portion of a light emitting device 4800 comprising a film-based lightguide 107 and an array of coupling lightguides 104 extended from the film-based lightguide 107 in the +x direction and folded into the +y direction such that the input edges 204 of the coupling lightguides 104 are stacked. The light emitting device 4800 comprises an angular rotation optical element 4801 between the light source 102 and the input edges 204 of the stacked coupling lightguides 104. The angular rotation optical element 4801 includes an array of rotation surfaces 6901 (shown in FIG. 23) and light collimating lateral edges 4802. Example light rays for the light from the light source 102 in the light emitting device 4800 are shown in FIG. 23.

Figure 23:
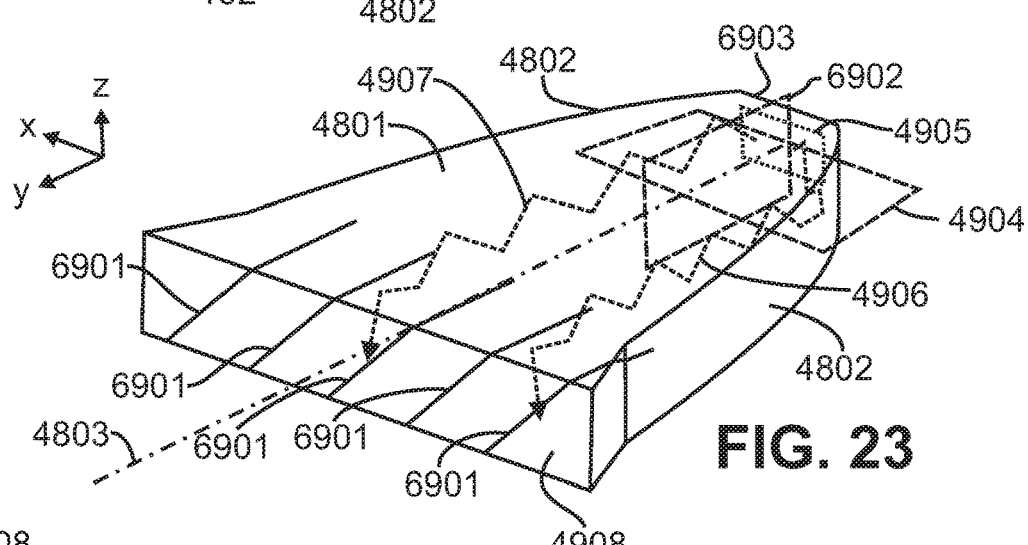
FIG. 23 is a perspective view of the angular rotation optical element of FIG. 22.
Figure 24:
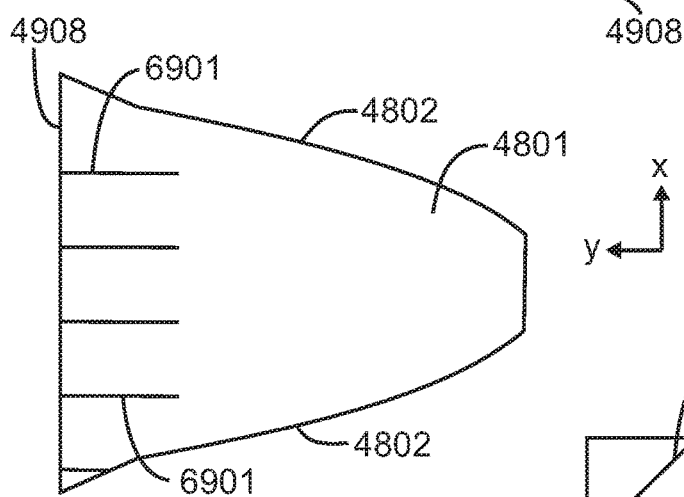
FIG. 24 is a top view of the angular rotation optical element of FIG. 22.
Figure 25:
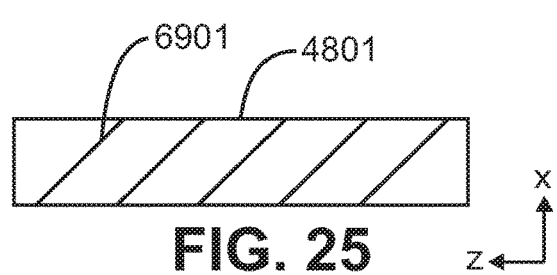
FIG. 25 is a side view of the angular rotation optical element of FIG. 22.

FIGS. 23,24, and 25 illustrate different views of the angular rotation optical element 4801 of the light emitting device 4800 shown in FIG. 22. The angular rotation optical element 4801 includes an array of rotation surfaces 6901 oriented at an angle of 45 degrees to the thickness plane 6902 and 45 degrees to the width plane 4904 orthogonal to the thickness plane 6902. The angular rotation optical element 4801 has light collimating lateral edges 4802 (with a parabolic shape in a cross-section parallel to the x-y plane as shown in FIG. 24) that are oriented parallel to the thickness direction (parallel to the z axis) and are positioned opposite each other in the width direction (x direction) the angular rotation optical element 4801. Light from the light source 102 (shown in FIG. 22) exits the light source 102 from a light emitting area (represented by 4905) of the light source 102 and enters the input surface 6903 of the angular rotation optical element 4801 and exits the output surface 4908 of the angular rotation optical element 4801. First light 4906 propagates through the angular rotation optical element with a high angle to the optical axis 4803 in the thickness plane 6902 and a high angle to the optical axis 4803 in the width plane 4904. The first light 4906 is then substantially collimated in the width plane 4904 by the light collimating lateral edges 4802 such that the first light 4906 is collimated in the width plane 4904. The first light 4906 then reflects from a rotation surface 6901 such that the reflected light is substantially collimated in the thickness plane 6902 and at a wide angle in the width plane 4904. Second light 4907 initially propagates through the angular rotation optical element 4801 with a high angle to the optical axis 4803 in the thickness plane 6902 and a low angle to the optical axis 4803 in the width plane 4904. The second light 4907 then reflects from a rotation surface 6901 such that the reflected light is substantially collimated in the thickness plane 6902 and at a wide angle in the width plane 4904.

Figure 26:
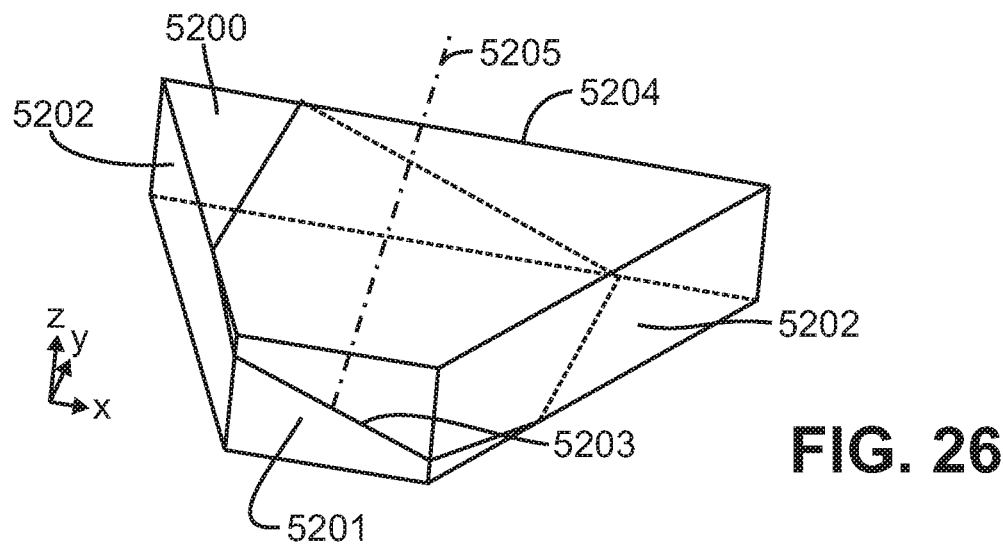
FIG. 26 is a perspective view of an angular rotation optical element comprising a single rotation element.
Figure 27:
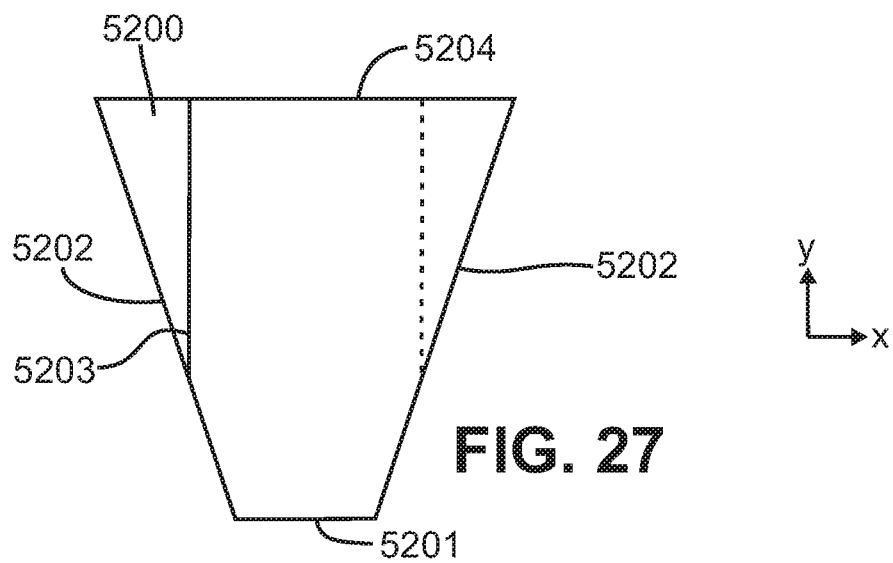
FIG. 27 is a top view of the angular rotation optical element of FIG. 26.
Figure 28:
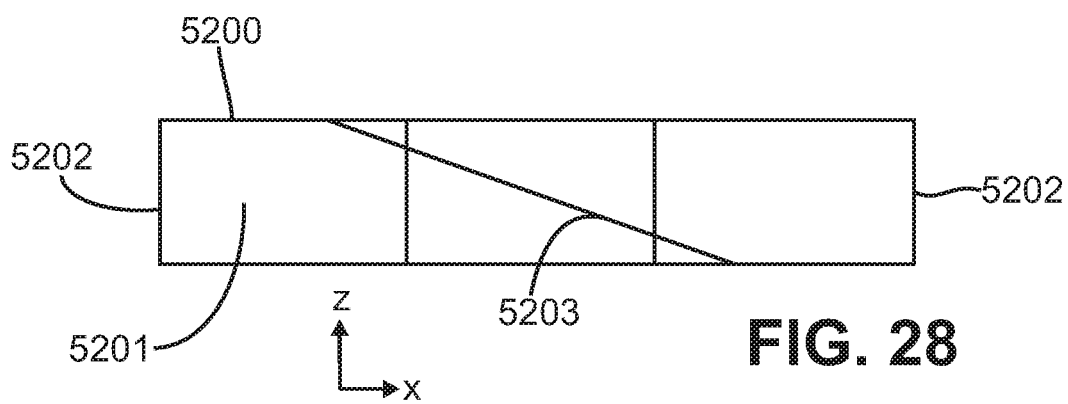
FIG. 28 is a side view of the angular rotation optical element of FIG. 26.
Figure 29:
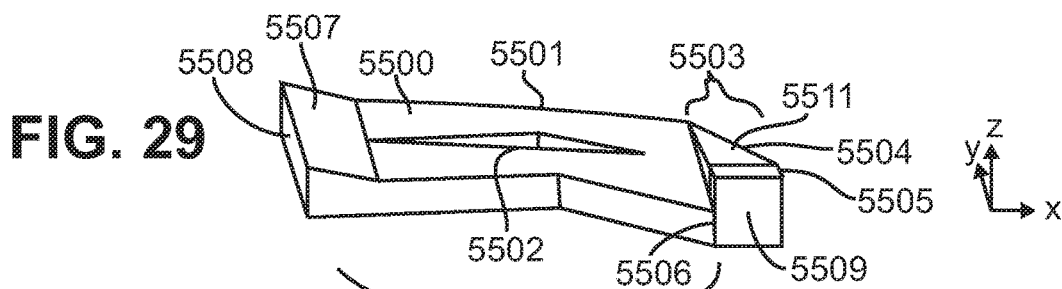
FIG. 29 is a first perspective view of a side optic angular rotation optical element.
Figure 30:
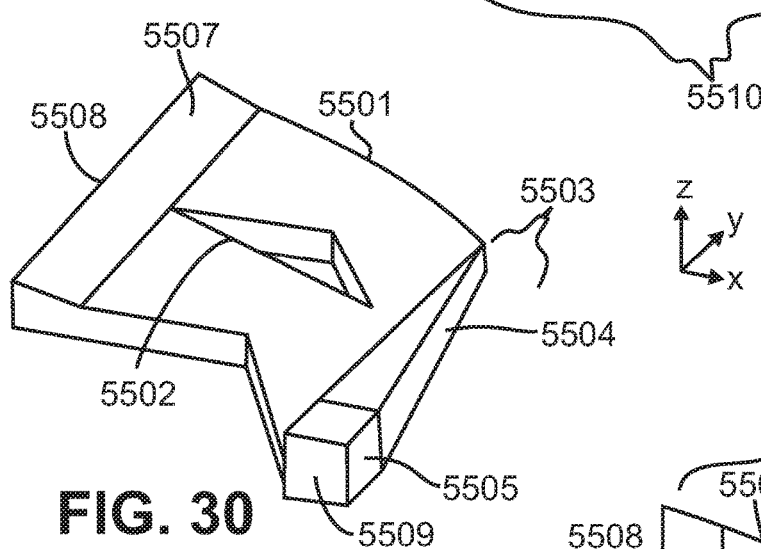
FIG. 30 is a second perspective view of the side optic angular rotation optical element of FIG. 29.
Figure 31:
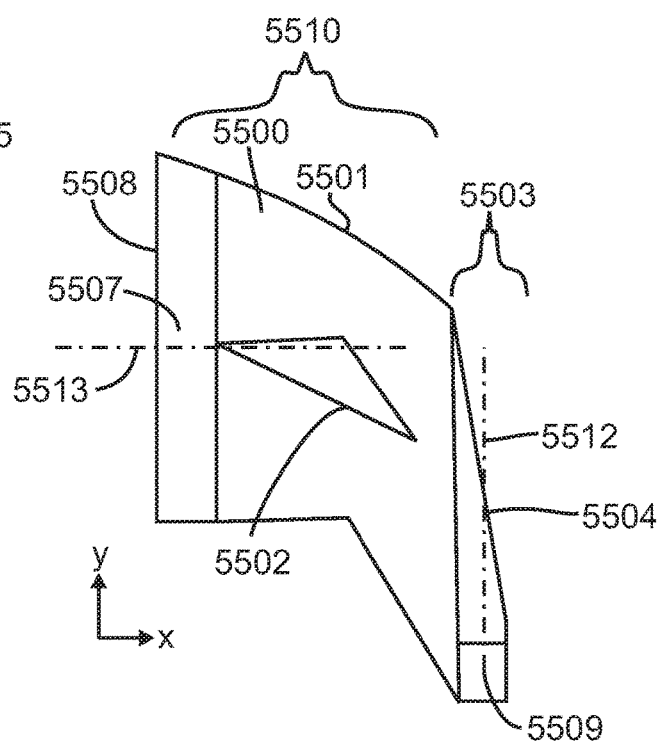
FIG. 31 is a top view of the side optic angular rotation optical element of FIG. 29.
Figure 32:
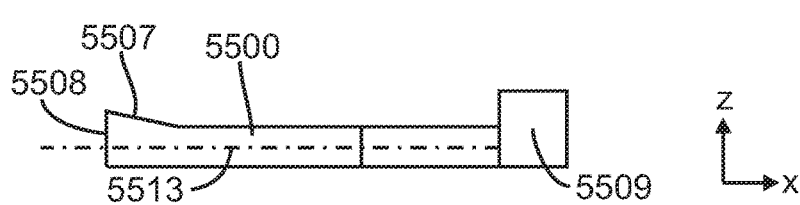
FIG. 32 is a side view of the side optic angular rotation optical element of FIG. 29.

FIGS. 26, 27, and 28 illustrate different views of an angular rotation optical element 5200 with a single rotation element 5203 oriented at an angle of 45 degrees to the thickness plane (parallel to the y-z plane and including the optical axis 5205) and 45 degrees to the width plane (parallel to the x-y plane and including the optical axis 5205) orthogonal to the thickness plane. The angular rotation optical element 4801 has light collimating lateral edges 5202 (with a linear shape in a cross-section parallel to the x-y plane as shown in FIG. 27) that are oriented parallel to the thickness direction (parallel to the z axis) and are positioned opposite each other in the width direction (x direction) the angular rotation optical element 4801. The angular rotation optical element 5200 comprises an input surface 5201 and an output surface 5204. The single rotation element may be formed by combining two injection molded optical elements formed from polycarbonate bonded together with a methacrylate-based low refractive index adhesive, for example.

FIGS. 29, 30, 31, and 32 illustrate different views of a side optic angular rotation optical element 5500 comprising a first lightguide region 5503 and a second lightguide region 5510 (see FIG. 31) with a thickness less than the first lightguide region 5503. The side optic angular rotation optical element 5500 further comprises a light collimating lateral edge 5501, a light input surface 5509, and an output surface 5508. The first lightguide region 5503 has a non-tapered region 5505 and is tapered in the −z direction and −x direction as the light propagates in the first lightguide region 5503. A portion of the light incident on the light input surface 5509 is coupled directly into the second lightguide region 5510 through the second lightguide region input region 5506. A second portion of the light incident on the light input surface 5509 is reflected by the angled, tapered lateral surface 5504, and/or the angled, tapered top surface 5511 such that the angle of light in the width plane (parallel to the x-y plane) and/or thickness plane (parallel to the y-z plane) to the first lightguide region optical axis 5512, respectively, is reduced and leaks into the second lightguide region 5510 through the second lightguide region input region 5506. The light leaking into the second lightguide region 5510 may be collimated in the width plane (parallel to the x-y plane) relative to the second lightguide region optical axis 5513 by one or more light collimating lateral edges 5501 or one or more internal light collimating edges 5502. The light leaking into the second lightguide region 5510 may be collimated in the thickness plane (parallel to the x-z plane) relative to the second lightguide region optical axis 5513 by one or more thickness plane light collimating surfaces 5507.

Figure 33:
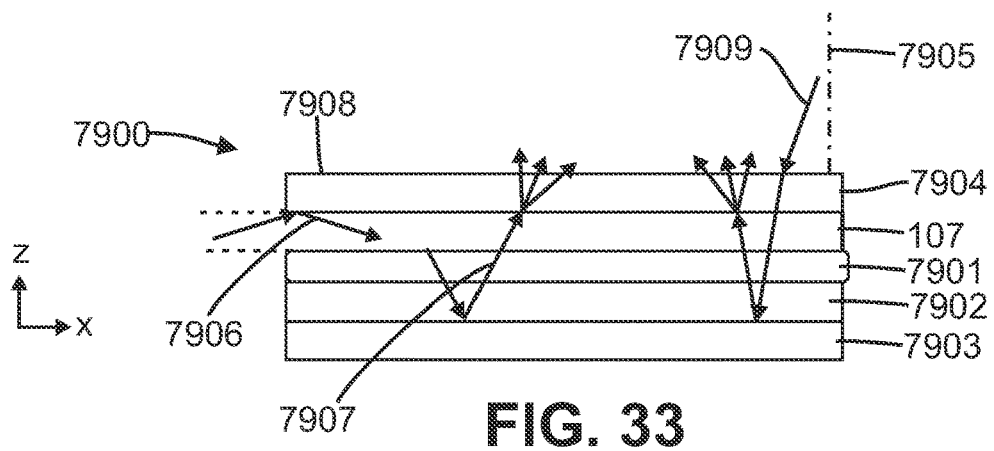
FIG. 33 is a side view of a portion of a reflective display comprising a film-based lightguide and angularly varying diffusing film.

FIG. 33 is a side view of a portion of one embodiment of a reflective display 7900 comprising an angularly varying diffusion film 7904 and a film based lightguide 107. The film-based lightguide 107 is positioned in the display stack between the liquid crystal layer 7902 and the angularly varying diffusion film 7904. In this embodiment, ambient light 7909 propagates into the angularly varying diffusion film 7904 (where it refracts upon entering the surface, but is substantially un-diffused), propagates through the film-based lightguide 107, through the linear polarizer 7901, propagates through the liquid crystal layer 7902, reflects from the reflective layer 7903 of the reflective display 7900 (such as a rear electrode), propagates back through the liquid crystal layer 7902, back through the linear polarizer 7901, back through the film-based lightguide 107, and is diffused while passing through the angularly varying diffusion film 7904 which diffuses incident light with a peak diffusion axis from the first direction 7905 perpendicular to the outer surface 7908 of the reflective display 7900. In this embodiment, light 7906 propagates in the +x direction in the film-based lightguide by total internal reflection and is extracted out of the film-based lightguide as light 7907 propagating on the opposite side of the first direction 7905 than the ambient light 7909 in the first plane (x-z plane) through the linear polarizer 7901, propagates through the liquid crystal layer 7902, reflects from the reflective layer 7903 of the reflective display 7900 (such as a rear electrode), propagates back through the liquid crystal layer 7902, through the linear polarizer 7901, through the film-based lightguide 107, and is diffused while passing through the angularly varying diffusion film 7904 which diffuses incident light with a peak diffusion axis from the first direction 7905 perpendicular to the outer surface 7908 of the reflective display 7900. The reflective display 7900 or the film-based lightguide 107 may include or have other layers optically coupled to the film-based lightguide 107 or reflective display (or a component or layer thereof) such as a light redirecting optical elements or layer, adhesive layers, cladding layers, core layer, additional film-based lightguides, turning film, light turning features, light extracting features, light mixing region, light source, coupling lightguides, low angle directing features, additional polarizer (such as a "clean-up" polarizer positioned above the angularly varying diffusion film 7904), compensation films, touchscreen layers, hardcoating layers, protective lenses, index-matching layers, etc. such as disclosed elsewhere herein.

Figure 34:
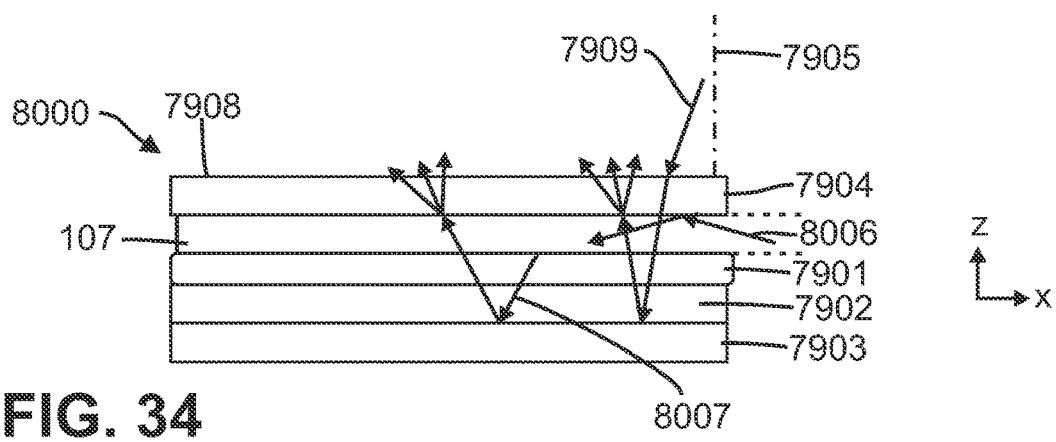
FIG. 34 is a side view of a reflective display comprising a film-based lightguide and angularly varying diffusing film with light emitted from the lightguide on the same side of the first direction as the ambient light.

FIG. 34 is a side view of a portion of one embodiment of a reflective display 8000 comprising an angularly varying diffusion film 7904 and a film based lightguide 107. The film-based lightguide 107 is positioned in the display stack between the liquid crystal layer 7902 and the angularly varying diffusion film 7904. In this embodiment, ambient light 7909 propagates into the angularly varying diffusion film 7904 (where it refracts upon entering the surface, but is substantially un-diffused), through the film-based lightguide 107, through the linear polarizer 7901, through the liquid crystal layer 7902, reflects from the reflective layer 7903 of the reflective display 7900 (such as a rear electrode), back through the liquid crystal layer 7902, back through the linear polarizer 7901, back through the film-based lightguide 107, and is diffused while passing through the angularly varying diffusion film 7904 which diffuses incident light with a peak diffusion axis from the first direction 7905 perpendicular to the outer surface 7908 of the reflective display 7900. In this embodiment, light 8006 propagates in the −x direction in the film-based lightguide by total internal reflection and is extracted out of the film-based lightguide as light 8007 propagating on the same side of the first direction 7905 as the ambient light 7909 in the first plane (x-z plane) through the linear polarizer 7901, propagates through the liquid crystal layer 7902, reflects from the reflective layer 7903 of the reflective display 7900 (such as a rear electrode), passes back through the liquid crystal layer 7902, through the linear polarizer 7901, through the film-based lightguide 107, and is diffused while passing through the angularly varying diffusion film 7904 which diffuses incident light with a peak diffusion axis from the first direction 7905 perpendicular to the outer surface 7908 of the reflective display 7900. The reflective display 8000 or the film-based lightguide 107 may include or have other layers optically coupled to the film-based lightguide 107 or reflective display (or a component or layer thereof) such as a light redirecting optical elements or layer, adhesive layers, cladding layers, core layer, additional film-based lightguides, turning film, light turning features, light extracting features, light mixing region, light source, coupling lightguides, low angle directing features, additional polarizer (such as a "clean-up" polarizer positioned above the angularly varying diffusion film 7904), compensation films, touchscreen layers, electrophoretic layer, protective layers, hardcoating layers, protective lenses, or index-matching layers, etc. such as, for example, those disclosed elsewhere herein or known in the art of reflective displays.

Figure 35:
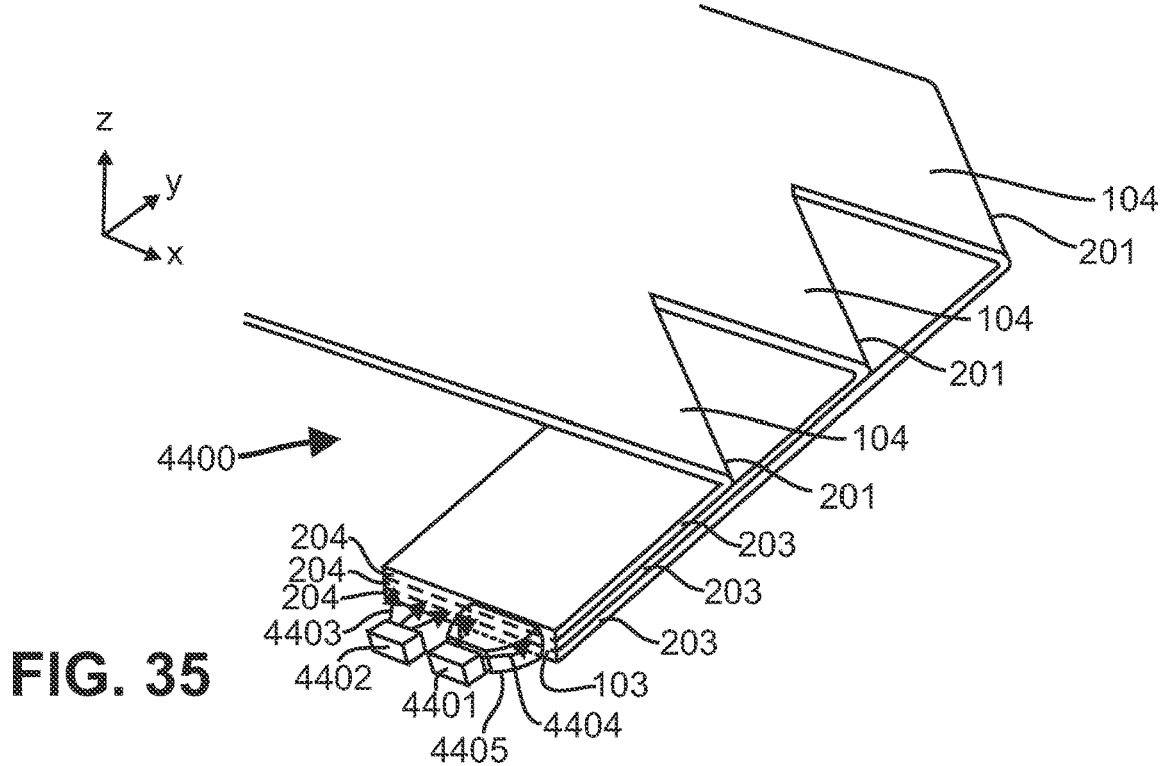
FIG. 35 is a perspective view of one embodiment of a light input coupler receiving different angular light output from two light sources.

FIG. 35 is a perspective view of one embodiment of a light input coupler 4400 with coupling lightguides 104 folded in the −y direction. Light 4403 from the second light source 4402 is directed into the light input surface 103, through the input edges 204 of the coupling lightguides 104 and has a higher FAWHMLI at the light input surface 103, such as a FAWHMLI of 120 degrees. Light 4404 from the first light source 4401 is directed into a light collimating element 4405 and exits the light collimating element 4405 toward the light input surface 103 through input edges 204 of the coupling lightguides 104 and has a lower FAWHMLI at the light input surface 103, such as a FAWHMLI of 40 degrees. In this embodiment, the light output from a backlight or display using the light input coupler 4400 of the film-based lightguide has a lower FAWHMLI in the y-z output plane when the first light source 4401 is emitting light and the second light source 4402 is not emitting light; and the light output from the backlight or display using the light input coupler 4400 of the film-based lightguide has a higher FAWHMLI in the y-z output plane when the second light source 4402 is emitting light and the first light source 4401 is not emitting light. In this embodiment, by varying the relative luminous flux outputs from the first light source 4401 and the second light source 4402 can vary the FAWHMLI from the light emitting region of the corresponding film-based lightguide comprising the light input coupler 4400.

Figure 36:
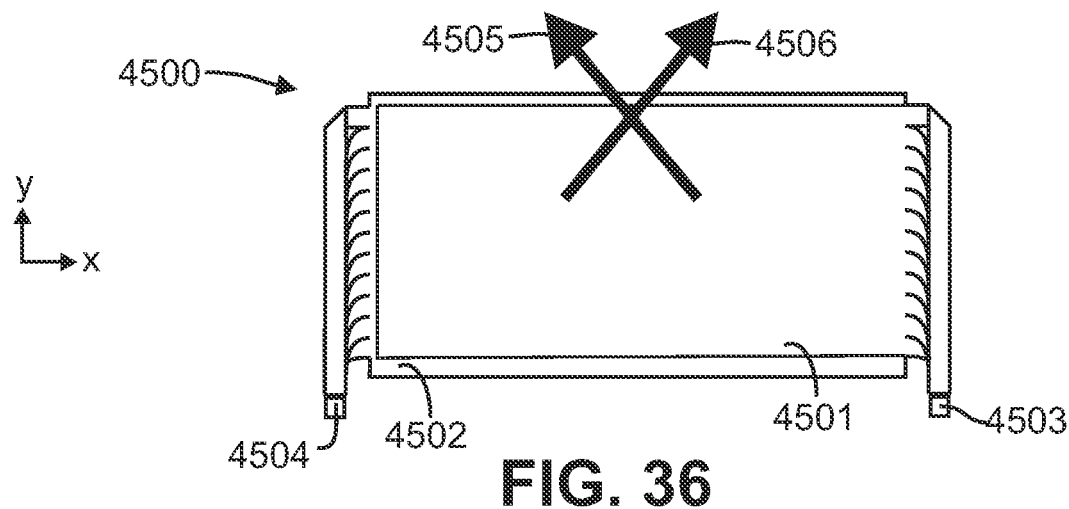
FIG. 36 is a top view of one embodiment of a light emitting device comprising two film-based lightguides with different angular light output profiles.

FIG. 36 is top view of one embodiment of a light emitting device 4500 including a first film based lightguide 4501 with a first angular light output profile 4505 positioned above a second film-based lightguide 4502 with a second angular output profile 4506. The first film-based lightguide 4501 is illuminated by light from the first light source 4503 and the second film-based lightguide 4502 is illuminated by light from the second light source 4504. In this embodiment, the angular light output profile of the light emitting device 4500 can be controlled by varying the relative light flux output from the first film-based lightguide 4501 via the first light source 4503 and the second film-based lightguide 4502 via the second light source 4504.

Figure 37:
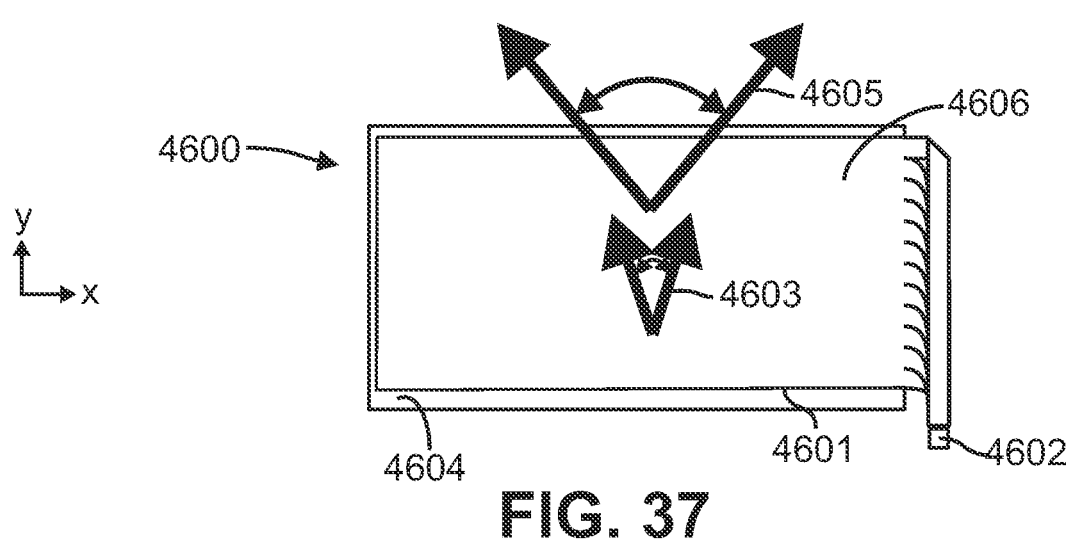
FIG. 37 is top view of one embodiment of a light emitting device including a first backlight with a film based lightguide with a first angular light output profile and a second angular light output profile.

FIG. 37 is top view of one embodiment of a light emitting device 4600 including a first backlight 4606 with a film based lightguide 4601 with a first angular light output profile 4603 with a lower FAWHMLI in the x-z plane positioned above a second backlight 4604 (such as an edge-lit backlight using a 2-millimeter-thick sheet lightguide) with a second angular output profile 4605 with a higher FAWHMLI in the x-z plane. The film-based lightguide 4601 is illuminated by light from the first light source 4602. In this embodiment, the angular light output profile of the light emitting device 4600 (such as a backlight comprising two sub-backlights or display comprising the two backlights) can be controlled by varying the relative light flux output from the first backlight 4606 via the first light source 4602 and the second backlight 4604.

In one embodiment, a light emitting device (such as a frontlight for a reflective display, for example) comprises a film-based lightguide with the surfaces of the film defining a first lightguide, the first lightguide is optically coupled to a light redirecting optical element or other film and one or more surfaces of the light redirecting optical element or other film in combination with a surface of the first lightguide define a second lightguide, wherein the second lightguide may comprise the first lightguide. In one embodiment, a reflective display comprises a lightguide wherein an effective thickness of the lightguide bounded by total internal reflection interfaces is increased for totally internally reflected light within the core layer that is frustrated by the plurality of light extraction features such that it passes through the first cladding layer and totally internally reflects at one of the total internal reflection interfaces of a light redirecting optical element. In a further embodiment, a first lightguide and a second lightguide comprise the core layer, the second lightguide defined by a portion of the frustrated totally internally reflected light from the first lightguide propagating by total internal reflection between a surface of the first lightguide and an area of a surface of the light redirecting optical element, wherein the light redirecting features of a light redirecting optical element occupy less than 50% of the surface of the light redirecting optical element, the area of the surface of the light redirecting element is defined between the light redirecting features and reflects by total internal reflection a second portion of the frustrated totally internally reflected light from the light extraction features back through a first cladding layer and into a core layer of the first lightguide where it totally internally reflects from the surface of the first lightguide and is subsequently reflected by a light redirecting feature toward a reflective spatial light modulator.

In one embodiment, a light emitting device comprises: a film lightguide of a lightguide material with a refractive index $n_{DL}$, including a body having a first surface and an opposing second surface; a plurality of coupling lightguides extending from the body, each coupling lightguide of the plurality of coupling lightguides having an end, the plurality of coupling lightguides folded and stacked such that the ends of the plurality of coupling lightguides define a light input surface; the body of the film comprising a first core layer comprising a first material with a first refractive index, nm, a second layer comprising a second material with a second refractive index $n_{D2}$ where $n_{DL} > n_{D2} > n_{D1}$; a plurality of low angle directing features optically coupled to the body of the lightguide; a plurality of light turning features optically coupled to the lightguide; wherein light propagating under total internal reflection at a first angle within the lightguide is redirected by the low angle directing features to a second angle less than the critical angle of an interface between the core lightguide layer and the second layer, a portion of the redirected light propagating through the interface and redirected by the light turning features to an angle within 30 degrees of the thickness direction of the film.

In one aspect, a light emitting device including a film with coupling lightguides extending therefrom includes a coupling lightguide Relative Position Maintaining Element (RPME) including a spine region connecting an array of angled teeth or guides. In another aspect, the angled teeth or guides of the RPME are physically coupled by a spine that does not extend outside the volume defined between the overlapping sections of the array of coupling lightguides in the regions of the fold. In another aspect, the array of angled teeth in an RPME include first edges oriented at a first tooth edge angle to the extended direction of the teeth (the direction the teeth extend from the spine, perpendicular to the array direction of the array of teeth) and second edges oriented at a second tooth edge angle to the extended direction of the teeth wherein the first tooth edge angle and second tooth edge angle are greater than 0 degrees.

In another aspect, a lightguide, cladding, or adhesive optically coupled to the lightguide includes a pliable or impact absorbing material. In another aspect, the ASTM D2240 Shore A hardness of the light transmitting lightguide, adhesive, or component physically and/or optically coupled to the lightguide is greater than one selected from the group: 5, 10, 20, 30, 40, 50, 60, 70, and 80.

In one aspect, a light input coupler for a light emitting device includes a wrap around a stack of coupling lightguides wherein the wrap includes a film with a Young's modulus less than one selected from the group: 10, 8, 6, 4, 2, 1, 0.5, and 0.1 gigapascals. In another aspect, the wrap includes perforations or alignment holes. In another aspect, the wrap material is a conformal material coated or injected into a cavity or region including the coupling lightguides.

Exemplary embodiments of light emitting devices and methods for making or producing the same are described above in detail. The devices, components, and methods are not limited to the specific embodiments described herein, but rather, the devices, components of the devices and/or steps of the methods may be utilized independently and separately from other devices, components and/or steps described herein. Further, the described devices, components and/or the described methods steps can also be defined in, or used in combination with, other devices and/or methods, and are not limited to practice with only the devices and methods as described herein.

In one embodiment, a display comprises a reflective spatial light modulator; an angularly varying diffusion film that transmits and scatters light incident within a first angular range and transmits light un-deviated incident within a second angular range outside of the first angular range; and a frontlight comprising: a film comprising a lightguide region and having opposing faces with a thickness between the opposing faces less than 0.5 millimeters; a light source positioned to emit light into the film, the light propagating and totally internally reflecting within the lightguide region; and a light emitting region defined within the lightguide region comprising a plurality of light extraction features that extract a portion of the light propagating within the film in a waveguide condition out of the film in the light emitting region, wherein the light emitting region of the film is positioned between the angularly varying diffusion film and the reflective spatial light modulator, and the portion of the light extracted in the light emitting region is modulated and reflected from the reflective spatial light modulator, passes through the film, is scattered by the angularly varying diffusion film, and exits the display. In one embodiment, the reflective spatial light modulator comprises a spatial light modulating layer and a second layer adjacent the spatial light modulating layer on a viewing side of the spatial light modulating layer, and the portion of light extracted in the light emitting region is incident on the spatial light modulating layer at an angle of peak luminous intensity in the second layer from a surface normal of the spatial light modulating layer and reflects to an angle within the first angular range upon the angularly varying diffusion film. In one embodiment, the angle of peak luminous intensity of the portion of light in the second layer is less than 40 degrees. In another embodiment, an angular full-width at half maximum intensity of light from the light source exiting the light emitting region toward the reflective spatial light modulator is less than 50 degrees measured in air. In one embodiment, the display further comprises an outer surface through which the display is viewed, the reflective spatial light modulator comprises a spatial light modulating layer, and an angle of peak luminous intensity of the portion of light extracted in the light emitting region measured in air is between 5 and 20 degrees from a first direction perpendicular to the outer surface of the display. In one embodiment, the display comprises an outer surface through which the display is viewed, the angularly varying diffusion film comprises a peak axis of diffusion on a first side of a first direction perpendicular to the outer surface of the display, and the portion of light extracted in the light emitting region exits the light emitting region at an angle on the first side of the first direction. In one embodiment, the display comprises an outer surface through which the display is viewed, the angularly varying diffusion film comprises a peak axis of diffusion on a first side of a first direction perpendicular to the outer surface of the display, and the portion of light extracted in the light emitting region exits the light emitting region at an angle on a second side of the first direction opposite the first side. In one embodiment, the film comprises an array of coupling lightguides continuous with the lightguide region of the film, each coupling lightguide of the array of coupling lightguides terminates in a bounding edge, each coupling lightguide is folded such that the bounding edges of the array of coupling lightguides are stacked, the light source is positioned to emit light into the stacked bounding edges, the light from the light source propagating within the array of coupling lightguides to the lightguide region of the film, and light from each coupling lightguide of the array of coupling lightguides combining and totally internally reflecting within the lightguide region. In one embodiment, the thickness of the lightguide region is less than 0.1 millimeters. In one embodiment, the reflective spatial light modulator is a reflective liquid crystal display comprising a first linear polarizer with a first polarization axis, and the display further comprises a second linear polarizer positioned above the angularly varying diffusion film, the second linear polarizer having a second polarization axis aligned with the first polarization axis of the first linear polarizer. In one embodiment the light emitting region of the film selectively outputs light with a first polarization more than light with a second polarization different from the first polarization. In one embodiment, a display comprises a reflective spatial light modulator comprising a spatial light modulating layer and a second layer adjacent the spatial light modulating layer on a viewing side of the spatial light modulating layer; an angularly varying diffusion film that transmits and scatters light incident within a first angular range and transmits light un-deviated incident within a second angular range outside of the first angular range; and a frontlight comprising: a film comprising a lightguide region and having opposing faces with a thickness between the opposing faces less than 0.5 millimeters; a light source positioned to emit light into the film, the light propagating and totally internally reflecting within the lightguide region; and a light emitting region defined within the lightguide region comprising a plurality of light extraction features that extract a portion of light propagating within the film in a waveguide condition out of the film in the light emitting region, wherein the light emitting region of the film is positioned between the angularly varying diffusion film and the reflective spatial light modulator, and the portion of light extracted in the light emitting region is incident on the spatial light modulating layer at an angle of peak luminous intensity less than 30 degrees in the second layer from the surface normal of the spatial light modulating layer, reflects from the reflective spatial light modulator, passes through the film, is incident with an angle of peak luminous intensity within the first angular range upon the angularly varying diffusion film, is scattered by the angularly varying diffusion film, and exits the display. In one embodiment, the light exiting the emitting region of the film selectively outputs light with a first polarization more than light at a second polarization different from the first polarization. In one embodiment, a display comprises: an outer surface through which the display is viewed; a reflective spatial light modulator; an angularly varying diffusion film that transmits and scatters light incident within a first angular range and transmits light un-deviated incident within a second angular range outside of the first angular range, the angularly varying diffusion film comprising a first region or layer and a second region or layer; and a frontlight comprising: a film comprising a lightguide region and having opposing faces with a thickness between the opposing faces less than 0.5 millimeters; a light source positioned to emit light into the film, the light propagating and totally internally reflecting within the lightguide region; and a light emitting region defined within the lightguide region comprising a plurality of light extraction features that extract a portion of light propagating within the film in a waveguide condition out of the film in the light emitting region, wherein the light emitting region of the film is positioned between the angularly varying diffusion film and the reflective spatial light modulator, the first region or layer of the angularly varying diffusion film scatters light incident within a range of angles symmetrical in a first plane to a first direction perpendicular to the outer surface of the display, the second region or layer scatters light incident within a range of angles asymmetrical to the first direction in the first plane, and the light extracted in the light emitting region is modulated and reflected from the reflective spatial light modulator, passes through the film, is scattered by the angularly varying diffusion film, and exits the display. In one embodiment, the light extracted in the light emitting region is scattered by the first region or layer of the angularly varying diffusion film. In one embodiment, the first range includes angles from −10 to 10 degrees from the first direction in the first plane.

While the disclosure includes various specific embodiments, those skilled in the art will recognize that the embodiments can be practiced with modification within the spirit and scope of the disclosure and the claims.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Equivalents

Those skilled in the art will recognize or be able to ascertain using no more than routine experimentation, numerous equivalents to the specific procedures described herein. Such equivalents are considered to be within the scope of the disclosure. Various substitutions, alterations, and modifications may be made to the embodiments without departing from the spirit and scope of the disclosure. Other aspects, advantages, and modifications are within the scope of the disclosure. This disclosure is intended to cover any adaptations or variations of the specific embodiments discussed herein. Therefore, it is intended that this disclosure be limited only by the claims and the equivalents thereof.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein. Unless indicated to the contrary, all tests and properties are measured at an ambient temperature of 25 degrees Celsius or the environmental temperature within or near the device when powered on (when indicated) under constant ambient room temperature of 25 degrees Celsius. Unless otherwise stated, refractive indexes referenced herein are measured at the yellow doublet sodium D-line, with a wavelength of 589 nanometers. Elements in the figures are not drawn to scale.

What is claimed is:

1. A display comprising:
   an outer surface through which the display is viewed;
   a reflective spatial light modulator;
   an angularly varying diffusion film that transmits and scatters light incident within a first angular range, transmits light un-deviated incident within a second angular range outside of the first angular range, and comprises a peak axis of diffusion on a first side of a first direction perpendicular to the outer surface of the display in a first plane parallel to the first direction; and
   a frontlight comprising:
      a film comprising a lightguide region and having opposing faces with a thickness between the opposing faces less than 0.5 millimeters;
      a light source positioned to emit light into the film, the light propagating and totally internally reflecting within the lightguide region; and
      a light emitting region defined within the lightguide region comprising a plurality of light extraction features that extract a portion of the light propagating within the film in a waveguide condition out of the film in the light emitting region,
   wherein the light emitting region of the film is positioned between the angularly varying diffusion film and the reflective spatial light modulator, the portion of the light extracted in the light emitting region exits the light emitting region at an angle in the first plane on a second side of the first direction opposite the first side, is modulated and reflected from the reflective spatial light modulator, passes through the film, is scattered by the angularly varying diffusion film, and exits the display.

2. The display of claim 1 wherein the reflective spatial light modulator comprises a spatial light modulating layer and a second layer adjacent the spatial light modulating layer on a viewing side of the spatial light modulating layer, and the portion of light extracted in the light emitting region is incident on the spatial light modulating layer at an angle of peak luminous intensity in the second layer from a surface normal of the spatial light modulating layer and reflects to an angle within the first angular range upon the angularly varying diffusion film.

3. The display of claim 2 wherein the angle of peak luminous intensity of the portion of light in the second layer is less than 40 degrees.

4. The display of claim 1 wherein an angular full-width at half maximum intensity of light from the light source exiting the light emitting region toward the reflective spatial light modulator is less than 50 degrees measured in air in a plane orthogonal to a thickness direction of the film.

5. The display of claim 1 wherein the reflective spatial light modulator comprises a spatial light modulating layer, and an angle of peak luminous intensity of the portion of light extracted in the light emitting region measured in air is between 5 and 20 degrees from the first direction perpendicular to the outer surface of the display.

6. The display of claim 1 wherein the film comprises an array of coupling lightguides continuous with the lightguide region of the film, each coupling lightguide of the array of coupling lightguides terminates in a bounding edge, each coupling lightguide is folded such that the bounding edges of the array of coupling lightguides are stacked, the light source is positioned to emit light into the stacked bounding edges, the light from the light source propagating within the array of coupling lightguides to the lightguide region of the film, and light from each coupling lightguide of the array of coupling lightguides combining and totally internally reflecting within the lightguide region.

7. The display of claim 1 wherein the thickness of the lightguide region is less than 0.1 millimeters.

8. The display of claim 1 wherein the reflective spatial light modulator is a reflective liquid crystal display comprising a first linear polarizer with a first polarization axis, and the display further comprises a second linear polarizer positioned above the angularly varying diffusion film, the second linear polarizer having a second polarization axis aligned with the first polarization axis of the first linear polarizer.

9. The display of claim 1 wherein the light emitting region of the film selectively outputs light with a first polarization more than light with a second polarization different from the first polarization.

10. A display comprising:
   an outer surface through which the display is viewed;
   a reflective spatial light modulator comprising a spatial light modulating layer and a second layer adjacent the spatial light modulating layer on a viewing side of the spatial light modulating layer;

an angularly varying diffusion film that transmits and scatters light incident within a first angular range, transmits light un-deviated incident within a second angular range outside of the first angular range, and comprises a peak axis of diffusion on a first side of a first direction perpendicular to the outer surface of the display in a first plane parallel to the first direction; and
a frontlight comprising:
 a film comprising a lightguide region and having opposing faces with a thickness between the opposing faces less than 0.5 millimeters;
 a light source positioned to emit light into the film, the light propagating and totally internally reflecting within the lightguide region; and
 a light emitting region defined within the lightguide region comprising a plurality of light extraction features that extract a portion of light propagating within the film in a waveguide condition out of the film in the light emitting region,
 wherein the light emitting region of the film is positioned between the angularly varying diffusion film and the reflective spatial light modulator, the portion of light extracted in the light emitting region exits the light emitting region at an angle in the first plane on a second side of the first direction opposite the first side, is incident on the spatial light modulating layer at a first angle of peak luminous intensity less than 30 degrees in the second layer from a surface normal of the spatial light modulating layer, reflects from the reflective spatial light modulator, passes through the film, is incident with a second angle of peak luminous intensity within the first angular range upon the angularly varying diffusion film, is scattered by the angularly varying diffusion film, and exits the display.

11. The display of claim 10 wherein an angular full-width at half maximum intensity of light from the light source exiting the light emitting region toward the reflective spatial light modulator is less than 50 degrees measured in air in a plane orthogonal to a thickness direction of the film.

12. The display of claim 10 wherein the light exiting the light emitting region of the film selectively outputs light with a first polarization more than light at a second polarization different from the first polarization.

13. A display comprising:
an outer surface through which the display is viewed;
a reflective spatial light modulator;
an angularly varying diffusion film that transmits and scatters light incident within a first angular range and transmits light un-deviated incident within a second angular range outside of the first angular range, the angularly varying diffusion film comprising a first region or layer and a second region or layer; and
a frontlight comprising:
 a film comprising a lightguide region and having opposing faces with a thickness between the opposing faces less than 0.5 millimeters;
 a light source positioned to emit light into the film, the light propagating and totally internally reflecting within the lightguide region; and
 a light emitting region defined within the lightguide region comprising a plurality of light extraction features that extract a portion of light propagating within the film in a waveguide condition out of the film in the light emitting region,
 wherein the light emitting region of the film is positioned between the angularly varying diffusion film and the reflective spatial light modulator, the first region or layer of the angularly varying diffusion film scatters light incident within a range of angles symmetrical in a first plane to a first direction perpendicular to the outer surface of the display, the second region or layer scatters light incident within a range of angles asymmetrical to the first direction in the first plane, the first angular range includes angles from −10 to 10 degrees from the first direction in the first plane, and the light extracted in the light emitting region is modulated and reflected from the reflective spatial light modulator, passes through the film, is scattered by the first region or layer of the angularly varying diffusion film, and exits the display.

14. The display of claim 13 wherein an angular full-width at half maximum intensity of light from the light source exiting the light emitting region toward the reflective spatial light modulator is less than 50 degrees measured in air in a plane orthogonal to a thickness direction of the film.

15. The display of claim 1 wherein an angular full-width at half maximum intensity of light from the light source exiting the light emitting region toward the reflective spatial light modulator is less than 30 degrees measured in air.

16. The display of claim 10 wherein an angular full-width at half maximum intensity of light from the light source exiting the light emitting region toward the reflective spatial light modulator is less than 30 degrees measured in air in a plane orthogonal to a thickness direction of the film.

17. The display of claim 1 wherein the peak axis of diffusion is within an angular range between −15 and 35 degrees from the first direction measured in air.

18. The display of claim 10 wherein the peak axis of diffusion is within an angular range between −15 and 35 degrees from the first direction measured in air.

19. The display of claim 13 wherein the angularly varying diffusion film comprises a peak axis of diffusion on a first side of a first direction perpendicular to the outer surface of the display in a first plane parallel to the first direction within an angular range between −15 and 35 degrees from the first direction measured in air.

20. The display of claim 1 wherein the peak axis of diffusion is within an angular range between −5 and 20 degrees from the first direction measured in air.

* * * * *